US008163071B2

(12) United States Patent
Lee et al.

(10) Patent No.: US 8,163,071 B2
(45) Date of Patent: Apr. 24, 2012

(54) HOLLOW FIBER, DOPE COMPOSITION FOR FORMING HOLLOW FIBER, AND METHOD OF PREPARING HOLLOW FIBER USING THE SAME

(75) Inventors: Young Moo Lee, Seoul (KR); Ho Bum Park, Seoul (KR); Sang Hoon Han, Seoul (KR); Chul Ho Jung, Gwangju (KR)

(73) Assignee: IUCF-HYU (Industry-University Cooperation Foundation Hanyang University), Seongdong-Gu, Seoul (KR)

( * ) Notice: Subject to any disclaimer, the term of this patent is extended or adjusted under 35 U.S.C. 154(b) by 282 days.

(21) Appl. No.: 12/468,837

(22) Filed: May 19, 2009

(65) Prior Publication Data

US 2009/0282982 A1 Nov. 19, 2009

Related U.S. Application Data

(63) Continuation-in-part of application No. 12/248,294, filed on Oct. 9, 2008, now abandoned.

(30) Foreign Application Priority Data

May 19, 2008 (KR) ........................ 10-2008-0046115

(51) Int. Cl.
*B01D 59/12* (2006.01)
(52) U.S. Cl. ................ 96/10; 96/14; 428/378; 428/395; 428/398
(58) Field of Classification Search .................... 524/600
See application file for complete search history.

(56) References Cited

U.S. PATENT DOCUMENTS

| | | | |
|---|---|---|---|
| 3,899,307 A | 8/1975 | Thompson | |
| 4,820,793 A | 4/1989 | Imai et al. | |
| 4,931,182 A | 6/1990 | Burgoyne, Jr. et al. | |
| 4,978,733 A | 12/1990 | Khanna | |
| 4,980,447 A | 12/1990 | Khanna | |
| 5,071,948 A | 12/1991 | Khanna | |
| 5,173,561 A | 12/1992 | Gupta | |
| 5,262,056 A * | 11/1993 | Koros et al. | 210/654 |
| 5,525,436 A | 6/1996 | Savinell et al. | |
| 5,558,936 A | 9/1996 | Chung et al. | |
| 5,591,250 A | 1/1997 | Stern et al. | |
| 5,716,727 A | 2/1998 | Savinell et al. | |
| 5,723,086 A | 3/1998 | Ledjeff et al. | |
| 5,725,769 A | 3/1998 | Miller et al. | |
| 5,753,008 A | 5/1998 | Friesen et al. | |
| 5,837,032 A * | 11/1998 | Moll et al. | 95/45 |
| 5,868,975 A | 2/1999 | Lee et al. | |
| 5,919,892 A | 7/1999 | Hwang et al. | |
| 5,985,969 A | 11/1999 | Harris et al. | |
| 6,099,988 A | 8/2000 | Savinell et al. | |
| 6,204,356 B1 | 3/2001 | Saito et al. | |
| 6,383,258 B1 | 5/2002 | Simmons | |
| 6,548,621 B1 | 4/2003 | Tsai et al. | |
| 7,745,516 B2 | 6/2010 | Dueber et al. | |
| 2003/0164090 A1 * | 9/2003 | Ding et al. | 95/45 |
| 2004/0229160 A1 | 11/2004 | Naiini et al. | |
| 2004/0229166 A1 | 11/2004 | Rushkin et al. | |
| 2004/0229167 A1 | 11/2004 | Naiini et al. | |
| 2004/0249110 A1 | 12/2004 | Naiini et al. | |
| 2004/0253537 A1 | 12/2004 | Rushkin et al. | |
| 2004/0253542 A1 | 12/2004 | Rushkin et al. | |
| 2005/0181297 A1 | 8/2005 | Naiini et al. | |
| 2005/0242021 A1 * | 11/2005 | Ditter et al. | 210/500.23 |
| 2006/0011063 A1 | 1/2006 | Zhou | |
| 2006/0216641 A1 | 9/2006 | Naiini et al. | |
| 2006/0275699 A1 | 12/2006 | Naiini et al. | |
| 2007/0099111 A1 | 5/2007 | Naiini et al. | |
| 2009/0111050 A1 | 4/2009 | Naiini et al. | |
| 2009/0197067 A1 | 8/2009 | Naiini et al. | |
| 2009/0282982 A1 | 11/2009 | Jung et al. | |
| 2009/0286078 A1 | 11/2009 | Lee et al. | |
| 2009/0286904 A1 | 11/2009 | Lee et al. | |
| 2009/0297850 A1 | 12/2009 | Jung et al. | |
| 2010/0099804 A1 | 4/2010 | Lee et al. | |

FOREIGN PATENT DOCUMENTS

| | | |
|---|---|---|
| JP | 08-243367 | 9/1996 |
| JP | 08-299769 | 11/1996 |
| JP | 2001-348428 | 12/2001 |
| KR | 10-2006-0085845 | 7/2006 |
| WO | 93-02858 | 2/1993 |
| WO | 2006/080766 | 8/2006 |
| WO | WO 2007007051 A1 * | 1/2007 |
| WO | 2009/107889 | 9/2009 |
| WO | 2009/113747 | 9/2009 |

(Continued)

OTHER PUBLICATIONS

Ho Bum Park, et al., Polymers with Cavities Tunes for Fast Selective Transport of Small Molecules and Ions, Science 318, 254 (Oct. 12, 2007).
Ho Bum Park, et al., Supporting Online Material for Polymers with Cavities Tunes for Fast Selective Transport of Small Molecules and Ions, Science 318, 254 (Oct. 12, 2007).
Bruma et al., "Fluorinated Poly)benzoxzaole-Imide)s" Polymers for Advanced Technology, vol. 5, 535-540 (1993).
Chen et al., "2,6-Diamino-4-phenylphenol (DAPP) copolymerized polyimides: synthesis and characterization" Polym. Int., 55:93-100 (2006).

(Continued)

*Primary Examiner* — Vickey Nerangis
*Assistant Examiner* — Wenwen Cai
(74) *Attorney, Agent, or Firm* — Lexyoume IP Group, PLLC.

(57) ABSTRACT

Disclosed is a hollow fiber that includes a hollow positioned at the center of the hollow fiber, macropores positioned at adjacent to the hollow, and mesopores and picopores positioned at adjacent to macropores, and the picopores are three dimensionally connected to each other to form a three dimensional network structure. The hollow fiber includes a polymer derived from polyamic acid, and the polyamic acid includes a repeating unit obtained from aromatic diamine including at least one ortho-positioned functional group with respect to an amine group and dianhydride.

26 Claims, 8 Drawing Sheets

FOREIGN PATENT DOCUMENTS

WO 2009/142434 11/2009

OTHER PUBLICATIONS

D. A. Doyle et al, The Structure of the Potassium Channel: Molecular Basis of K+ Conduction and Selectivity, Science 1998, 280, 69-77.

B.D. Freeman, Basis of Permeability/ Selectivity Tradeoff Relations in Polymeric Gas Separation Membranes, Macromolecules, 1999, 32, 375-380.

Ronghuan He, et al., Proton conductivity of phosphoric acid doped polybenzimidazole and its composites with inorganic proton conductors, Journal of Membrane Science, 2003, 226, 169-184.

M.A. Hickner et al., Alternative Polymer Systems for Proton Exchange Membrane (PEMs), Chem. Rev. 2004, 104, 4587-4612.

B. Jeong et al., Biodegradable block copolymers as injectable drug-delivery systems, Nature, 1997, 388, 860-862.

Jung, C.H. et al., Gas Permeation Properties of Hydroxy-Group Containing Polyimide Membranes, Macromolecular Research, Aug. 31, 2008, vol. 16, pp. 555-560.

Khanna & Mueller, "New High Temperature Stable Positive Photoresists Based on Hydroxy Polyimides and Polyamides Containing the Hexafluroroisopropylidene (6-F) Linking Group" Polymer Engineering & Science, Jul. 1989, vol. 29, No. 14, 954-959.

D. Kozono et al., Aquaporin water channels: atomic structure and molecular dynamics meet clinical medicine, Invest. 2002, 109, 1395-1399.

Z. Lai et al., Microstructural Optimization of a Zeolite Membrane for Organic Vapor Separation, Science 2003, 300, 456-460.

P. Lightfoot et al., Crystal Structure of the Polymer Electrolyte Poly-(ethylene oxide)3:LiCF3SO3, Science, 1993, 262, 883-885.

H. Lin et al., Plasitcization-Ebhanced Hydrogen Purification Using Polymeric Membrane, Science 2006, 311, 639-642.

Mercer, Frank W., et al., Synthesis and Characterization of New Fluorinated Poly(imide benzoxazole)s, High Performance Polymers, 1996, vol. 8, pp. 395-406.

K. Nagai et al, Poly[1-(trimethylsilyl)-1-propyne] and related polymers: synthesis, properties and functions, Polym. Sci. 2001, 26, 721-798.

Ken-Inchi Okamoto, et al., Gas Permeability and Permselectivity of Fluorinated Polybenzoxazoles, J. Polym. Sci. Part B., Polym Phys. 30, 1215-1221.

H.B. Park, et al., Fabrication and Characterization of Nanoporous Carbon/Silica Membranes, Adv. Mater. 2005, 17, 477-483.

Preston et al, "New High-Temperature Polymers. VIII. Ordered Benzoxazole- and Benzothiazole-Imide Copolymers" Journal of Polymer Science, A-1, vol. 7, 283-296 (1969).

L.M. Robeson, The Upper Bound Revisited J. Membr Sci. 2008, 320, 390-400.

L.M. Robeson, Correlation of Separation Factor Versus Permability for Polymeric Membrane, J. Membr. Sci., 1991, 62, 165-185.

Sundar and Mathias, "Novel Thermooxidatively Stable Poly (ether-imide-benzoxazole) and Poly (ester-imide-benzoxazole)" Journal of Polymer Science: Part A: Polymer Chemistry, vol. 32, 2825-2839 (1994).

Tseitlin et al. "Destruction of Polymers with Benzoxazole and Imide Fragments in the Main Chain" J. Polym. Sci.: Symposium. No. 42, 1305-1312 (1973).

Ueda et al, "Synthesis of Poly(benzoxazole)s by Direct Polycondensation of Dicarboxylic Acids with 3,3'-Dihydroxybenzidine Dihydrochloride Using Phosphorous Pentoxide/Methanesulfonic Acid as Condensing Agent and Solvent" Journal of Polymer Science: Part A, Polymer Chemistry vol. 24, 1019-1026 (1986).

V.J. Vasudevan, J.E. McGrath, Atomistic Modeling of Amorphous Aromatic Polybenzoxazoles, Macromolecules 1996, 29, 637-645.

W. J. Welsh, D. Bhaumik, J.E. Mark, Pheylene Group Rotations and Nonplanar Conformations in Some cis-and trans-Poly(benzobisoxazoles) and -Poly(benzobisthiazoles), Macromolecules 1981, 14, 947-950.

B.R. Wilks et al., Impact of Average Free-Volume Element Size on Transport in Stereoisomers of Polynorbornene. I. Properties at 35C, J. Polym. Sci. Part B: Polym. Phys. 2003, 41, 2185.

Wu et al, "Synthesis and Properties of Aromatic Polyimide, Poly(benzoxazole imide), and Poly(benzoxazole amide imide)" Journal of Applied Polymer Science, vol. 113, 2301-2312 (2009).

H.B. Park, C.H. Jung, Y. M. Lee et al, Polymers with Cavities Tuned for Fast Selective Transport of Small Molecules and Ions Science, Oct. 12, 2007, 318, pp. 254-258.

McKensie et al, "Synthesis and Characterization of New Fluorinated Poly(Imide Benzoxazole)s" High Performance Polymers, Sep. 1996, vol. 8, No. 3, 395-406.

Tullos, Gordon L. et al, Thermal Conversion of Hydroxy-Containing Imides to Benzoxazoles: Polymer and Model Compound Study, Macromolecules, Published on Web Jun. 5, 1999, vol. 32, pp. 3598-3612.

Blackburn, Victoria, What is a polymer chain?, WiseGeek Artical, 2003-2012 Conjecture Corporation. http://www.wisegeek.com/what-is-a-polymer-chain.htm.

Niwa M et al., Surface orientation effect of asymmetric polyimide hollow fibers on their gas transport properties, Journal of Membrane Science 230 (2004), pp. 141-148.

* cited by examiner

HOLLOW FIBER, DOPE COMPOSITION FOR FORMING HOLLOW FIBER, AND METHOD OF PREPARING HOLLOW FIBER USING THE SAME

CROSS-REFERENCE TO RELATED APPLICATION

This application claims priority to and the benefit of Korean Patent Application No. 10-2008-0046115 filed in the Korean Intellectual Property Office on May 19, 2009, the entire contents of which are incorporated herein by reference.

BACKGROUND OF THE INVENTION (a) Field of the Invention

This disclosure relates to a hollow fiber, a dope solution composition for forming a hollow fiber, and a method of preparing a hollow fiber using the same.

(b) Description of the Related Art

Membranes must satisfy the requirements of superior thermal, chemical and mechanical stability, high permeability and high selectivity so that they can be commercialized and then applied to a variety of industries. The term "permeability" used herein is defined as a rate at which a substance permeates through a membrane. The term "selectivity" used herein is defined as a permeation ratio between two different gas components.

Based on the separation performance, membranes may be classified into reverse osmosis membranes, ultrafiltration membranes, microfiltration membranes, gas separation membranes, etc. Based on the shape, membranes may be largely classified into flat sheet membranes, spiral-wound membranes, composite membranes and hollow fiber membranes. Of these, asymmetric hollow fiber membranes have the largest membrane areas per unit volume and are thus generally used as gas separation membranes.

A process for separating a specific gas component from various ingredients constituting a gas mixture is greatly important. This gas separation process generally employs a membrane process, a pressure swing adsorption process, a cryogenic process and the like. Of these, the pressure swing adsorption process and the cryogenic process are generalized techniques, design and operations methods of which have already been developed, and are now in widespread use. On the other hand, gas separation using the membrane process has a relatively short history.

The gas separation membrane is used to separate and concentrate various gases. e.g. hydrogen ($H_2$), helium (He), nitrogen ($N_2$), oxygen ($O_2$), carbon monoxide (CO), carbon dioxide ($CO_2$), water vapor ($H_2O$), ammonia ($NH_3$), sulfur compounds ($SO_x$) and light hydrocarbon gases such as methane ($CH_4$), ethane ($C_2H_6$), ethylene ($C_2H_4$), propane ($C_3H_8$), propylene ($C_3H_6$), butane ($C_4H_{10}$), butylene ($C_4H_8$). Gas separation may be used in the fields including separation of oxygen or nitrogen present in air, removal of moisture present in compressed air and the like.

The principle for the gas separation membranes is based on the difference in permeability between respective components constituting a mixture of two or more gases. The gas separation involves a solution-diffusion process, in which a gas mixture comes in contact with a surface of a membrane and at least one component thereof is selectively dissolved. Inside the membrane, selective diffusion occurs. The gas component which permeates the membrane is more rapid than at least one of other components. Gas components having a relatively low permeability pass through the membrane at a speed lower than at least one component. Based upon such a principle, the gas mixture is divided into two flows, i.e., a selectively permeated gas-containing flow and a non-permeated gas-containing flow. Accordingly, in order to suitably separate gas mixtures, there is a demand for techniques to select a membrane material having high perm-selectivity to a specific gas ingredient and to control the material to have a structure capable of exhibiting sufficient permeance.

In order to selectively separate gases and concentrate the same through the membrane separation, the membrane must generally have an asymmetric structure comprising a dense selective-separation layer arranged on the surface of the membrane and a porous supporter with a minimum permeation resistance arranged on the bottom of the membrane. One membrane property, i.e., selectivity, is determined depending upon the structure of the selective-separation layer. Another membrane property, i.e., permeability, depends on the thickness of the selective-separation layer and the porosity level of the lower structure, i.e., the porous supporter of the asymmetric membrane. Furthermore, to selectively separate a mixture of gases, the separation layer must be free from surface defects and have a fine pore size.

Since a system using a gas separation membrane module was developed in 1977 by the Monsanto Company under the trade name "Prism", gas separation processes using polymer membranes has been first available commercially. The gas separation process has shown a gradual increase in annual gas separation market share due to low energy consumption and low installation cost, as compared to conventional methods.

Since a cellulose acetate semi-permeation membrane having an asymmetric structure as disclosed in U.S. Pat. No. 3,133,132 was developed, a great deal of research has been conducted on polymeric membranes and various polymers are being prepared into hollow fibers using phase inversion methods.

General methods for preparing asymmetric hollow fiber membranes using phase-inversion are wet-spinning and dry-jet-wet spinning. A representative hollow fiber preparation process using dry-jet-wet spinning comprises the following four steps, (1) spinning hollow fibers with a polymeric dope solution, (2) bringing the hollow fibers into contact with air to evaporate volatile ingredients therefrom, (3) precipitating the resulting fibers in a coagulation bath, and (4) subjecting the fibers to post-treatment including washing, drying and the like.

Organic polymers such as polysulfones, polycarbonates, polypyrrolones, polyarylates, cellulose acetates and polyimides are widely used as hollow fiber membrane materials for gas separation. Various attempts have been made to impart permeability and selectivity for a specific gas to polyimide membranes having superior chemical and thermal stability among these polymer materials for gas separation. However, in general polymeric membrane, permeability and selectivity are inversely proportional.

For example. U.S. Pat. No. 4,880,442 discloses polyimide membranes wherein a large free volume is imparted to polymeric chains and permeability is improved using non-rigid anhydrides. Furthermore, U.S. Pat. No. 4,717,393 discloses crosslinked polyimide membranes exhibiting high gas selectivity and superior stability, as compared to conventional polyimide gas separation membranes. In addition, U.S. Pat. Nos. 4,851,505 and 4,912,197 disclose polyimide gas separation membranes capable of reducing the difficulty of polymer processing due to superior solubility in generally-used solvents. In addition, PCT Publication No. WO 2005/007277 discloses defect-free asymmetric membranes comprising polyimide and another polymer selected from the group consisting of polyvinylpyrrolidones, sulfonated polyetheretherketones and mixtures thereof.

However, polymeric materials having membrane performance available commercially for use in gas separation (in the case of air separation, oxygen permeability is 1 Barrer or higher, and oxygen/nitrogen selectivity is 6.0 or higher) are limited to only a few types. This is because there is considerable limitation in improving polymeric structures, and great compatibility between permeability and selectivity makes it difficult to obtain separation and permeation capabilities beyond a predetermined upperbound.

Furthermore, conventional polymeric membrane materials have a limitation of permeation and separation properties and disadvantages in that they undergo decomposition and aging upon a long-term exposure to high pressure and high temperature processes or to gas mixtures containing hydrocarbon, aromatic and polar solvents, thus causing a considerable decrease in inherent membrane performance. Due to these problems, in spite of their high economic value, gas separation processes are utilized in considerably limited applications to date.

Accordingly, there is an increasing demand for development of polymeric materials capable of achieving both high permeability and superior selectivity, and novel gas separation membranes using the same.

In accordance with such demand, a great deal of research has been conducted to modify polymers into ideal structures that exhibit superior gas permeability and selectivity, and have a desired pore size.

SUMMARY OF THE INVENTION

One aspect of the present invention provides a hollow fiber having gas permeability and selectivity.

Another aspect of the present invention provides a dope solution composition for forming a hollow fiber.

Further aspect of the present invention provides a method of preparing a hollow fiber using the dope solution composition for forming a hollow fiber.

According to one aspect of the present invention, a hollow fiber is provided that includes a hollow positioned at the center of the hollow fiber, macropores positioned at adjacent to the hollow, and mesopores and picopores positioned—at adjacent to macropores, and the picopores are three dimensionally connected to each other to form a three dimensional network structure. The hollow fiber includes a polymer derived from polyamic acid, and the polyamic acid includes a repeating unit obtained from aromatic diamine including at least one ortho-positioned functional group with respect to an amine group and dianhydride.

The hollow fiber may include a dense layer (effective thin layer) including picopores at a surface portion, and the dense layer has a structure where the number of the picopores increases as near to the surface of the hollow fiber.

The three dimensional network structure where at least two picopores are three-dimensionally connected includes a hourglass shaped structure forming a narrow valley at connection parts.

The ortho-positioned functional group with respect to the amine group may include OH, SH, or $NH_2$.

The polymer derived from polyamic acid has a fractional free volume (FFV) of about 0.15 to about 0.40, d-spacing of about 580 pm to about 800 pm measured by X-ray diffraction (XRD).

The polymer derived from polyamic acid includes picopores, and the picopores has a full width at half maximum (FWHM) of about 10 pm to about 40 pm measured by positron annihilation lifetime spectroscopy (PALS).

The polymer derived from polyamic acid has a BET surface area of about 100 to about 1,000 $m^2/g$.

The polyamic acid may be selected from the group consisting of polyamic acid represented by the following Chemical Formulae 1 to 4, polyamic acid copolymers represented by the following Chemical Formulae 5 to 8, copolymers thereof, and blends thereof.

[Chemical Formula 1]

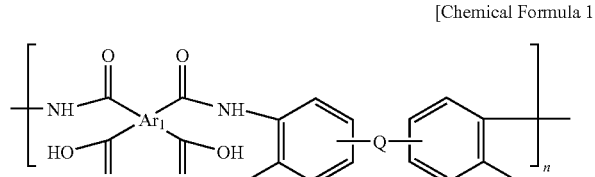

[Chemical Formula 2]

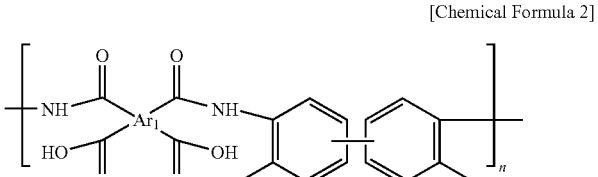

[Chemical Formula 3]

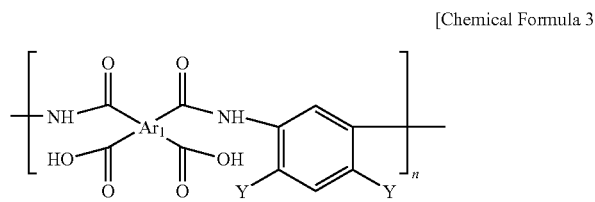

[Chemical Formula 4]

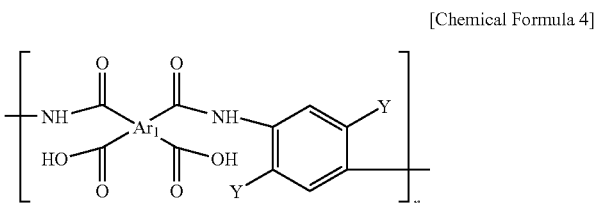

[Chemical Formula 5]

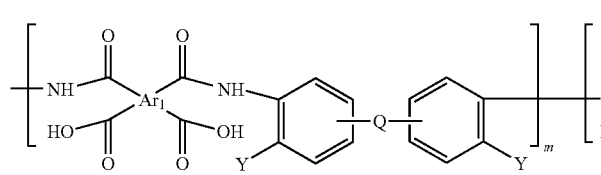

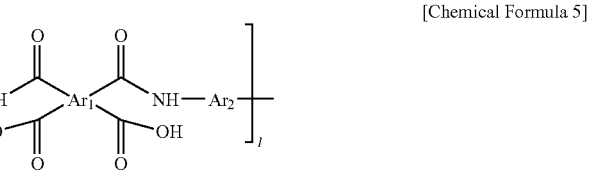

[Chemical Formula 6]

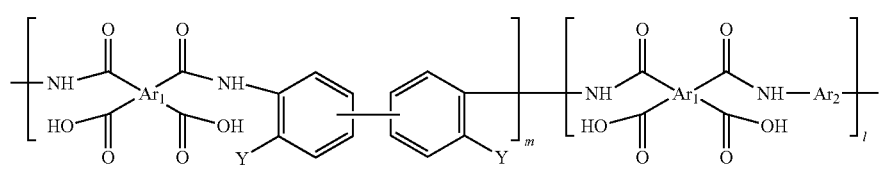

[Chemical Formula 7]

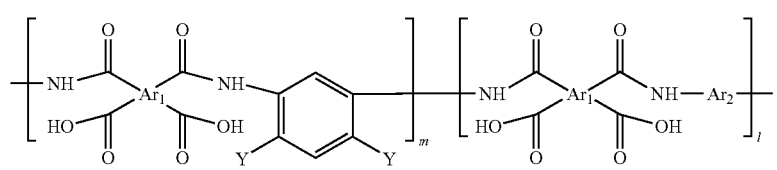

[Chemical Formula 8]

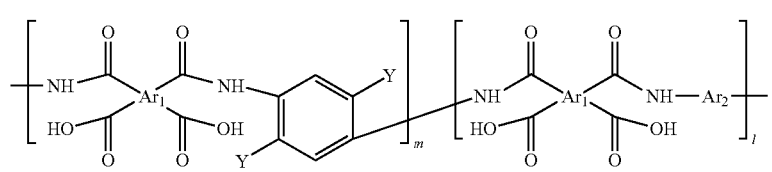

In the above Chemical Formulae 1 to 8, $Ar_1$ is an aromatic group selected from a substituted or unsubstituted quadrivalent C6 to C24 arylene group and a substituted or unsubstituted quadrivalent C4 to C24 heterocyclic group, where the aromatic group is present singularly; at least two aromatic groups are fused to form a condensed cycle; or at least two aromatic groups are linked by single bond or a functional group selected from O, S, C(=O), S(=O)$_2$, Si(CH$_3$)$_2$, (CH$_2$)$_p$ (where $1 \leq p1 \leq 10$), (CF$_2$)$_q$ (where $1 \leq q \leq 10$), C(CH$_3$)$_2$, C(CH$_3$)$_2$, or C(=O)NH.

$Ar_2$ is an aromatic group selected from a substituted or unsubstituted divalent C6 to C24 arylene group and a substituted or unsubstituted divalent C4 to C24 heterocyclic group, where the aromatic group is present singularly; at least two aromatic groups are fused to form a condensed cycle; or at least two aromatic groups are linked by single bond or a functional group selected from O, S, C(=O), S(=O)$_2$, Si(CH$_3$)$_2$, (CH$_2$)$_p$ (where $1 \leq p \leq 10$), (CF$_2$), (where $1 \leq q \leq 10$), C(CH$_3$)$_2$, C(CF$_3$)$_2$, or C(=O)NH.

Q is O, S, C(=O), CH(OH), S(=O)$_2$, Si(CH$_3$)$_2$, (CH$_2$)$_p$ (where $1 \leq p \leq 10$), (CF$_2$)$_q$ (where $1 \leq q \leq 10$), C(CH$_3$)$_2$, C(CF$_3$)$_2$, C(=O)NH, C(CH$_3$)(CF$_3$), or a substituted or unsubstituted phenylene group (where the substituted phenylene group is a phenylene group substituted with a C1 to C6 alkyl group or a C1 to C6 haloalkyl group), where the Q is linked with aromatic groups with m-m, m-p, p-m, or p-p positions, Y is the same or different from each other in each repeating unit and independently selected from OH, SH, or NH$_2$, n is an integer ranging from 20 to 200, m is an integer ranging from 10 to 400, and l is an integer ranging from 10 to 400.

The polymer may include a polymer represented by one of the following Chemical Formulae 19 to 32, or copolymers thereof.

[Chemical Formula 19]

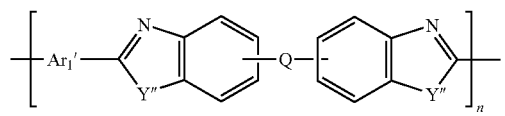

[Chemical Formula 20]

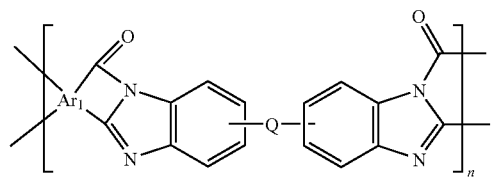

[Chemical Formula 21]

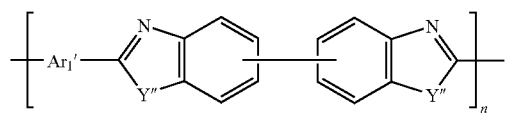

[Chemical Formula 22]

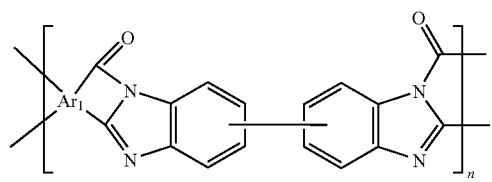

[Chemical Formula 23]

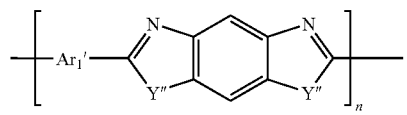

[Chemical Formula 24]

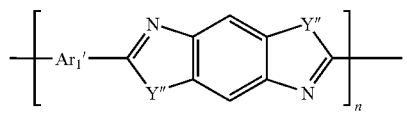

[Chemical Formula 25]

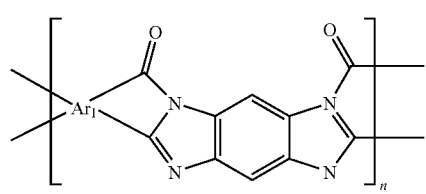

[Chemical Formula 26]

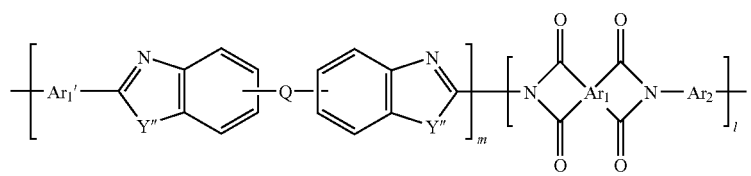

[Chemical Formula 27]

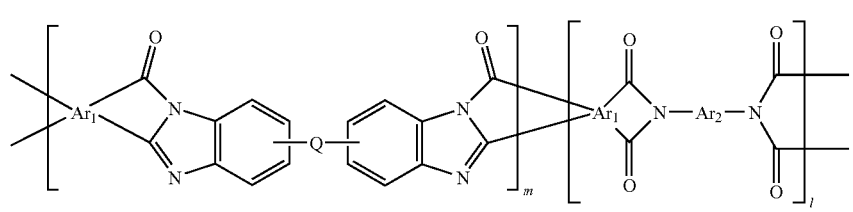

[Chemical Formula 28]

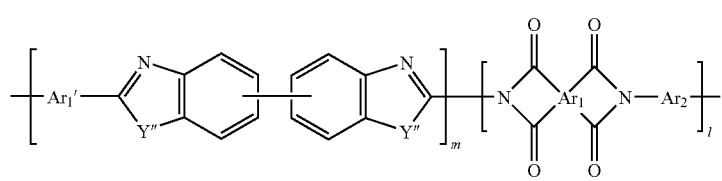

[Chemical Formula 29]

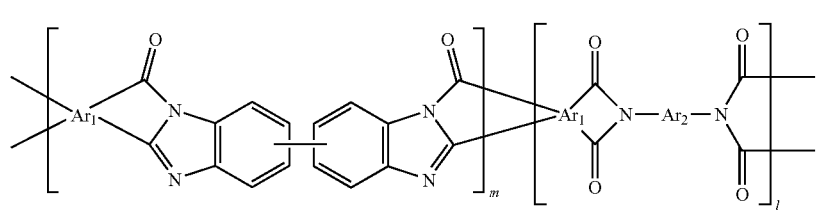

[Chemical Formula 30]

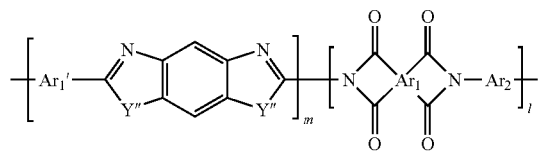

[Chemical Formula 31]

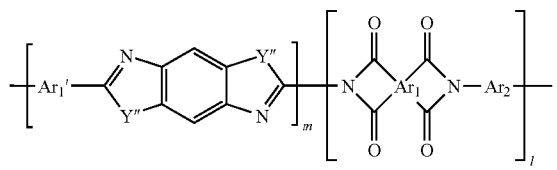

[Chemical Formula 32]

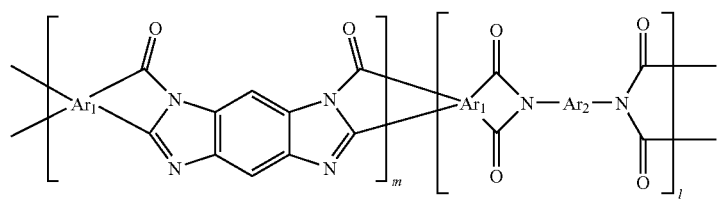

In the above Chemical Formulae 19 to 32, $Ar_1$, $Ar_2$, Q, n, m, and l are the same as defined in the above Chemical Formulae 1 to 8, $Ar_1'$ is an aromatic group selected from a substituted or unsubstituted divalent C6 to C24 arylene group and a substituted or unsubstituted divalent C4 to C24 heterocyclic group, where the aromatic group is present singularly; at least two aromatic groups are fused to form a condensed cycle; or at least two aromatic groups are linked by single bond or a functional group selected from O, S, C(=O), S(=O)$_2$, Si(CH$_3$)$_2$, (CH$_2$)$_p$ (where $1 \leq p \leq 10$), (CF$_2$)$_q$ (where $1 \leq q \leq 10$)$_2$, C(CH$_3$)$_2$, C(CF$_3$)$_2$, or C(=O)NH, and Y" is O or S.

The hollow fiber may be applicable as a gas separation membrane for separating at least one selected from the group consisting of He, H$_2$, N$_2$, CH$_4$, O$_2$, N$_2$, and CO$_2$.

The hollow fiber may have O$_2$/N$_2$ selectivity of 4 or more, CO$_2$/CH$_4$ selectivity of 30 or more, H$_2$/N$_2$ selectivity of 30 or more, H$_2$/CH$_4$ selectivity of 50 or more, CO$_2$/N$_2$ selectivity of 20 or more, and He/N$_2$ selectivity of 40 or more. In one embodiment, the hollow fiber may have O$_2$/N$_2$ selectivity of 4 to 20, $CO_2/CH_4$ selectivity of 30 to 80, $H_2/N_2$ selectivity of 30 to 80, $H_2/CH_4$ selectivity of 50 to 90, $CO_2/N_2$ selectivity of 20 to 50, and $He/N_2$ selectivity of 40 to 120.

Another aspect of the present invention, a dope solution composition for forming a hollow fiber is provided that includes polyamic acid including a repeating unit prepared from aromatic diamine including at least one ortho-positioned functional group and dianhydride, an organic solvent, and an additive.

The organic solvent includes one selected from the group consisting of dimethylsulfoxide; N-methyl-2-pyrrolidone; N,N-dimethyl formamide; N,N-dimethyl acetamide; alcohols selected from the group consisting of methanol, ethanol, 2-methyl-1-butanol, and 2-methyl-2-butanol; ketones selected from the group consisting of γ-butyrolactone, cyclohexanone, 3-hexanone, 3-heptanone, 3-octanone, acetone and methyl ethyl ketone; tetrahydrofuran; trichloroethane; and combinations thereof.

The additive includes one selected from the group consisting of water; alcohols selected from the group consisting of glycerol, ethylene glycol, propylene glycol, and diethylene glycol; polymer compounds selected from the group consisting of polyvinyl alcohol, polyacrylic acid, polyacryl amide, polyethylene glycol, polypropylene glycol, chitosan, chitin, dextran, and polyvinyl pyrrolidone; salts selected from the group consisting of lithium chloride, sodium chloride, calcium chloride, lithium acetate, sodium sulfate, and sodium hydroxide; and combinations thereof.

The ortho-positioned functional group with respect to the amine group may include OH, SH, or $NH_2$.

The dope solution composition for forming a hollow fiber includes about 10 to about 45 wt % of the polyamic acid, about 25 to about 70 wt % of the organic solvent, and about 2 to about 30 wt % of the additive.

The dope solution composition for forming a hollow fiber has a viscosity of about 2 Pa·s to about 200 Pa·s.

The polyamic acid has a weight average molecular weight (Mw) of about 10,000 to about 200,000.

In the dope solution composition for forming a hollow fiber, the polyamic acid may be selected from the group consisting of polyamic acid represented by the following Chemical Formulae 1 to 4, polyamic acid copolymers represented by the following Chemical Formulae 5 to 8, copolymers thereof, and blends thereof.

Another aspect of the present invention, a method of preparing a hollow fiber is provided that includes spinning the dope solution composition to prepare a polyamic acid hollow fiber, subjecting the polyamic acid hollow fiber to imidization to obtain a polyimide hollow fiber, and heat-treating the polyimide hollow fiber to obtain a hollow fiber including thermally rearranged polymer. The hollow fiber includes a hollow positioned at the center of the hollow fiber, macropores positioned at adjacent to the hollow, and mesopores and picopores positioned at adjacent to macropores, and the picopores are three dimensionally connected to each other to form a three dimensional network structure.

The thermally rearranged polymer may include polymers represented by one of the above Chemical Formulae 19 to 32 or copolymers thereof.

The polyimide hollow fiber may include polyimide represented by one of the above Chemical Formulae 33 to 40, copolymers thereof, and blends thereof.

[Chemical Formula 33]

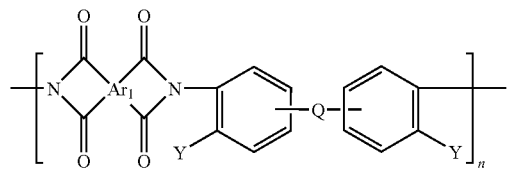

[Chemical Formula 34]

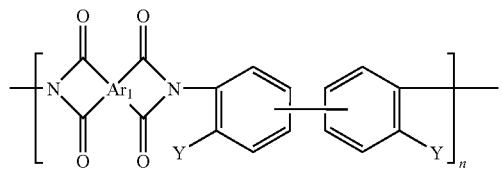

[Chemical Formula 35]

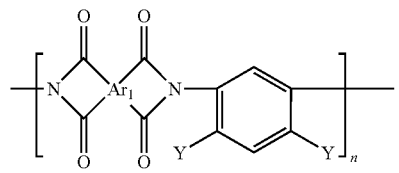

[Chemical Formula 36]

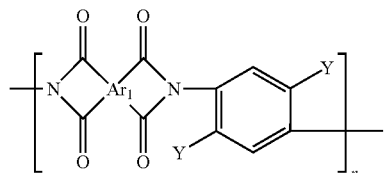

[Chemical Formula 37]

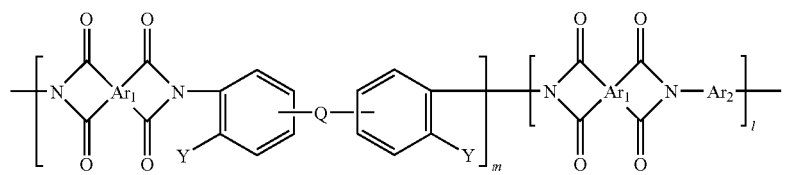

[Chemical Formula 38]

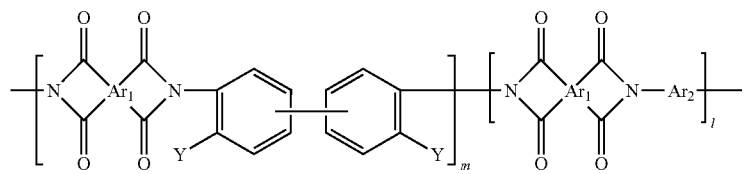

[Chemical Formula 39]

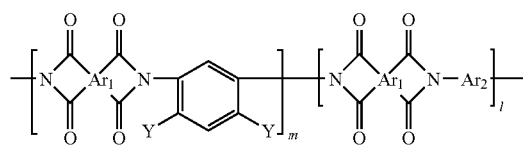

[Chemical Formula 40]

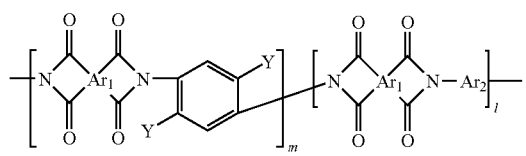

In the above Chemical Formulae 33 to 40, $Ar_1$, $Ar_2$, Q, Y, n, m and l are the same as in the above Chemical Formulae 1 to 8.

The heat treatment may be performed after imidization by increasing a temperature at 10 to 30° C./min up to 400 to 550° C., and then maintaining the temperature for 1 minute to 1 hour under an inert atmosphere.

In the above Chemical Formulae 1 to 8 and Chemical Formulae 19 to 40, $Ar_1$ may be selected from one of the following Chemical Formulae.

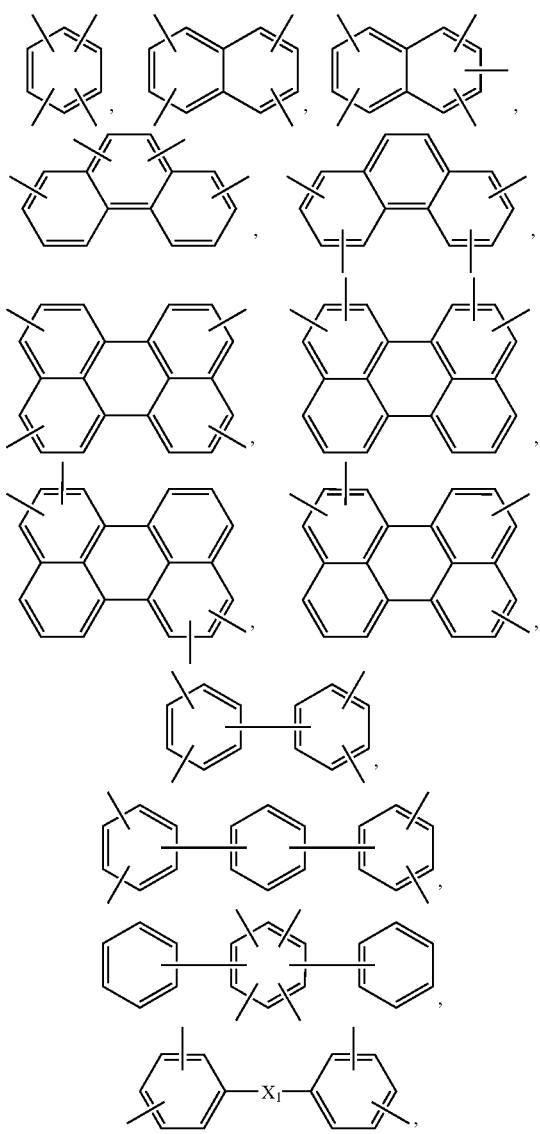

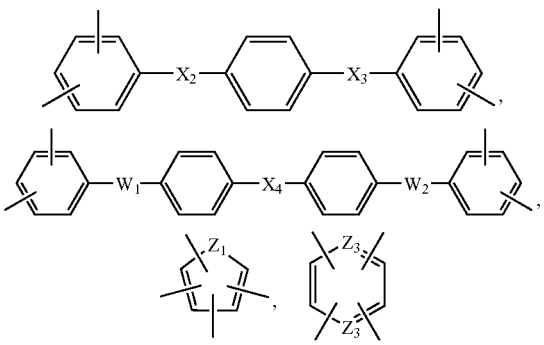

In the above formulae, $X_1$, $X_2$, $X_3$, and $X_4$ are the same or different and independently O, S, C(=O), CH(OH), S(=O)$_2$, Si(CH$_3$)$_2$, (CH$_2$)$_p$ (where $1 \leq p \leq 10$), (CF$_2$)$_q$ (where $1 \leq q \leq 10$), C(CH$_3$)$_2$, C(CF$_3$)$_2$, or C(=O)NH, $W_1$ and $W_2$ are the same or different, and independently O, S, or C(=O), $Z_1$ is O, S, CR$_1$R$_2$ or NR$_3$, where R$_1$, R$_2$, and R$_3$ are the same or different from each other and independently hydrogen or a C1 to C5 alkyl group, and $Z_2$ and $Z_3$ are the same or different from each other and independently N or CR$_4$ (where, R$_4$ is hydrogen or a C1 to C5 alkyl group), provided that both $Z_2$ and $Z_3$ are not CR$_4$.

In the above Chemical Formulae 1 to 8 and Chemical Formula 19 to Chemical Formula 40, specific examples of $Ar_1$ may be selected from one of the following formulae.

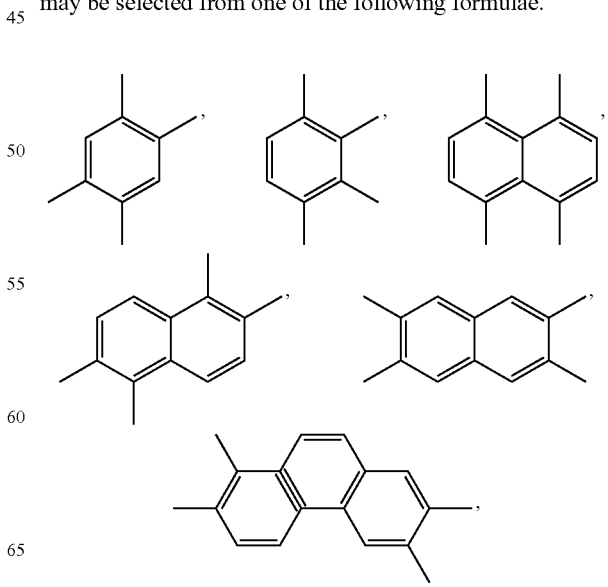

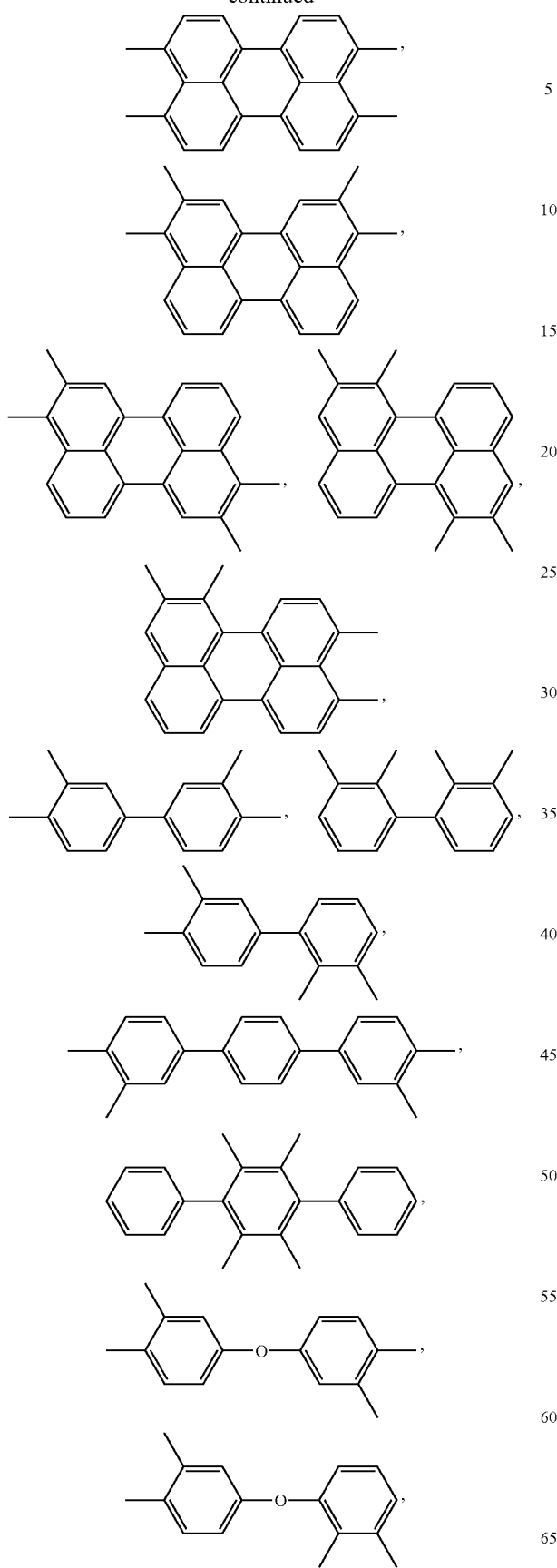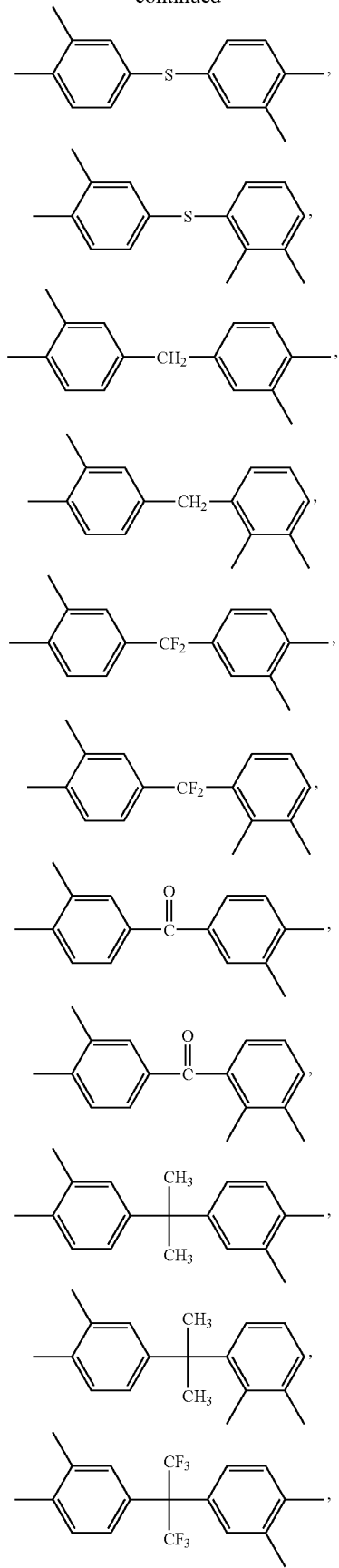

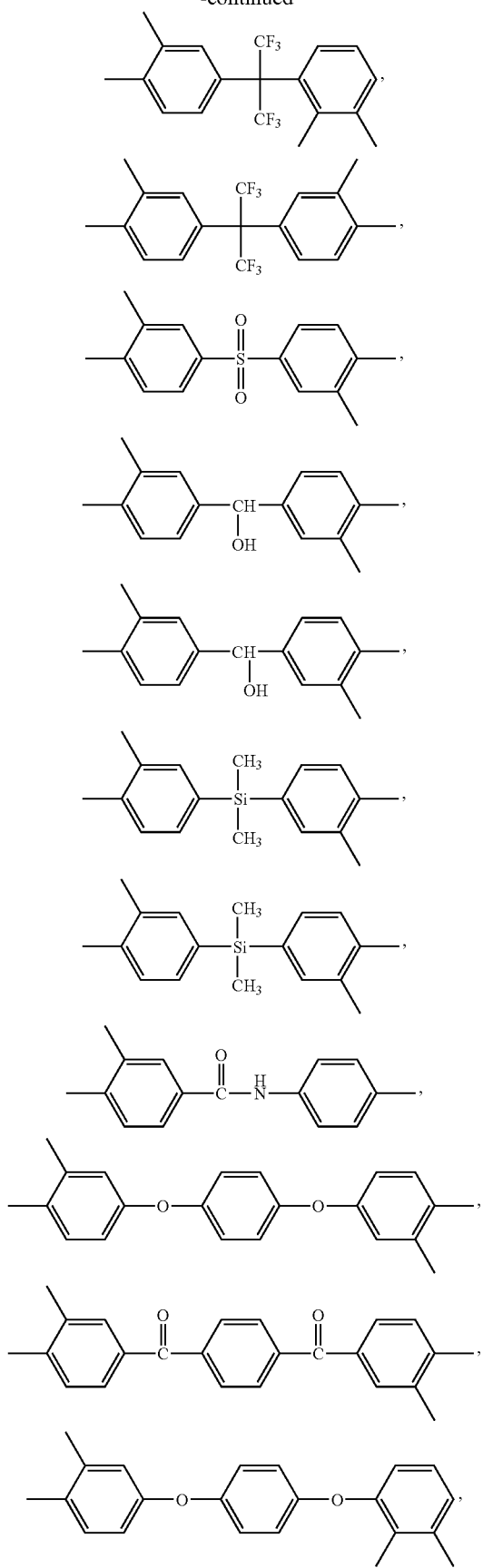
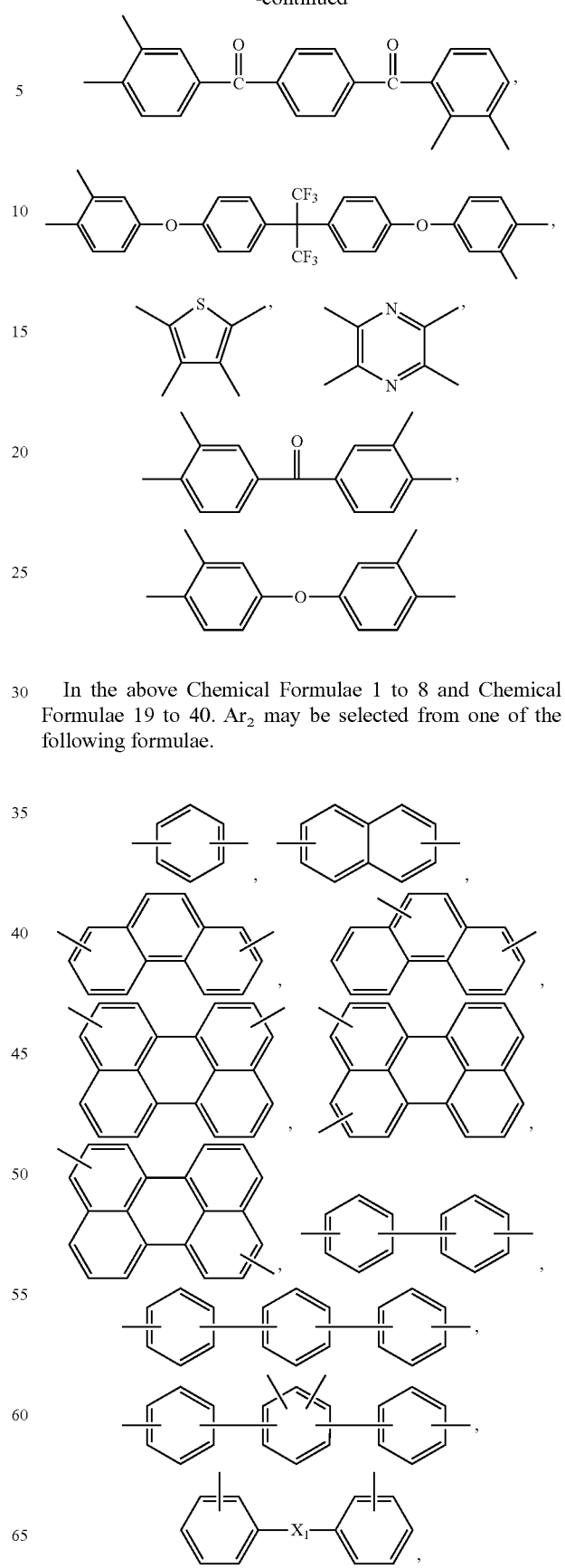
In the above Chemical Formulae 1 to 8 and Chemical Formulae 19 to 40, Ar$_2$ may be selected from one of the following formulae.

-continued

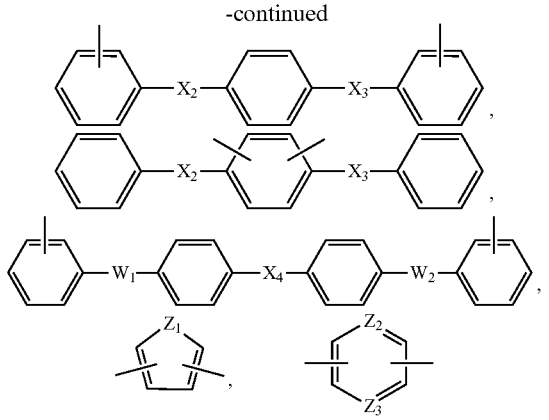

In the above Chemical Formulae, $X_1$, $X_2$, $X_3$, and $X_4$ are the same or different and independently O, S, C(=O), CH(OH), S(=O)$_2$, Si(CH$_3$)$_2$, (CH$_2$)$_p$ (where $1 \leq p \leq 10$), (CF$_2$)$_q$ (where $1 \leq q \leq 10$), C(CH$_3$)$_2$, C(CF$_3$)$_2$, or C(=O)NH.

$W_1$ and $W_2$ are the same or different, and independently O, S, or C(=O), $Z_1$ is O, S, CR$_1$R$_2$ or NR$_3$, where R$_1$, R$_2$, and R$_3$ are the same or different from each other and independently hydrogen or a C1 to C5 alkyl group, and $Z_2$ and $Z_3$ are the same or different from each other and independently N or CR$_4$ (where, R$_4$ is hydrogen or a C1 to C5 alkyl group), provided that both $Z_2$ and $Z_3$ are not CR$_4$.

In the above Chemical Formulae 1 to 8 and Chemical Formulae 19 to 40, specific examples of Ar$_2$ may be selected from one of the following formulae.

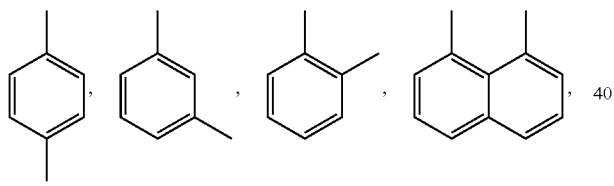

-continued

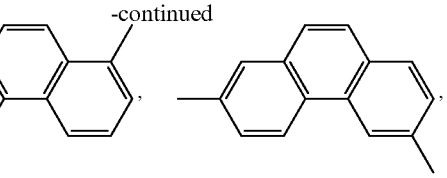

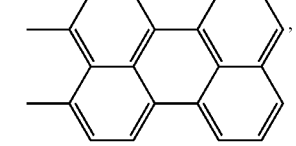

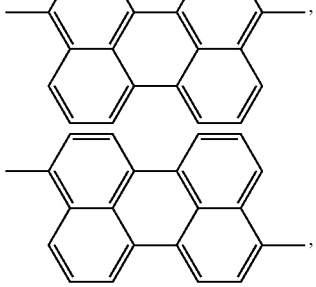

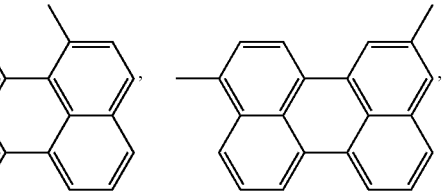

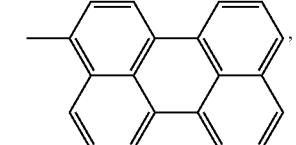

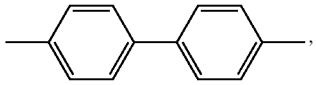

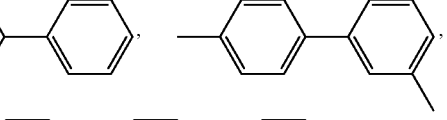

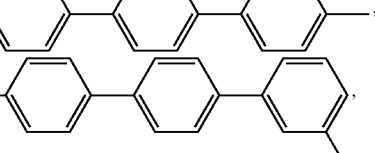

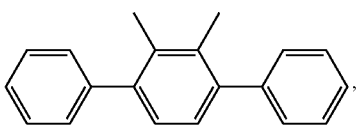

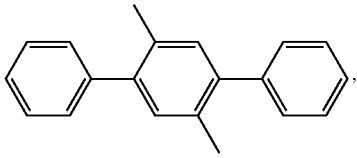

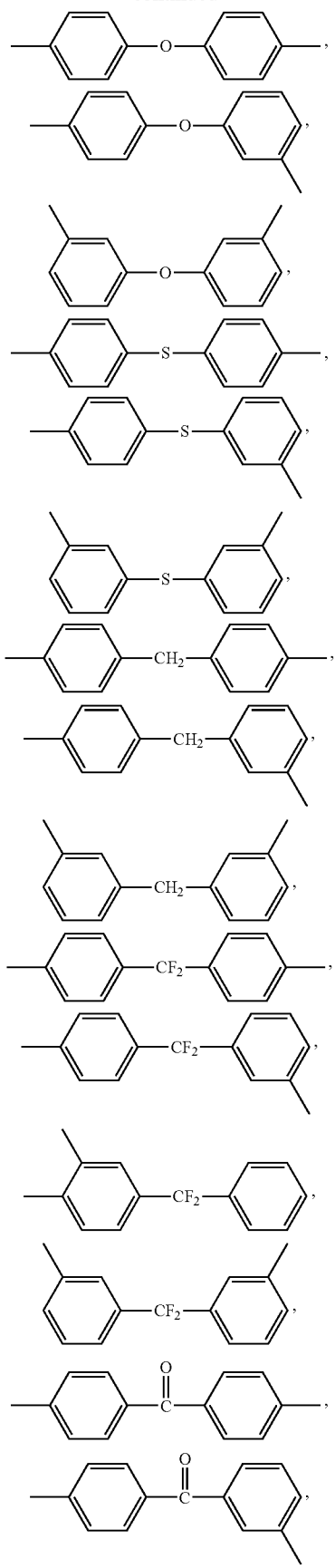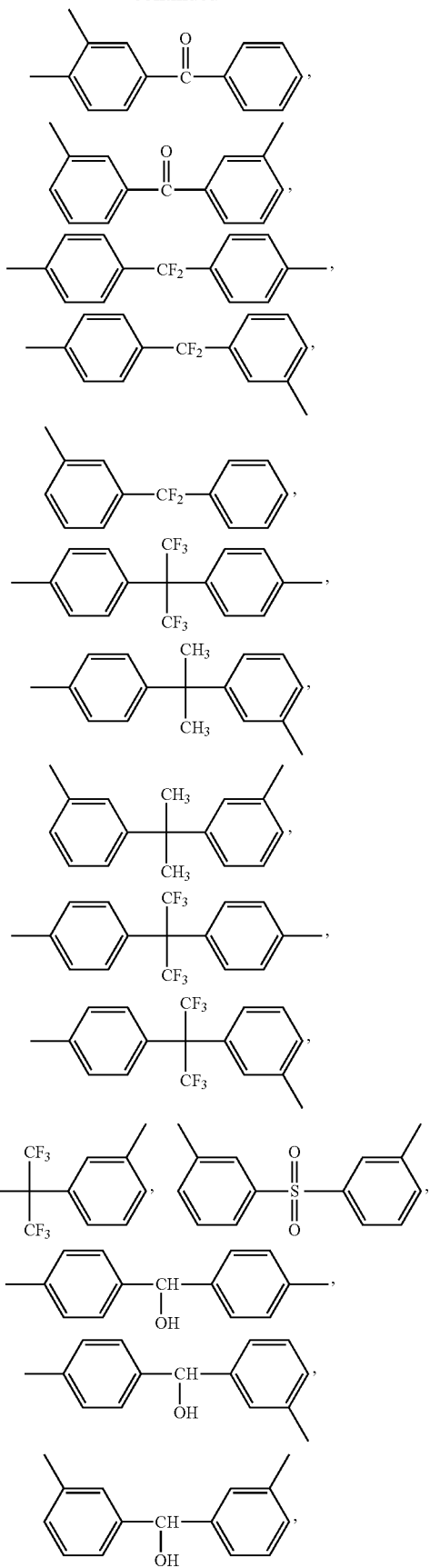

-continued

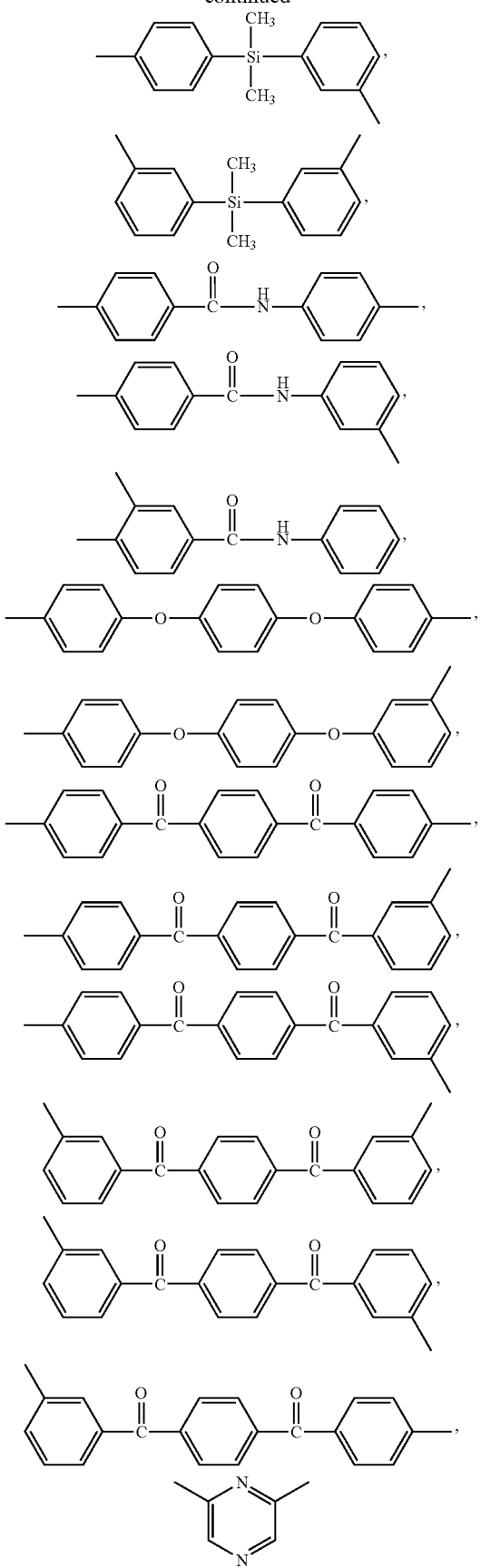

-continued

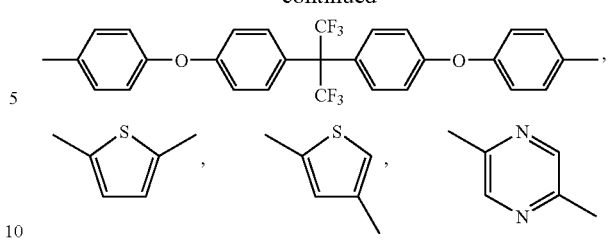

In the above Chemical Formulae 1 to 8 and Chemical Formulae 19 to 40, Q is selected from $C(CH_3)_2$, $C(CF_3)_2$, O, S, $S(=O)_2$, and $C(=O)$.

In the above Chemical Formulae 19 to 32, specific examples of $Ar_1'$ are the same as in those of $Ar_2$ of the above Chemical Formulae 1 to 8 and Chemical Formulae 19 to 40.

In the above Chemical Formulae 1 to 8, $Ar_1$ may be a functional group represented by the following Chemical Formula A, B or C, $Ar_2$ may be a functional group represented by the following Chemical Formula D or E, and Q may be $C(CF_3)_2$.

[Chemical Formula A]

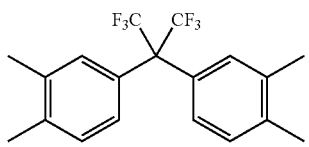

[Chemical Formula B]

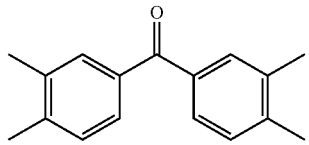

[Chemical Formula C]

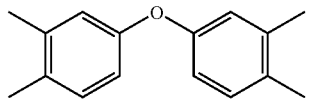

[Chemical Formula D]

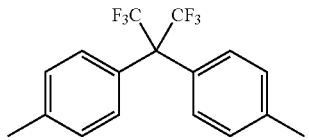

[Chemical Formula E]

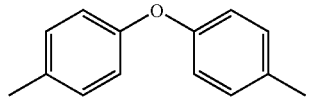

In the above Chemical Formulae 19 to 32, $Ar_1$ may be a functional group represented by the following Chemical Formula A, B or C, $Ar_1'$ may be a functional group represented by the following Chemical Formula F, G, or H, $Ar_2$ may be a functional group represented by the following Chemical Formula D or E, and Q may be $C(CF_3)_2$.

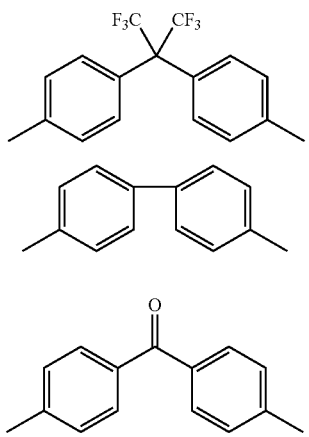

[Chemical Formula F]

[Chemical Formula G]

[Chemical Formula H]

In the polyamic acid copolymer including repeating units represented by the above Chemical Formulae 1 to 4 and the polyamic acid copolymer represented by the above Chemical Formula 5 to 8, a mole ratio of each repeating unit and an m:l mole ratio range from 0.1:9.9 to 9.9:0.1.

Hereinafter, further embodiments of the present invention will be described in detail.

The hollow fiber has excellent gas permeability, selectivity, mechanical strength, and chemical stability, and good endurance to stringent condition such as long operation time, acidic conditions, and high humidity.

DETAILED DESCRIPTION OF THE INVENTION

Figure 1:
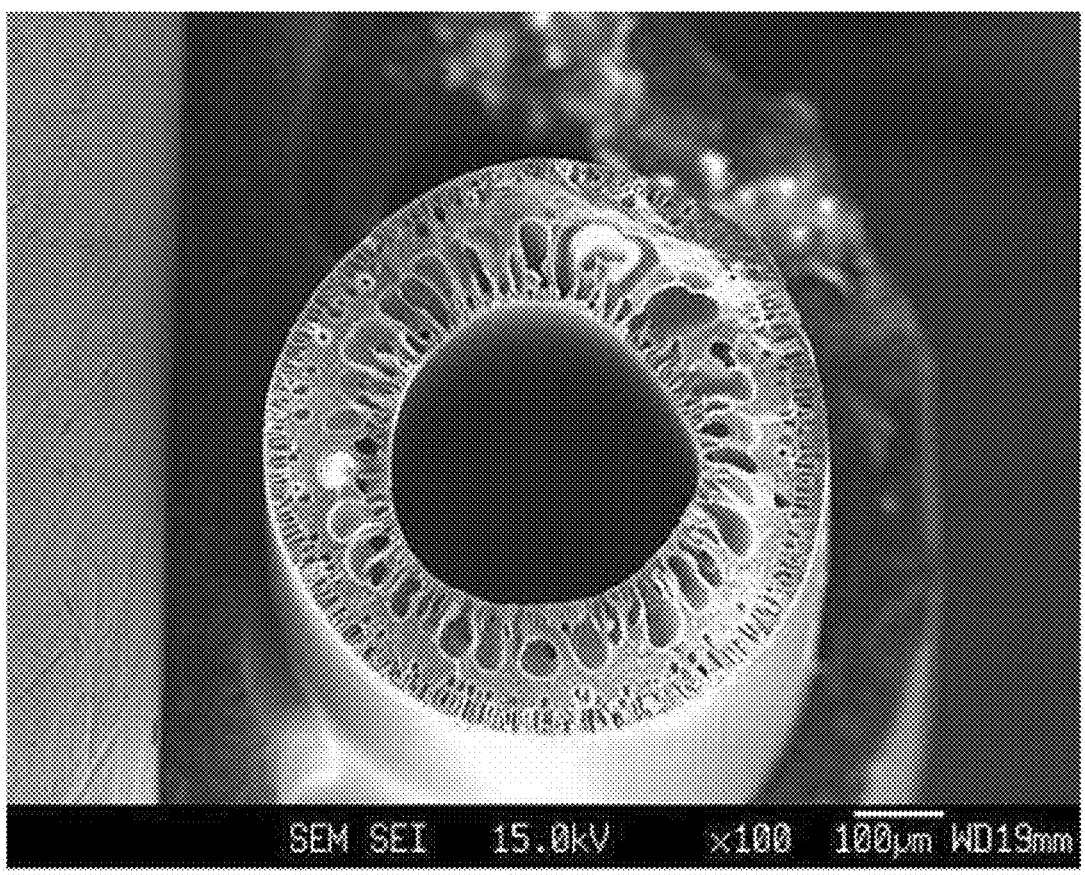
FIG. 1 is a cross-sectional scanning electron microscope (SEM) image of a hollow fiber prepared in Example 1 at 100× magnification.

This application is a continuation-in-part application of U.S. patent application Ser. No. 12/248,294, filed on Oct. 9, 2008, which is incorporated by reference herein in its entirety.

Exemplary embodiments of the present invention will hereinafter be described in detail. However, these embodiments are only exemplary, and the present invention is not limited thereto.

As used herein, when a specific definition is not provided, the term "surface portion" refers to an outer surface portion, an inner surface portion, or outer surface portion/inner surface portion of a hollow fiber, and the term "surface" refers to an outer surface, an inner surface, or outer surface/inner surface of a hollow fiber. The term "picopore" refers to a pore (cavity) having an average diameter of hundreds of picometers, and in one embodiment having 100 picometers to 1000 picometers. The term "mesopore" refers to a pore (cavity) having an average diameter of 2 to 50 nanometers, and the term "macropore" refers to a pore (cavity) having an average diameter of more than 50 nanometers.

As used herein, when a specific definition is not provided, the term "substituted" refers to a compound or a functional group where hydrogen is substituted with at least one substituent selected from the group consisting of a C1 to C10 alkyl group, a C1 to C10 alkoxy group, a C1 to C10 haloalkyl group, and a C1 to C10 haloalkoxy group. The term, "hetero cyclic group" refers to a C3 to C30 heterocycloalkyl group, a C3 to C30 heterocycloalkenyl group, or a C3 to C30 heteroaryl group including 1 to 3 heteroatoms selected from the group consisting of O, S, N, P, Si, and combinations thereof. The term "copolymer" refers to a block copolymer to a random copolymer.

The hollow fiber according to one embodiment of the present invention includes a hollow positioned at the center of the hollow fiber, macropores positioned at adjacent to the hollow, and mesopores and picopores positioned at adjacent to macropores, and the picopores are three dimensionally connected to each other to form a three dimensional network structure. The hollow fiber includes a polymer derived from polyamic acid, and the polyamic acid includes a repeating unit obtained from aromatic diamine including at least one ortho-positioned functional group with respect to an amine group and dianhydride.

The hollow fiber may include a dense layer (effective thin layer) including picopores at a surface portion. The hollow fiber is capable of separating gases selectively and efficiently due to such a dense layer. The dense layer may have a thickness ranging from 50 nm to 1 μm.

The dense layer has a structure where the number of the picopores increases as near to the surface of the hollow fiber. Thereby, at the hollow fiber surface, selective gas separation may be realized, and at a lower of the membrane, gas concentration may be efficiently realized.

The three dimensional network structure where at least two picopores are three-dimensionally connected includes a hourglass shaped structure forming a narrow valley at connection parts. The hourglass shaped structure forming a narrow valley at connection parts makes gases selective separation and relatively wider picopores than the valley makes separated gases transfer fast.

The ortho-positioned functional group with respect to the amine group may be OH. SH, or $NH_2$. The polyamic acid may be prepared by generally-used method in this art. For example, the polyamic acid may be prepared by reacting aromatic diamine including ortho-positioned OH, SH, or $NH_2$ with respect to the amine group, and tetracarboxylic acid anhydride.

The polyamic acid is thermally rearranged into a polymer such as polybenzoxazole, polybenzothiazole, or polypyrrolone having high fractional free volume in accordance with a method that will be described below. For example, polyhydroxyamic acid having an ortho-positioned OH group with respect to an amine group is thermally rearranged to polybenzoxazole, polythioamic acid having an ortho-positioned SH group with respect to an amine group is thermally rearranged to polybenzothiazole, and polyaminoamic acid having an ortho-positioned $NH_2$ group with respect to an amine group is thermally rearranged to polypyrrolone. The hollow fiber according to one embodiment of the present invention includes the polymer such as polybenzoxazole, polybenzothiazole, or polypyrrolone having high fractional free volume.

The polymer derived from polyamic acid has a fractional free volume (FFV) of about 0.15 to about 0.40, and interplanar distance (d-spacing) of about 580 pm to about 800 pm measured by X-ray diffraction (XRD). The polymer derived from polyamic acid has excellent gas permeability, and the hollow fiber including the polymer derived from polyamic acid is applicable for selective and efficient gas separation.

The polymer derived from polyamic acid includes picopores. The picopores has an average diameter having about 600 pm to about 800 pm. The picopores has a full width at half maximum (FWHM) of about 10 pm to about 40 pm measured by positron annihilation lifetime spectroscopy (PALS). It indicates that the produced picopores have significantly uniform size. Thereby, the hollow including the polymer derived from polyimide is capable of separating gases selectively and stably. The PALS measurement is performed by obtaining time difference, $\tau_1, \tau_2, \tau_3$ and the like between $\gamma_0$ of 1.27 MeV produced by radiation of positron produced from $^{22}Na$ isotope and $\gamma_1$ and $\gamma_2$ of 0.511 MeV produced by annihilation thereafter.

The polymer derived from polyamic acid has a BET (Brunauer, Emmett, Teller) surface area of about 100 to about 1,000 $m^2/g$. When the BET surface area is within the range, surface area appropriate for gas adsorption can be obtained. Thereby, the hollow fiber has excellent selectivity and permeability at separating gases through a solution-diffusion mechanism.

The polyamic acid may be selected from the group consisting of polyimide represented by the following Chemical Formulae 1 to 4, polyamic acid copolymers represented by the following Chemical Formulae 5 to 8, copolymers thereof, and blends thereof, but is not limited thereto.

[Chemical Formula 1]

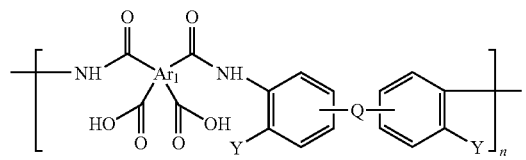

[Chemical Formula 2]

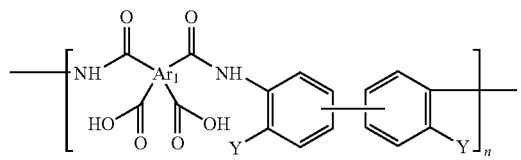

[Chemical Formula 3]

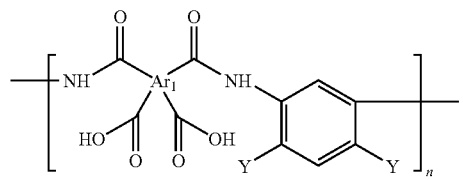

[Chemical Formula 4]

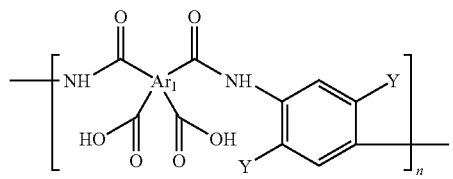

[Chemical Formula 5]

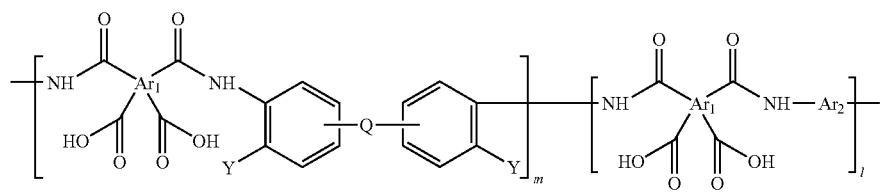

[Chemical Formula 6]

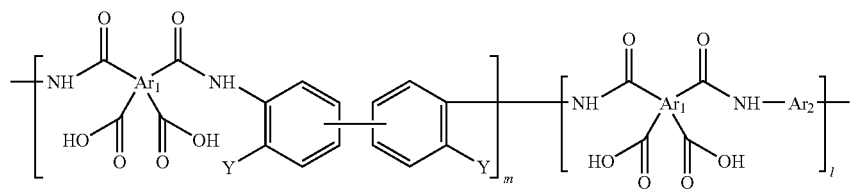

[Chemical Formula 7]

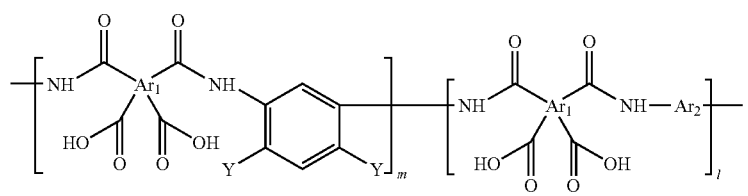

-continued

[Chemical Formula 8]

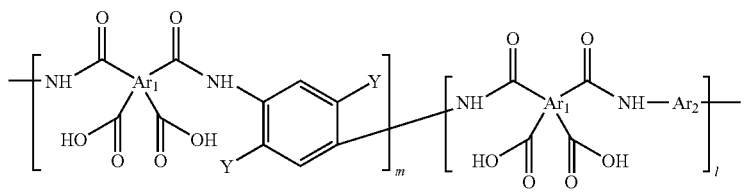

In the above Chemical Formulae 1 to 8, $Ar_1$ is an aromatic group selected from a substituted or unsubstituted quadrivalent C6 to C24 arylene group and a substituted or unsubstituted quadrivalent C4 to C24 heterocyclic group, where the aromatic group is present singularly; at least two aromatic groups are fused to form a condensed cycle; or at least two aromatic groups are linked by single bond or a functional group selected from O, S, C(=O), S(=O)$_2$, Si(CH$_3$)$_2$, (CH$_2$)$_p$ (where $1 \leq p \leq 10$), (CF$_2$)$_q$ (where $1 \leq q \leq 10$), C(CH$_3$)$_2$, C(CF$_3$)$_2$, or C(=O)NH, $Ar_2$ is an aromatic group selected from a substituted or unsubstituted divalent C6 to C24 arylene group and a substituted or unsubstituted divalent C4 to C24 heterocyclic group, where the aromatic group is present singularly; at least two aromatic groups are fused to form a condensed cycle; or at least two aromatic groups are linked by single bond or a functional group selected from O, S, C(=O), S(=O)$_2$, Si(CH$_3$)$_2$, (CH$_2$)$_p$ (where $1 \leq p \leq 10$), (CF$_2$)$_q$ (where $1 \leq q \leq 10$), C(CH$_3$)$_2$, C(CF$_3$)$_2$, or C(=O)NH, Q is O, S, C(=O), CH(OH), S(=O)$_2$, Si(CH$_3$)$_2$, (CH$_2$)$_p$ (where $1 \leq p \leq 10$), (CF$_2$)$_q$ (where $1 \leq q \leq 10$), C(CH$_3$)$_2$, C(CF$_3$)$_2$, C(=O)NH, C(CH$_3$)(CF$_3$), or a substituted or unsubstituted phenylene group (where the substituted phenylene group is a phenylene group substituted with a C1 to C6 alkyl group or a C1 to C6 haloalkyl group), where the Q is linked with aromatic groups with m-m, m-p, p-m, or p-p positions, Y is the same or different from each other in each repeating unit and independently selected from OH, SH, or NH$_2$, n is an integer ranging from 20 to 200, m is an integer ranging from 10 to 400, and l is an integer ranging from 10 to 400.

Examples of the copolymers of the polyamic acid represented by the above Chemical Formula 1 to 4 include polyamic acid copolymers represented by the following Chemical Formulae 9 to 18.

[Chemical Formula 9]

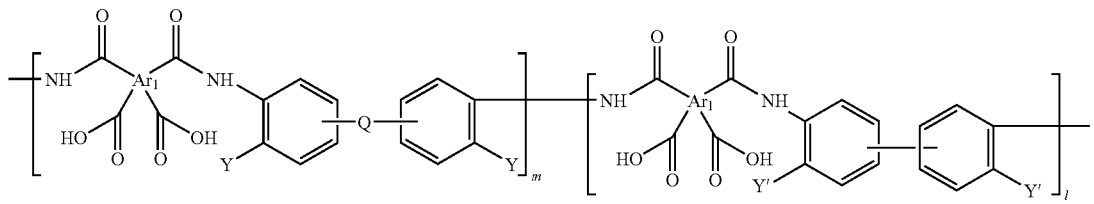

[Chemical Formula 10]

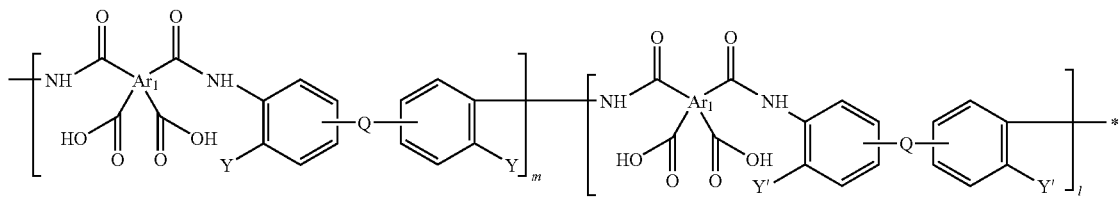

[Chemical Formula 11]

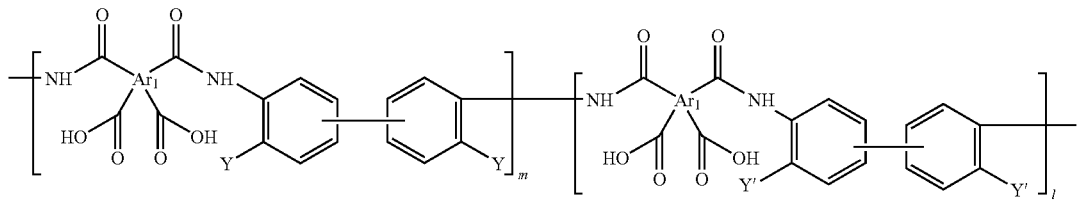

[Chemical Formula 12]

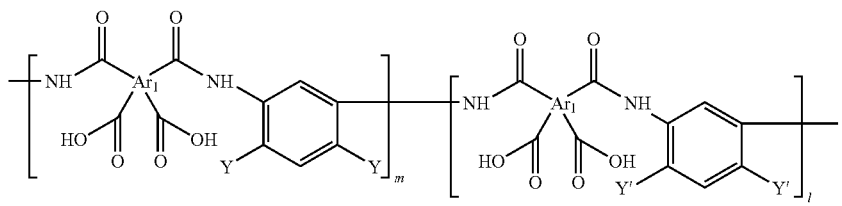

-continued
[Chemical Formula 13]
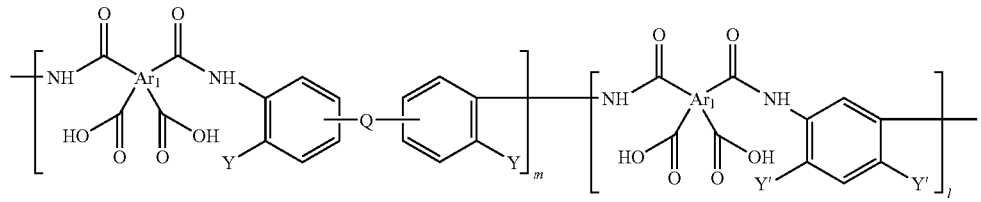
[Chemical Formula 14]
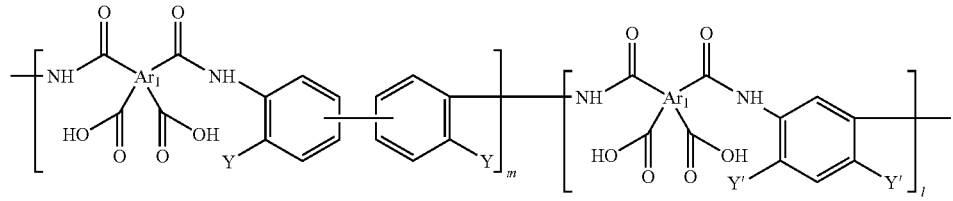
[Chemical Formula 15]
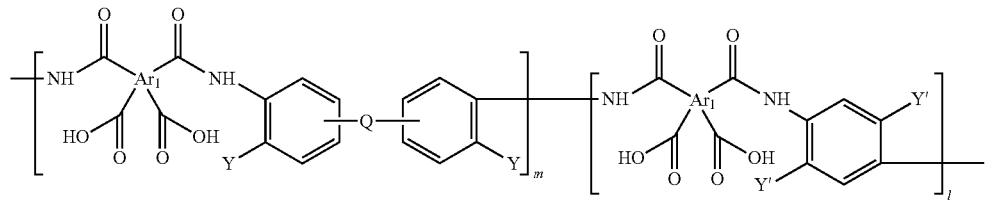
[Chemical Formula 16]
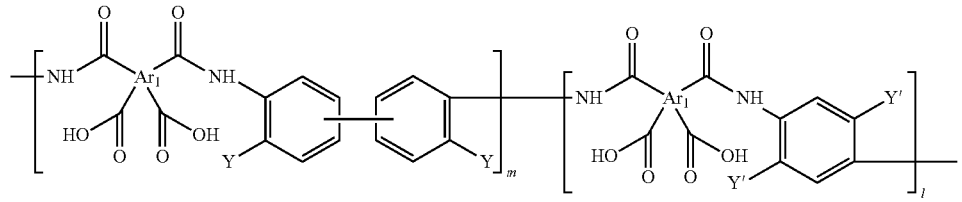
[Chemical Formula 17]
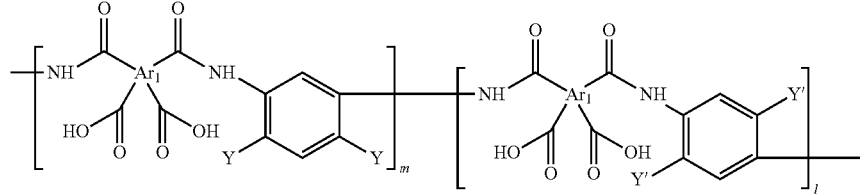
[Chemical Formula 18]
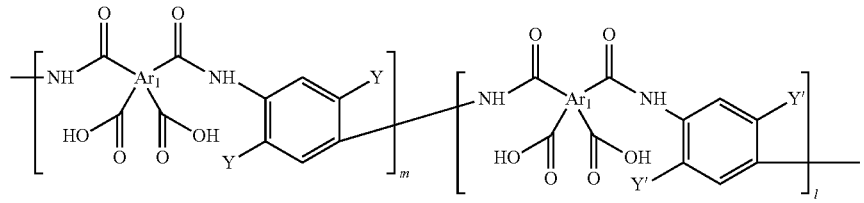

In the above Chemical Formulae 9 to 18, $Ar_1$, Q, n, m, and l are the same as defined in the above Chemical Formulae 1 to 8.

Y and Y' are the same or different, and are independently OH, SH, or $NH_2$.

In the above Chemical Formulae 1 to 18, $Ar_1$ may be selected from one of the following Chemical Formulae.

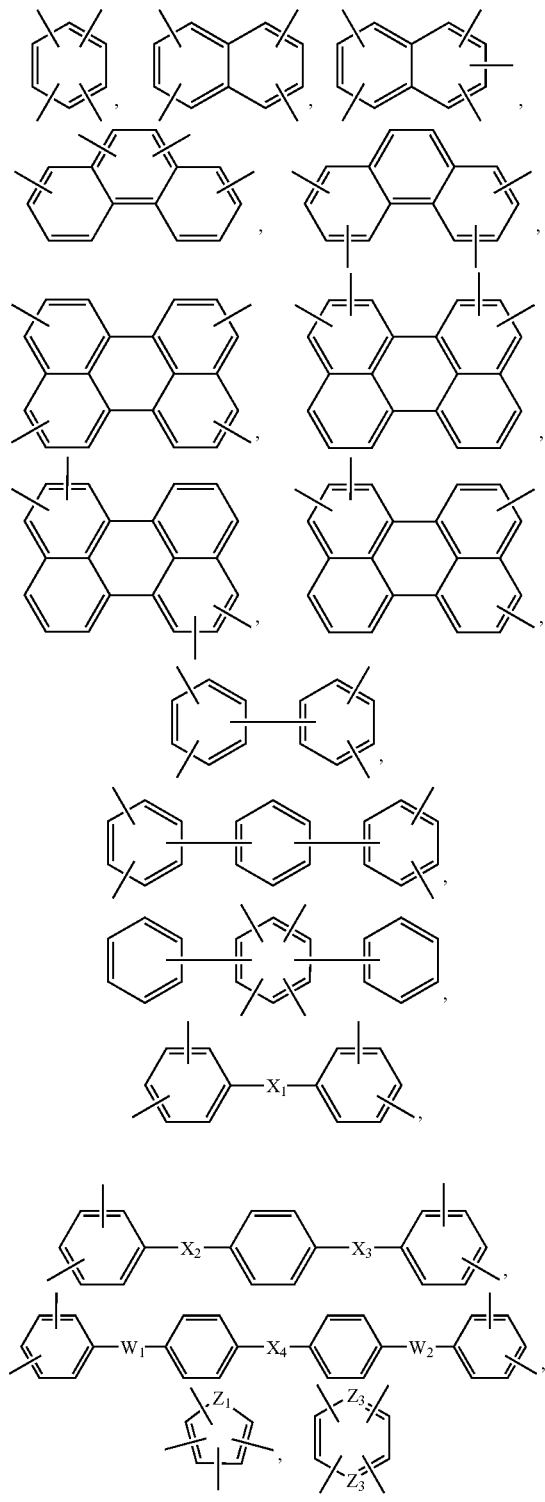

In the above Chemical Formulae, $X_1$, $X_2$, $X_3$, and $X_4$ are the same or different, and independently O, S, C(=O), CH(OH), S(=O)$_2$, Si $CH_{32}$, $CH_{2p}$ (where, $1 \leq p \leq 10$), $(CF_2)_q$ (where, $1 \leq q \leq 10$), C $CH_{32}$, C $CF_{32}$, or C(=O)NH, $W_1$ and $W_2$ are the same or different, and independently O, S, or C(=O), $Z_1$ is O, S, $CR_1R_2$ or $NR_3$, where $R_1$, $R_2$, and $R_3$ are the same or different from each other and independently hydrogen or a C1 to C5 alkyl group, and $Z_2$ and $Z_3$ are the same or different from each other and independently N or $CR_4$ (where, $R_4$ is hydrogen or a C1 to C5 alkyl group), provided that both $Z_2$ and $Z_3$ are not $CR_4$.

In the above Chemical Formulae 1 to 18, specific examples of $Ar_1$ may be selected from one of the following Chemical Formulae, but are not limited thereto.

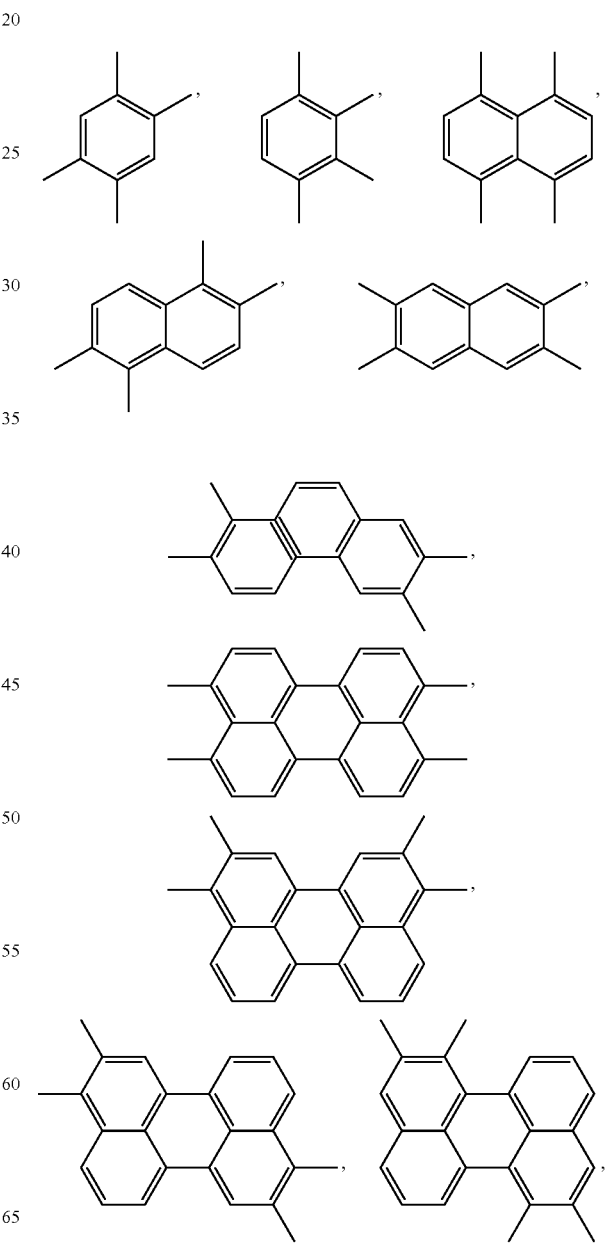

-continued
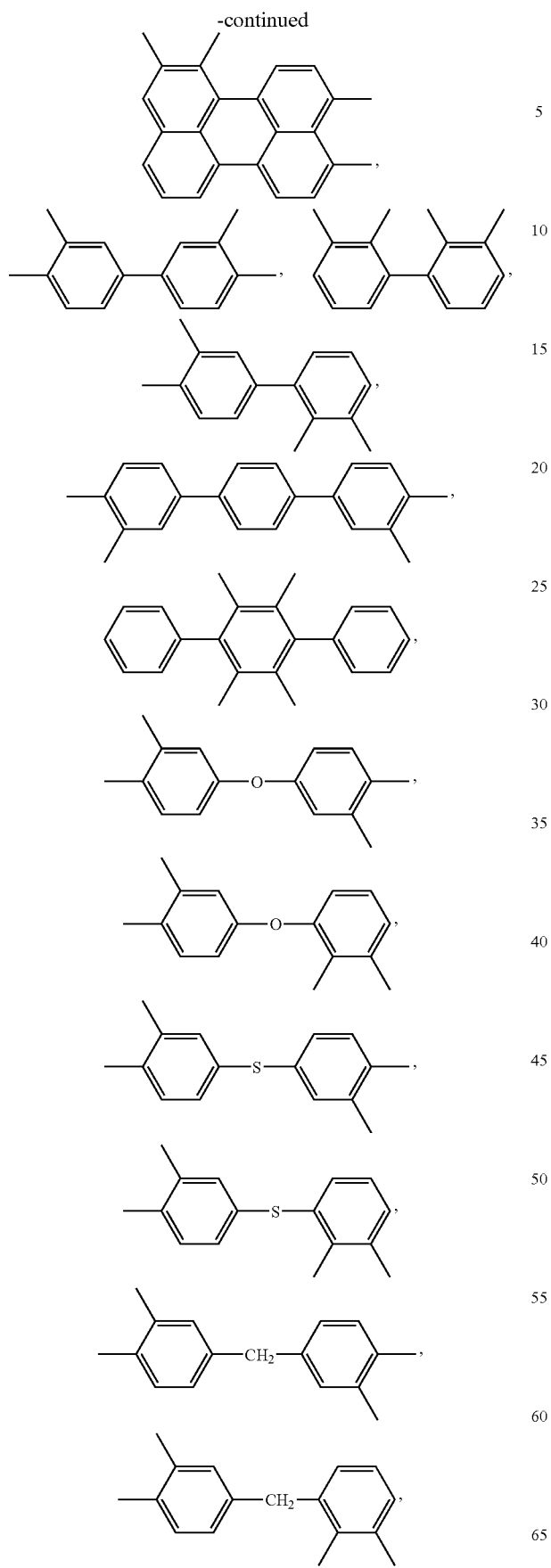
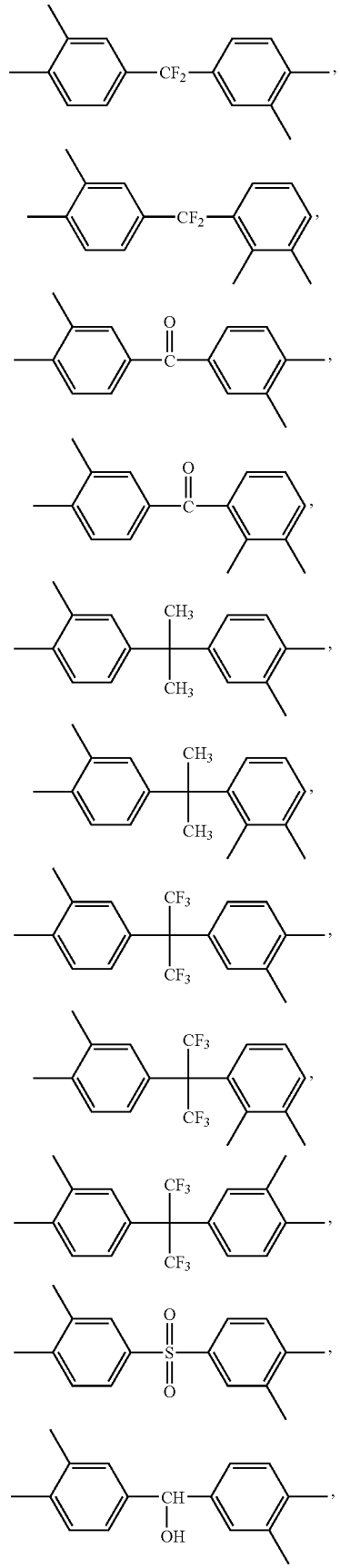

-continued

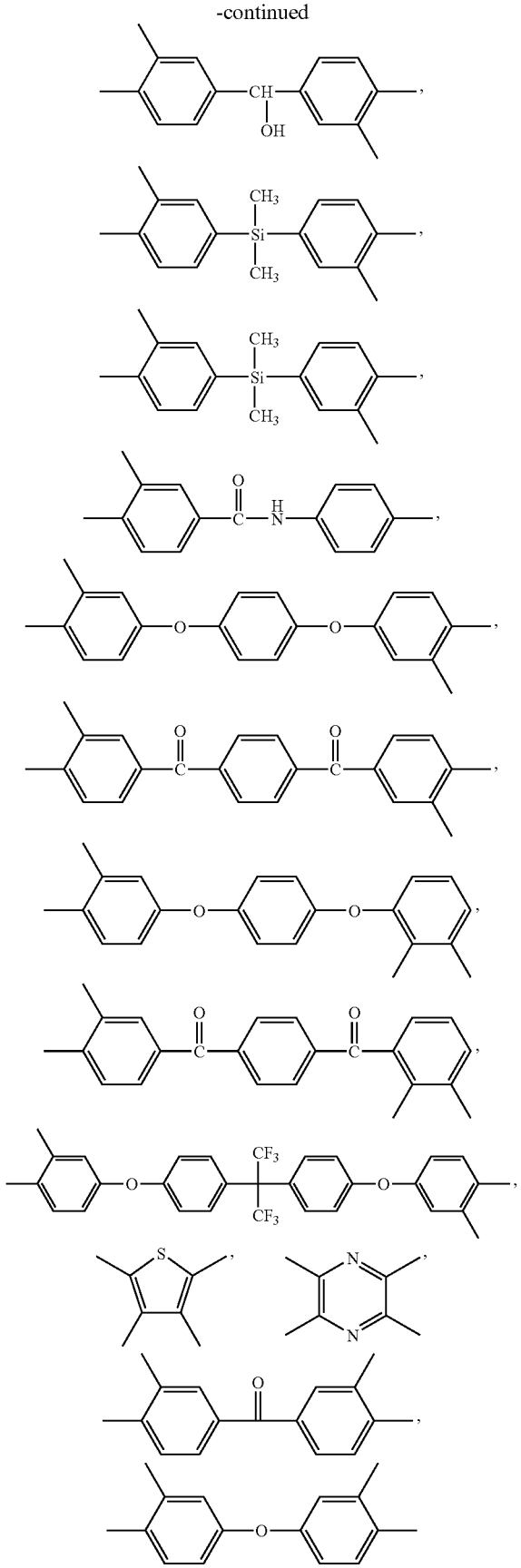

In the above Chemical Formulae 1 to 18, Ar$_2$ may be selected from one of the following Chemical Formulae, but is not limited thereto.

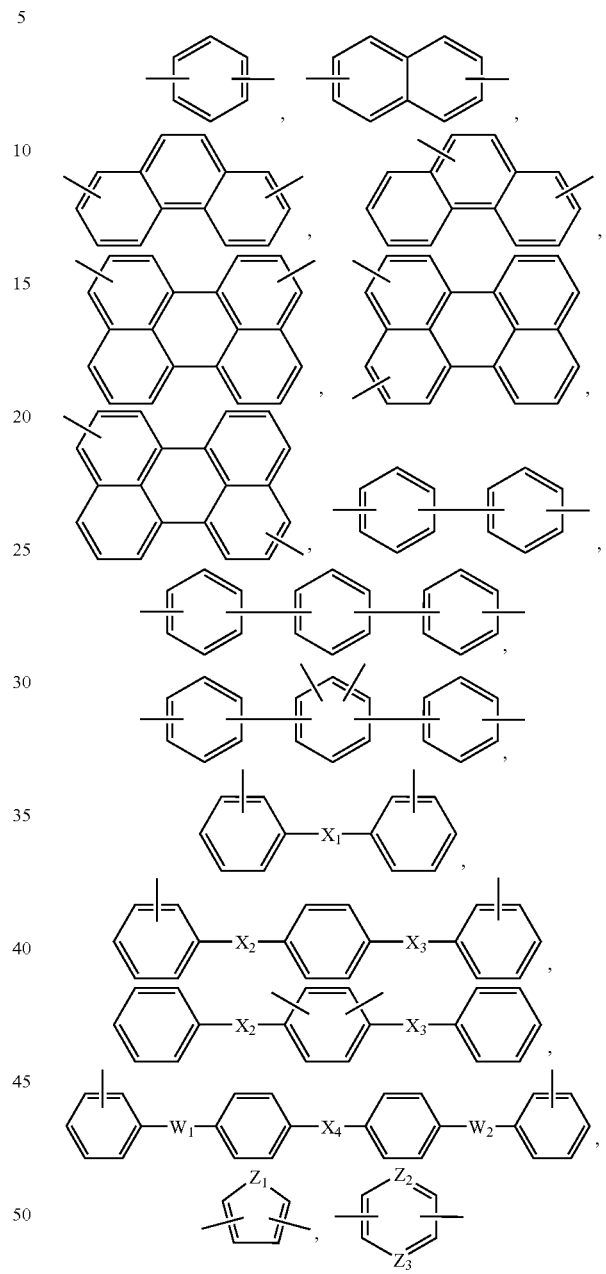

wherein, in the above the Chemical Formulae,

X$_1$, X$_2$, X$_3$, and X$_4$ are the same or different, and independently O, S, C(=O), CH(OH), S(=O)$_2$, Si(CH$_3$)$_2$, (CH$_2$)$_p$ (where 1≦p≦10), (CF$_2$)$_q$ (where 1≦q≦10), C(CH$_3$)$_2$, C(CF$_3$)$_2$, or C(=O)NH, W$_1$ and W$_2$ are the same or different, and independently O, S, or C(=O), Z$_1$ is O, S, CR$_1$R$_2$ or NR$_3$, where R$_1$, R$_2$ and R$_3$ are the same or different from each other and independently hydrogen or a C1 to C5 alkyl group, and Z$_2$ and Z$_3$ are the same or different from each other and independently N or CR$_4$ (where, R$_4$ is hydrogen or a C1 to C5 alkyl group), provided that both Z$_2$ and Z$_3$ are not CR$_4$.

In the above Chemical Formulae 1 to 18, specific examples of Ar$_2$ may be selected from one of the following Chemical Formulae, but are not limited thereto.
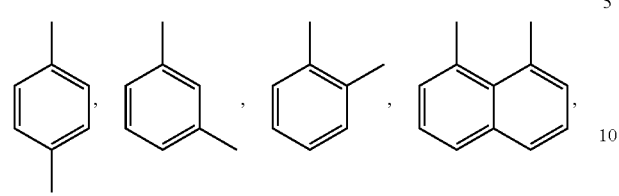
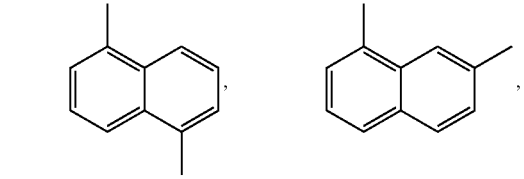
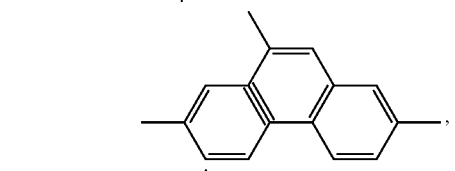
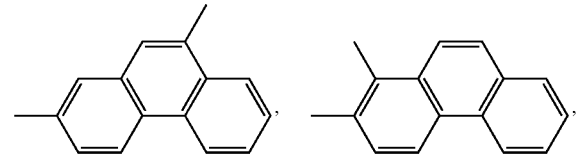
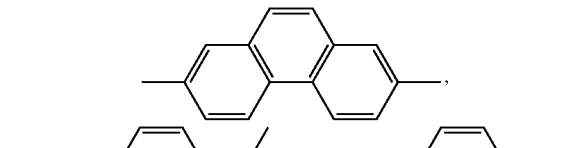
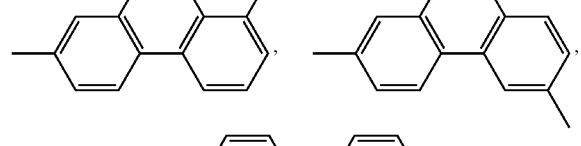
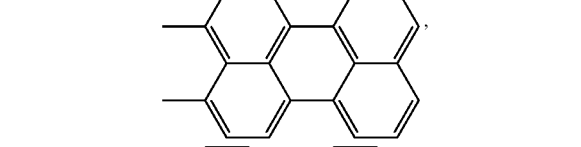
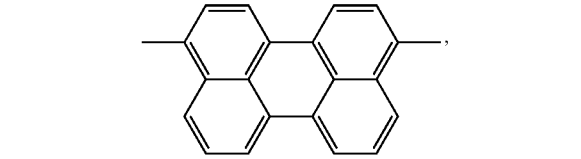
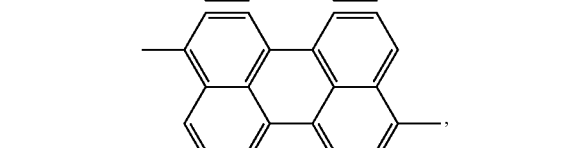
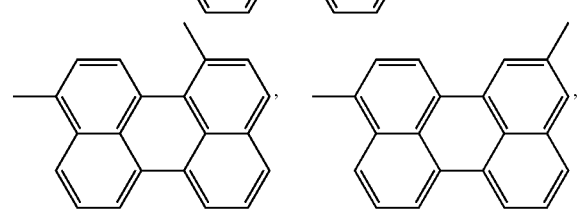
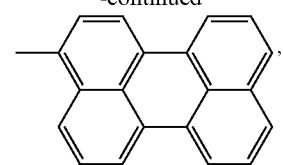
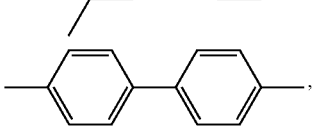
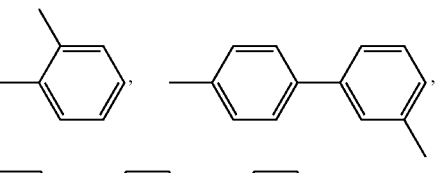
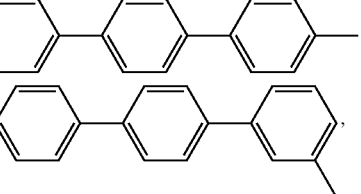
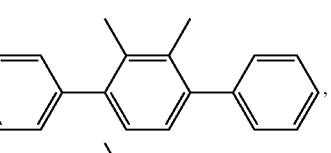
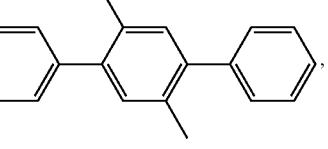
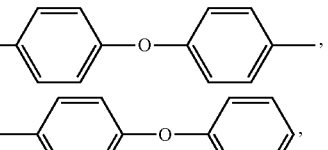
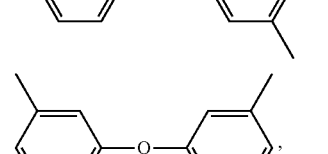
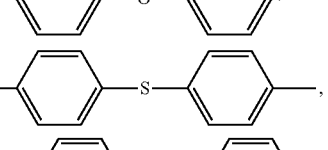
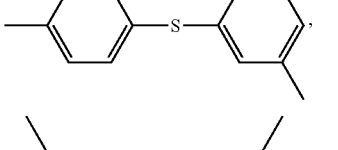
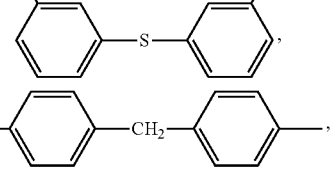

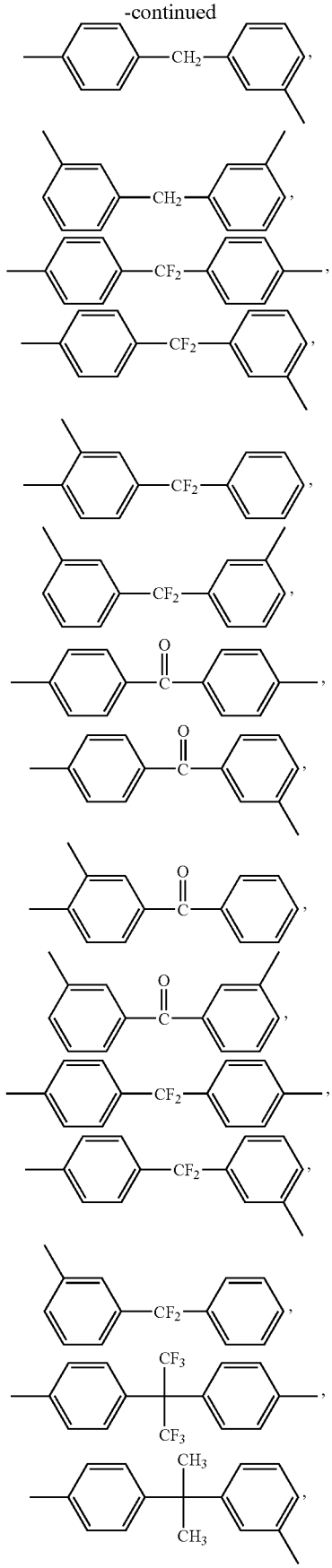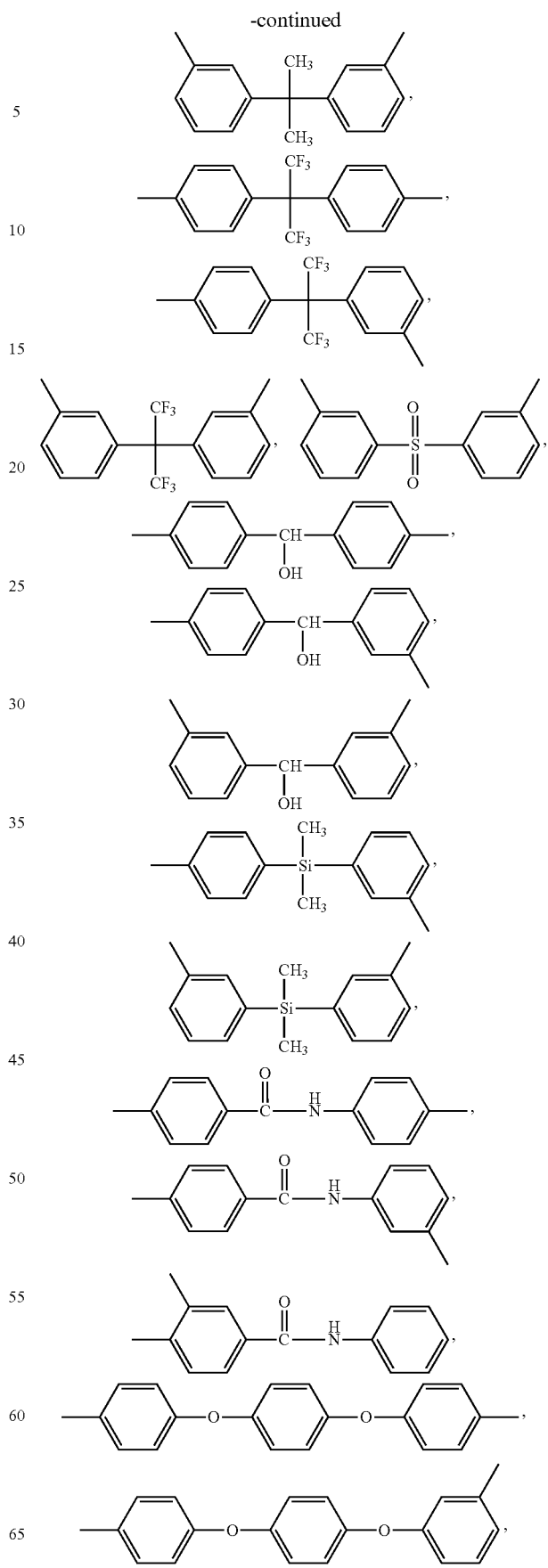

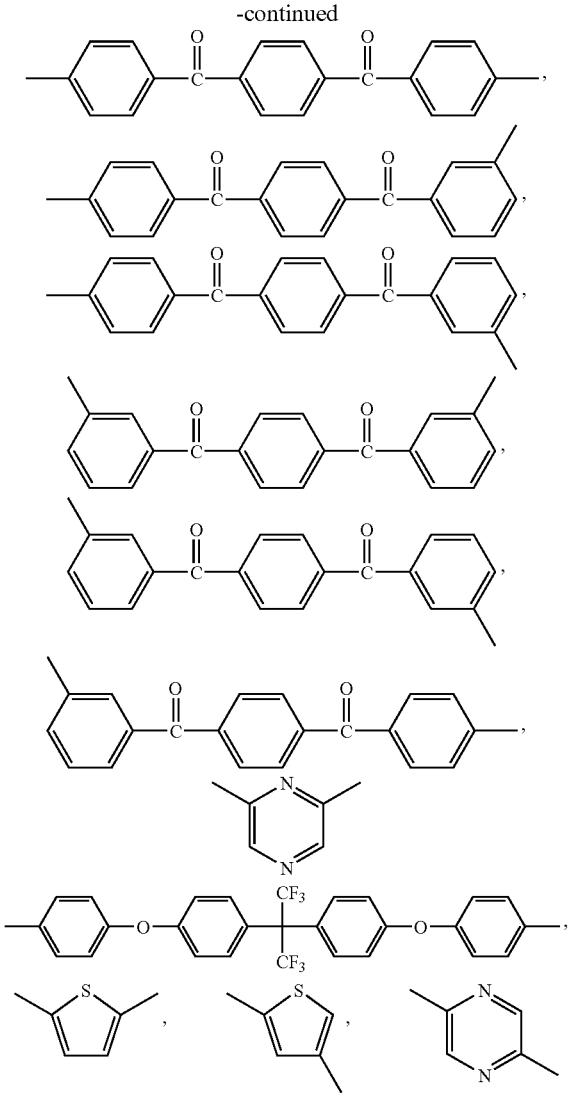

in the above Chemical Formulae 1 to 18, Q is selected from C(CH₃)₂, C(CF₃)₂, O, S, S(=O)₂, and C(=O), but is not limited thereto.

In the above Chemical Formulae 1 to 18, Ar₁ may be a functional group represented by the following Chemical Formula A, B, or C. Ar₂ may be a functional group represented by the following Chemical Formula D or E, and Q may be C(CF₃)₂.

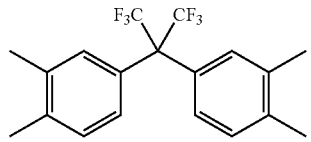
[Chemical Formula A]

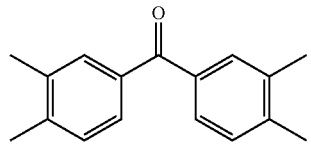
[Chemical Formula B]

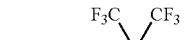
[Chemical Formula C]

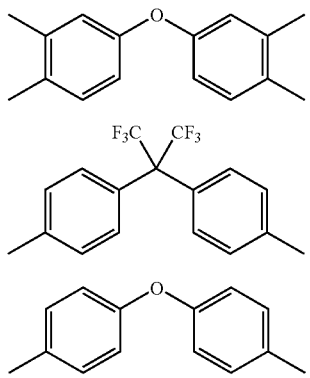
[Chemical Formula D]

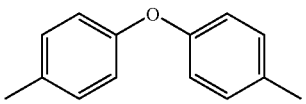
[Chemical Formula E]

The polyamic acid represented by the above Chemical Formulae 1 to 4 may be prepared using a well-known method. For example, tetracarboxylic acid anhydride is reacted with aromatic diamine having OH, SH, or NH₂ group as monomers.

The polyamic acids represented by the above Chemical Formula 1 to 4 are respectively thermally-rearranged into polybenzoxazole, polybenzothiazole, or polypyrrolone having high fractional free volume in accordance with a method that will be described below. For example, polybenzoxazole is derived from polyhydroxyamic acid where Y is OH, polybenzothiazole is derived from polythioamic acid where Y is SH, and polypyrrolone is derived from polyaminoamic acid where Y is NH₂.

The polyamic acid copolymers represented by the above Chemical Formulae 5 to 8 are respectively thermally-rearranged into a poly(benzoxazole-imide) copolymer, a poly(benzothiazole-imide) copolymer, or a poly(pyrroline-imide) copolymer having high fractional free volume in accordance with a method that will be described below. It is possible to control physical properties of the prepared hollow fibers by controlling the copolymerization ratio (mole ratio) between blocks which will be thermally rearranged into polybenzoxazole, polybenzothiazole and polybenzopyrrolone through intramolecular and intermolecular conversion, and blocks which will be thermally rearranged into polyimides.

The polyamic acid copolymer represented by Chemical Formulae 9 to 18 are respectively thermally-rearranged to form hollow fibers made of copolymers of polybenzoxazole, polybenzothiazole and polybenzopyrrolone, each having a high fractional free volume in accordance with a method that will be described below. It is possible to control the physical properties of hollow fibers thus prepared may be controlled by controlling the copolymerization ratio (mole ratio) between blocks which are thermally rearranged into polybenzoxazole, polybenzothiazole and polybenzopyrrolone.

The copolymerization ratio (m:l) between the blocks of the polyamic acid copolymers represented by the above Chemical Formula 5 to 18 ranges from about 0.1:9.9 to about 9.9:0.1, and in one embodiment from about 2:8 to about 8:2, and in another embodiment, about 5:5. The copolymerization ratio affects the morphology of the hollow fibers thus prepared. Such morphologic change is associated with gas permeability and selectivity. When the copolymerization ratio between the blocks is within the above range, the prepared hollow fiber has excellent gas permeability and selectivity.

In the above hollow fiber, the polymer derived from polyamic acid may include a polymer represented by one of the following Chemical Formulae 19 to 32, or copolymers thereof, but is not limited thereto.

[Chemical Formula 19]
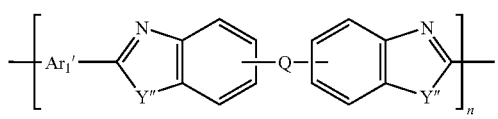
[Chemical Formula 20]
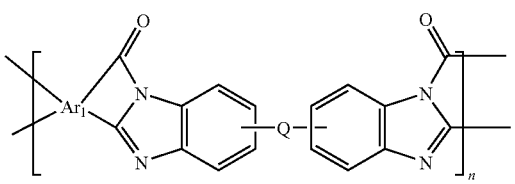
[Chemical Formula 21]
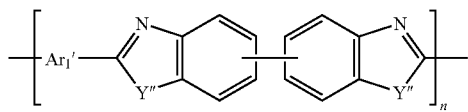
[Chemical Formula 22]
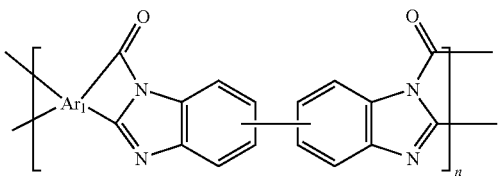
[Chemical Formula 23]
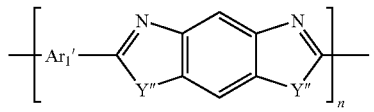
[Chemical Formula 24]
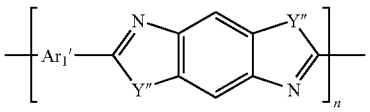
[Chemical Formula 25]
[Chemical Formula 26]
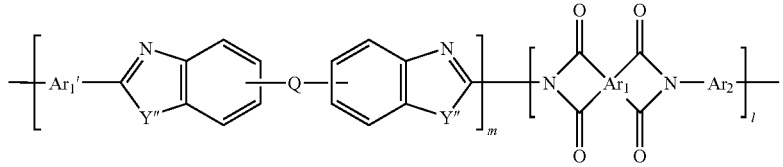
[Chemical Formula 27]
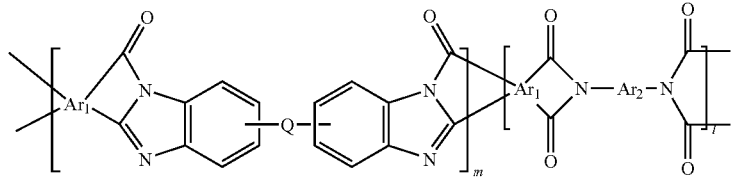
[Chemical Formula 28]
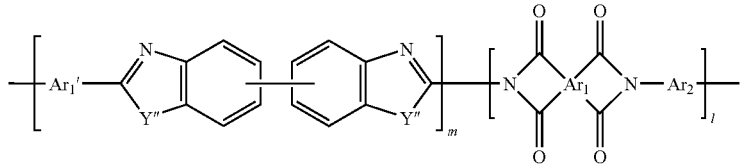
[Chemical Formula 29]
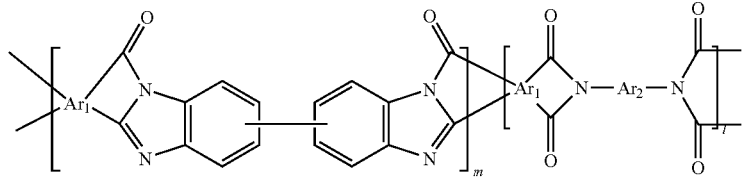
[Chemical Formula 30]
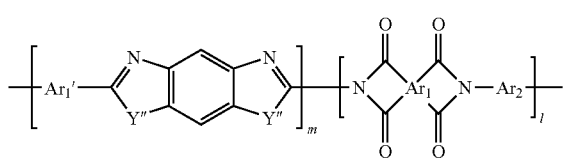
[Chemical Formula 31]
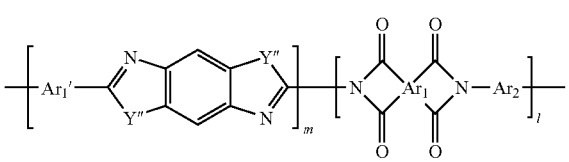

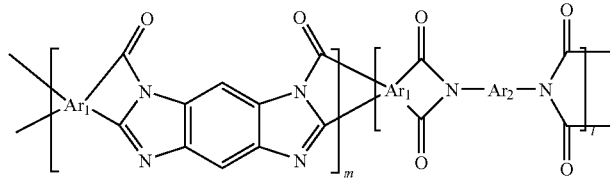

[Chemical Formula 32]

In the above Chemical Formulae 19 to 32, $Ar_1$, $Ar_2$, Q, n, m, and l are the same as defined in the above Chemical Formulae 1 to 8.

$Ar_1'$ is an aromatic group selected from a substituted or unsubstituted divalent C6 to C24 arylene group and a substituted or unsubstituted divalent C4 to C24 heterocyclic group, where the aromatic group is present singularly; at least two aromatic groups are fused to form a condensed cycle; or at least two aromatic groups are linked by single bond or a functional group selected from O, S, C(=O). S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, or C(=O)NH, and Y" is O or S.

In the above Chemical Formulae 19 to 32, examples of $Ar_1$, $Ar_2$, and Q are the same as in those of the above Chemical Formulae 1 to 18.

In the above Chemical Formulae 19 to 32, examples of $Ar_1'$ are the same as in those of the above Chemical Formulae 1 to 18.

In the above Chemical Formulae 19 to 32, $Ar_1$ may be a functional group represented by the following Chemical Formula A, B, or C, $Ar_1'$ may be a functional group represented by the following Chemical Formula F, G, or H, $Ar_2$ may be a functional group represented by the following Chemical Formula D or E, and Q may be C(CF$_3$)$_2$, but they are not limited thereto.

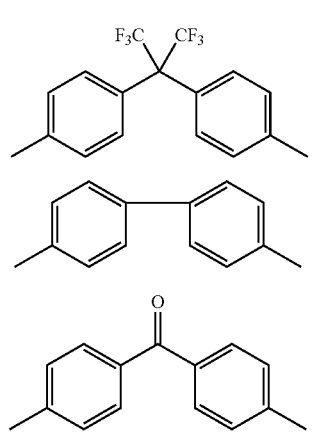

[Chemical Formula F]

[Chemical Formula G]

[Chemical Formula H]

The hollow fiber may be applicable for separating at least one gases selected from the group consisting of He, H$_2$, N$_2$, CH$_4$, O$_2$, N$_2$, CO$_2$, and combinations thereof. The hollow fiber may be used as a gas separation membrane. Examples of the mixed gases include O$_2$/N$_2$, CO$_2$/CH$_4$, H$_2$/N$_2$, H$_2$/CH$_4$, CO$_2$/N$_2$, and He/N$_2$, but are not limited thereto.

The hollow fiber may have O$_2$/N$_2$ selectivity of 4 or more, for example 4 to 20, CO$_2$/CH$_4$ selectivity of 30 or more, for example 30 to 80. H$_2$/N$_2$ selectivity of 30 or more, for example 30 to 80, H$_2$/CH$_4$ selectivity of 50 or more, for example 50 to 90, CO$_2$/N$_2$ selectivity of 20 or more, for example 20 to 50, and He/N$_2$ selectivity of 40 or more, for example 40 to 120.

The dope solution composition for forming a hollow fiber according to another embodiment includes polyamic acid including a repeating unit prepared from aromatic diamine including at least one ortho-positioned functional group and dianhydride, an organic solvent, and an additive.

The organic solvent includes one selected from the group consisting of dimethylsulfoxide; N-methyl-2-pyrrolidone; N,N-dimethyl formamide; N,N-dimethyl acetamide; alcohols selected from the group consisting of methanol, ethanol, 2-methyl-1-butanol, 2-methyl-2-butanol; ketones selected from the group consisting of γ-butyrolactone, cyclohexanone, 3-hexanone, 3-heptanone, 3-octanone, acetone, and methyl ethyl ketone; tetrahydrofuran; trichloroethane; and combinations thereof, but is not limited thereto. In one embodiment, for the organic solvent, dimethylsulfoxide; N-methyl-2-pyrrolidone; N,N-dimethyl formamide; N,N-dimethyl acetamide; or combinations thereof are preferable. The organic solvent can dissolve polymers, and is mixable with the additive to form a meta-stable state, and thereby hollow fiber having dense layer can be provided.

The additive includes one selected from the group consisting of water; alcohols selected from the group consisting of glycerol, ethylene glycol, propyleneglycol, and diethylene glycol; polymer compounds selected from the group consisting of polyvinylalcohol, polyacrylic acid, polyacrylamide, polyethyleneglycol, polypropyleneglycol, chitosan, chitin, dextran, and polyvinylpyrrolidone; salts selected from the group consisting of lithium chloride, sodium chloride, calcium chloride, lithium acetate, sodium sulfate, and sodium hydroxide, but is not limited thereto. In one embodiment, for the additive, water, glycerol, propyleneglycol, polyethyleneglycol, polyvinylpyrrolidone, and combination thereof may be preferable. The additive can make a meta-stable dope solution composition along with the organic solvent even though it has good solubility for polyamic acid polymers and thus it can not be used singularly. It can also be diffused into a coagulation bath as the non-solvent to form a uniform thin layer and help macrovoids in a sublayer effectively.

In the dope solution composition for forming a hollow fiber, the ortho-positioned a functional group with respect to the amine group includes OH, SH, or NH$_2$.

The dope solution composition for forming a hollow fiber includes about 10 to about 45 wt % of the polyamic acid, about 25 to about 70 wt % of the organic solvent, and about 5 to about 40 wt % of the additive.

When the amount of the polyamic acid is within the above range, hollow fiber strength and gas permeability may be maintained excellently.

The organic solvent dissolves the polyamic acid. When the organic solvent is used in the above ranged amount, the dope solution composition for forming a hollow fiber has an appropriate viscosity and thus hollow fiber may be easily made while improving permeability of the hollow fiber.

The dope solution composition for forming a hollow fiber has a viscosity ranging from about 2 Pa·s to 200 Pa·s. When the dope solution composition for forming a hollow fiber is within the above range, the dope solution composition for forming a hollow fiber can be spun through nozzles, and hollow fiber is coagulated in to solid phase by a phase inversion.

The additive controls phase separation temperatures or viscosity of a dope solution composition for forming a hollow fiber.

Any additive may be used without limitation. The polymer compounds may be used as a pore-controlling agent, and the salts may be used as a pore-forming agent.

When the additive is used in the above ranged amount, a hollow fiber can be made easily, and also surface pore sizes of a hollow fiber can be appropriately controlled to easily form a dense layer.

In the dope solution composition for forming a hollow fiber, the polyamic acid has a weight average molecular weight (Mw) of about 10,000 to about 200,000. When the polyamic acid has the above ranged weight average molecular weight, it can be synthesized easily, the dope solution composition for forming a hollow fiber including the same can be appropriately controlled resulting in processability, and the polymer derived from polyamic acid has good mechanical strength and performances.

In the dope solution composition for forming a hollow fiber, the polyamic acid may be selected from the group consisting of polyamic acid represented by the following Chemical Formulae 1 to 4, polyamic acid copolymers represented by the following Chemical Formulae 5 to 8, copolymers thereof, and blends thereof.

Another embodiment of the present invention, a method of preparing a hollow fiber is provided that includes spinning a dope solution composition for forming a hollow fiber to prepare a polyamic acid hollow fiber, and heat-treating the polyamic acid hollow fiber to obtain a hollow fiber including thermally rearranged polymer. The hollow fiber made according to the above method includes a hollow positioned at the center of the hollow fiber, macropores positioned at adjacent to the hollow, and mesopores and picopores positioned at adjacent to macropores, and the picopores are three dimensionally connected to each other to form a three dimensional network structure.

The thermally rearranged polymer may include polymers represented by one of the above Chemical Formulae 19 to 32 or copolymers thereof, but is not limited thereto.

For example, the polyimide hollow fiber may include polyimides represented by the above Chemical Formulae 1 to 8, copolymers thereof, and blends thereof.

[Chemical Formula 33]

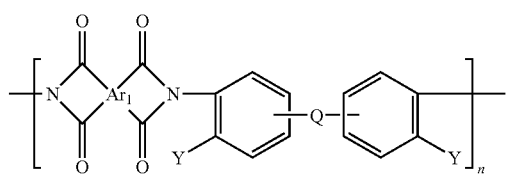

-continued

[Chemical Formula 34]

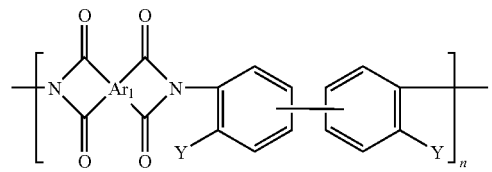

[Chemical Formula 35]

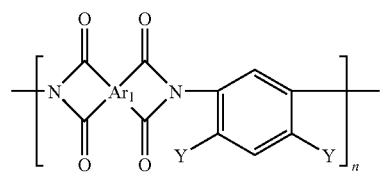

[Chemical Formula 36]

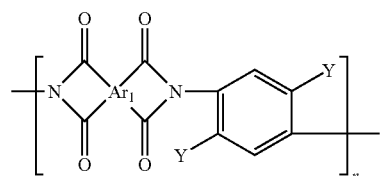

[Chemical Formula 37]

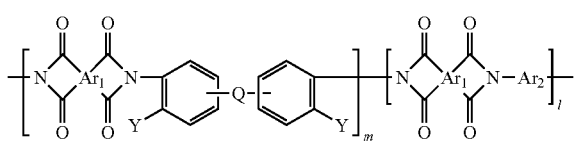

[Chemical Formula 38]

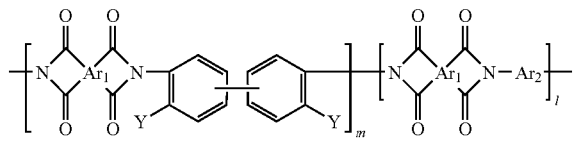

[Chemical Formula 39]

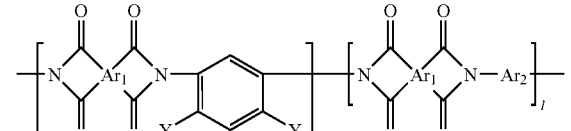

[Chemical Formula 40]

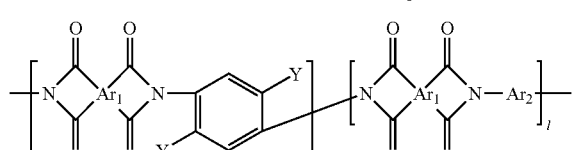

In the above Chemical Formulae 33 to 40, $Ar_1$, $Ar_2$, Q, Y, n, m and l are the same as in above Chemical Formulae 1 to 8.

Copolymers of the above polyamic acid represented by Chemical Formulae 33 to 36 include polyimide copolymers represented by the following Chemical Formulae 41 to 50.

[Chemical Formula 41]
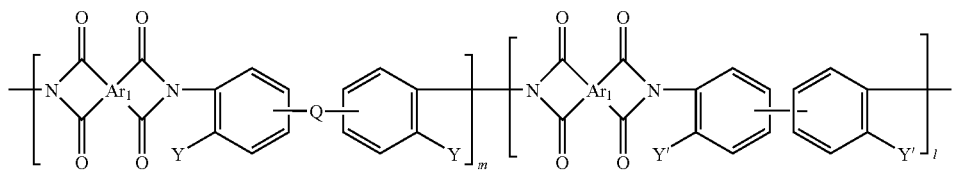
[Chemical Formula 42]
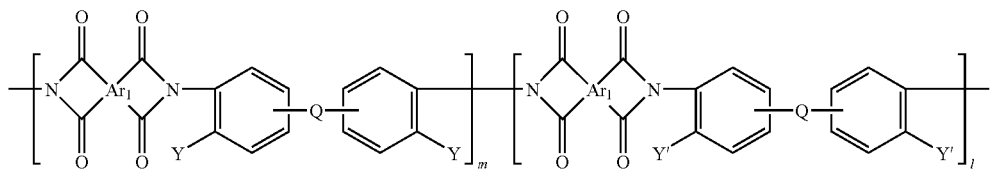
[Chemical Formula 43]
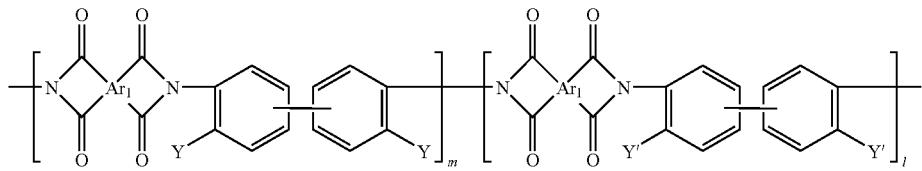
[Chemical Formula 44]
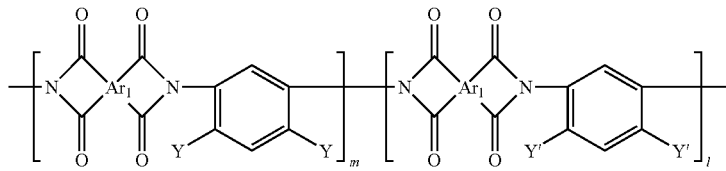
[Chemical Formula 45]
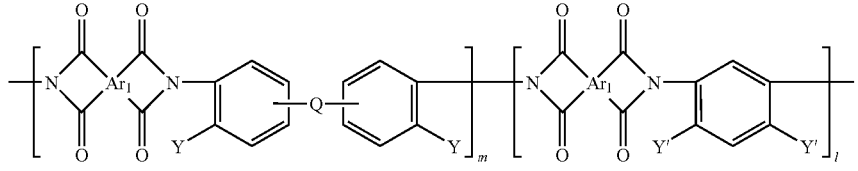
[Chemical Formula 46]
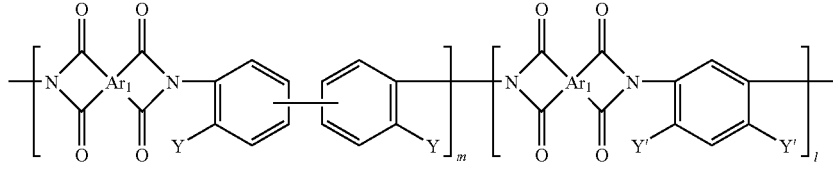
[Chemical Formula 47]
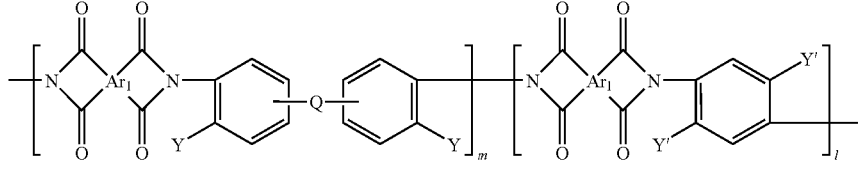
[Chemical Formula 48]
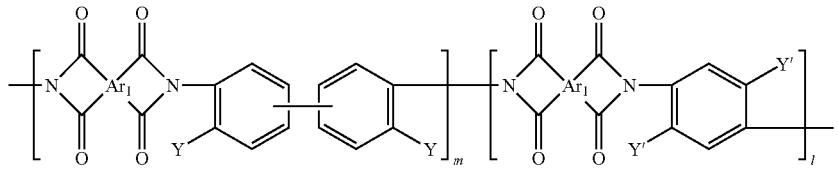
[Chemical Formula 49]
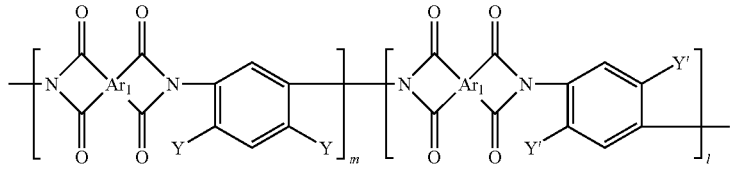

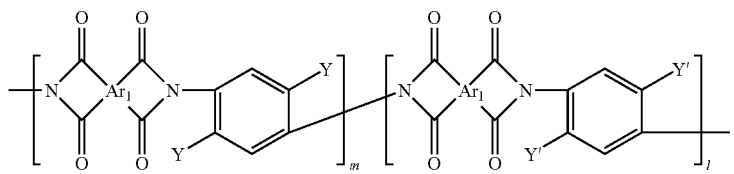

[Chemical Formula 50]

In the above Chemical Formulae 41 to 50, $Ar_1$, Q, Y, Y', n, m, and l are the same as in the above Chemical Formulae 1 to 18.

The spinning process of the dope solution composition for forming a polyamic acid hollow fiber may be carried out in accordance with a generally-used method in the art and is not particularly limited. In the present invention, dry or dry-jet-wet spinning is used for the preparation of hollow fibers.

A solvent-exchange method using solution-spinning is generally used as the hollow fiber preparation method. In accordance with the solvent exchange method, after a dope solution composition for forming a hollow fiber is dissolved in a solvent and spun using a dry or dry-jet-wet spinning method, the solvent and the non-solvent are exchanged in the presence of the non-solvent to form picopores. In the process in which the solvent is diffused into a coagulation bath as the non-solvent, an asymmetric membrane or a symmetric membrane in which the interior is identical to the exterior was formed.

For example, in a case where dry-jet-wet spinning is used for the preparation of hollow fibers, the dry-jet-wet spinning is achieved through the steps of: a1) preparing a dope solution composition for forming a hollow fiber; a2) bringing the dope solution composition into contact with an internal coagulant, and spinning the composition in air, while coagulating an inside of hollow fiber to form a polyimide hollow fiber; a3) coagulating the hollow fiber in a coagulation bath; a4) washing the hollow fiber with a cleaning solution, followed by drying; and a5) heat-treating the polyimide hollow fiber to obtain a thermally rearranged polymer.

A flow rate of internal coagulant discharged through an inner nozzle ranges from 1 to 10 ml/min, and in one embodiment, 1 to 3 ml/min. In addition, a double nozzle has an outer diameter of 0.1 to 2.5 mm. The flow rate of the internal coagulant and the outer diameter of the double nozzle may be controlled within the range according to the use and conditions of hollow fibers.

In addition, the air gap between the nozzle and the coagulation bath ranges from 1 cm to 100 cm, and in one embodiment, 5 cm to 50 cm.

The phase-inversion is induced in a coagulation bath by passing the hollow fiber through a high-temperature spinning nozzle, while maintaining a spinning temperature of 5 to 120° C. and a spinning rate of 5 to 100 m/min. The spinning temperature and spinning rate may be varied within the range depending upon the use and operation conditions of hollow fibers.

When the spinning temperature is within the above range, the viscosity of the dope solution composition can be appropriately controlled, thus making it easy to perform rapid spinning, and solvent evaporation can be prevented, thus disadvantageously making it impossible to continuously prepare hollow fibers. In addition, when the spinning rate is within the above range, a flow rate is appropriately maintained, and the mechanical properties and chemical stability of hollow fibers thus produced are improved.

The temperature of the coagulation bath may range from about 0 to about 50° C. When the coagulation bath temperature is within the above range, the solvent volatilization in the coagulation bath may be prevented, thus advantageously making it possible to smoothly prepare hollow fibers.

As the external coagulant present in the coagulation bath, any type may be used so long as it does not dissolve polymeric materials and is compatible with the solvent and additive. Non-limiting examples of useful external coagulants include water, ethanol, methanol, and mixtures thereof. In one embodiment, water is preferred.

To remove the solvent, additive, and the coagulated solution that remain inside the coagulated hollow fibers and on the surface thereof, washing and drying processes may be performed. Water or hot-water may be used as the cleaning solution. The washing time is not particularly limited. In one embodiment, it is preferable that the washing is carried out for 1 to 24 hours.

After the washing, the drying is performed at a temperature ranging from 20 to 100° C. for 3 to 72 hours.

The imidization of the polyamic acid hollow fiber is performed by thermal imidization without limitation. The thermal imidization is carried out at 150 to 300° C. for 30 minutes to 2 hours under inert atmosphere. When the thermal imidization temperature is less than the above range, imidization of the precursor polyamic acid is not performed sufficiently, while when it is above range, effect according to increase of the temperature or time does not occur.

The imidization condition can be controlled in accordance with the functional groups, $Ar_1$, $Ar_2$, Q, Y, and Y' of the polyamic acid.

Subsequently, the polyimide hollow fiber is heat-treated to obtain hollow fibers including thermally rearranged polymers. The hollow fiber including the thermally rearranged polymer has a decreased density, an increased fractional free volume (FFV) and an increased interplanar distance (d-spacing) due to an increased picopore size and produced well-connected picopores, and thus exhibit improved gas permeability, as compared with polyimide hollow fibers. Thereby the hollow fiber including the rearranged polymer has excellent gas permeability and selectivity.

The heat treatment is performed by increasing a temperature up to 400 to 550° C., and in one embodiment 450 to 500° C., at a heating rate of 10 to 30° C./min and heat-treating for 1 minute to 1 hour, in one embodiment 10 minutes to 30 minutes at that temperature under an inert atmosphere. Within the above temperature range, thermal rearrangement may be sufficiently realized.

Hereinafter, the imidization and heat treatment will be illustrated in detail with reference to the following Reaction Schemes 1 and 2.

[Reaction Scheme 1]
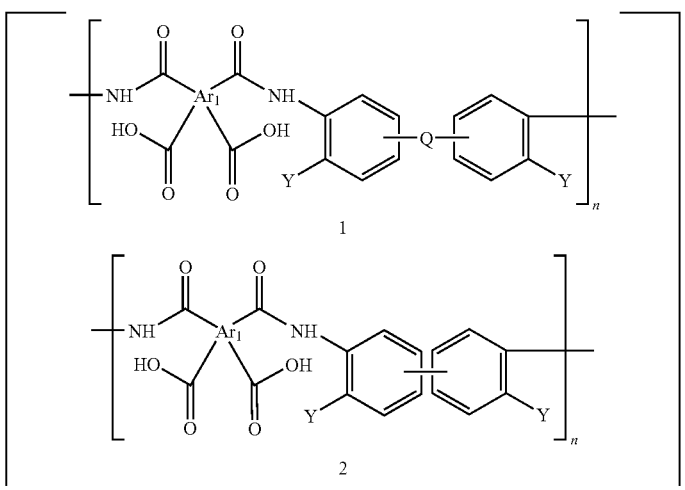
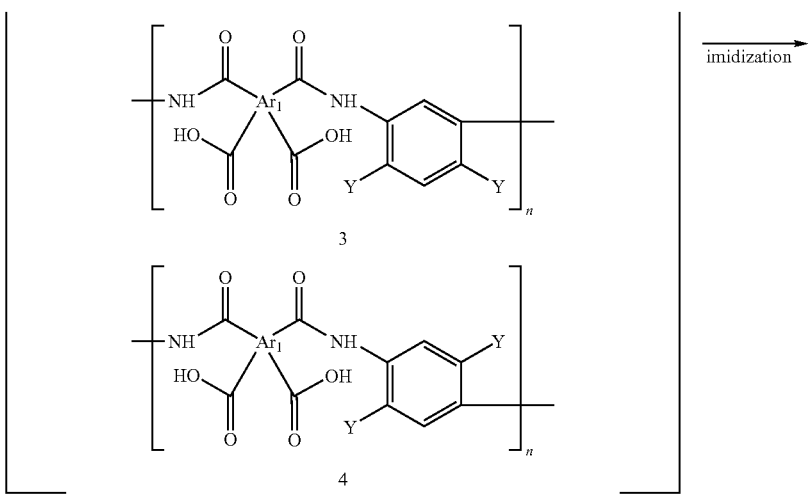
imidization
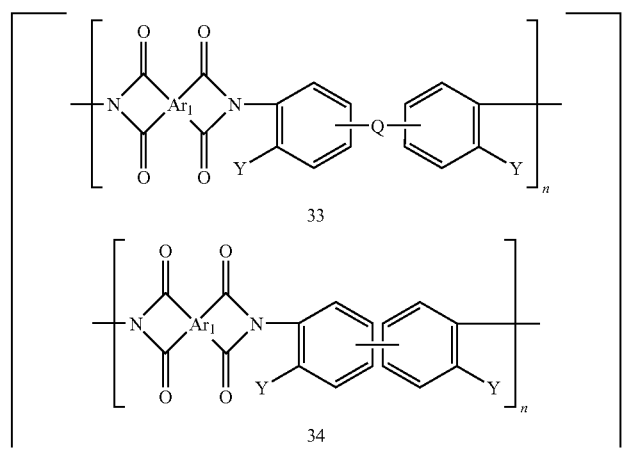

-continued
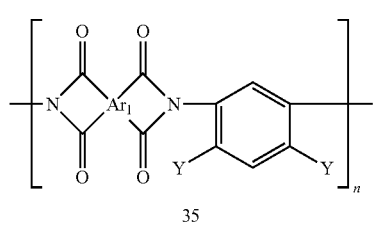
35
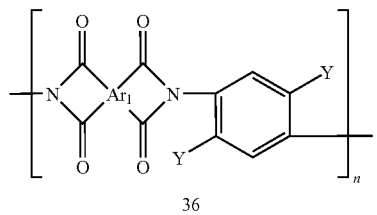
36
Y: —OH, —SH    Thermal Rearragement    Y: —NH$_2$
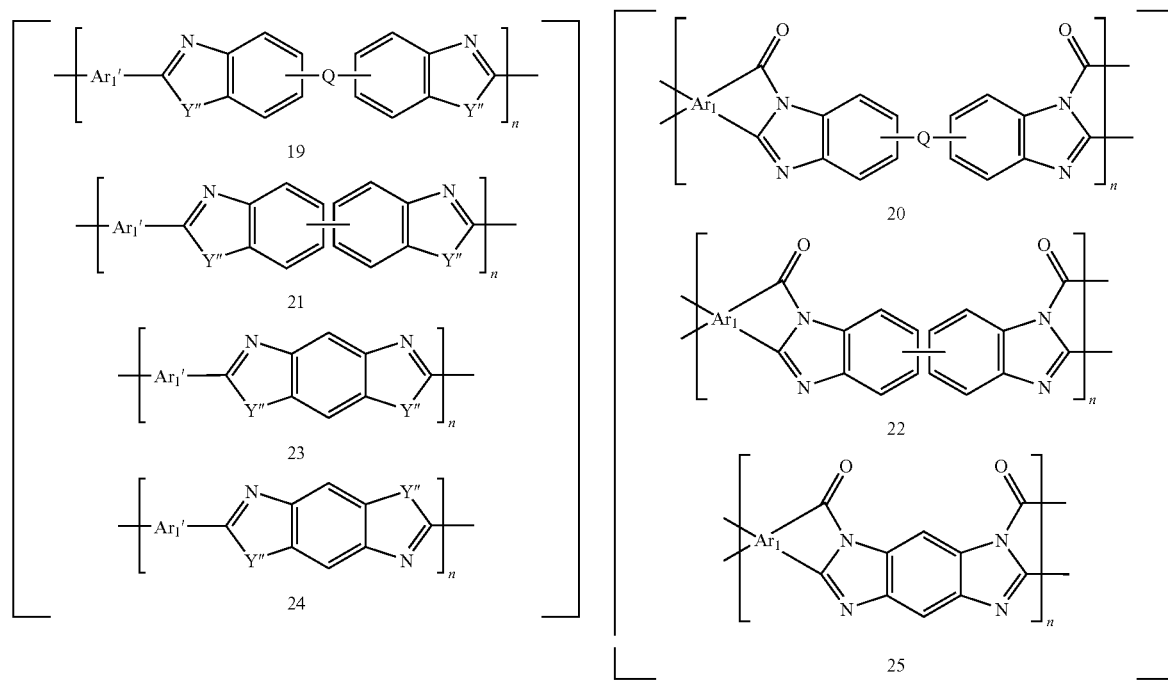

[Reaction Scheme 2]
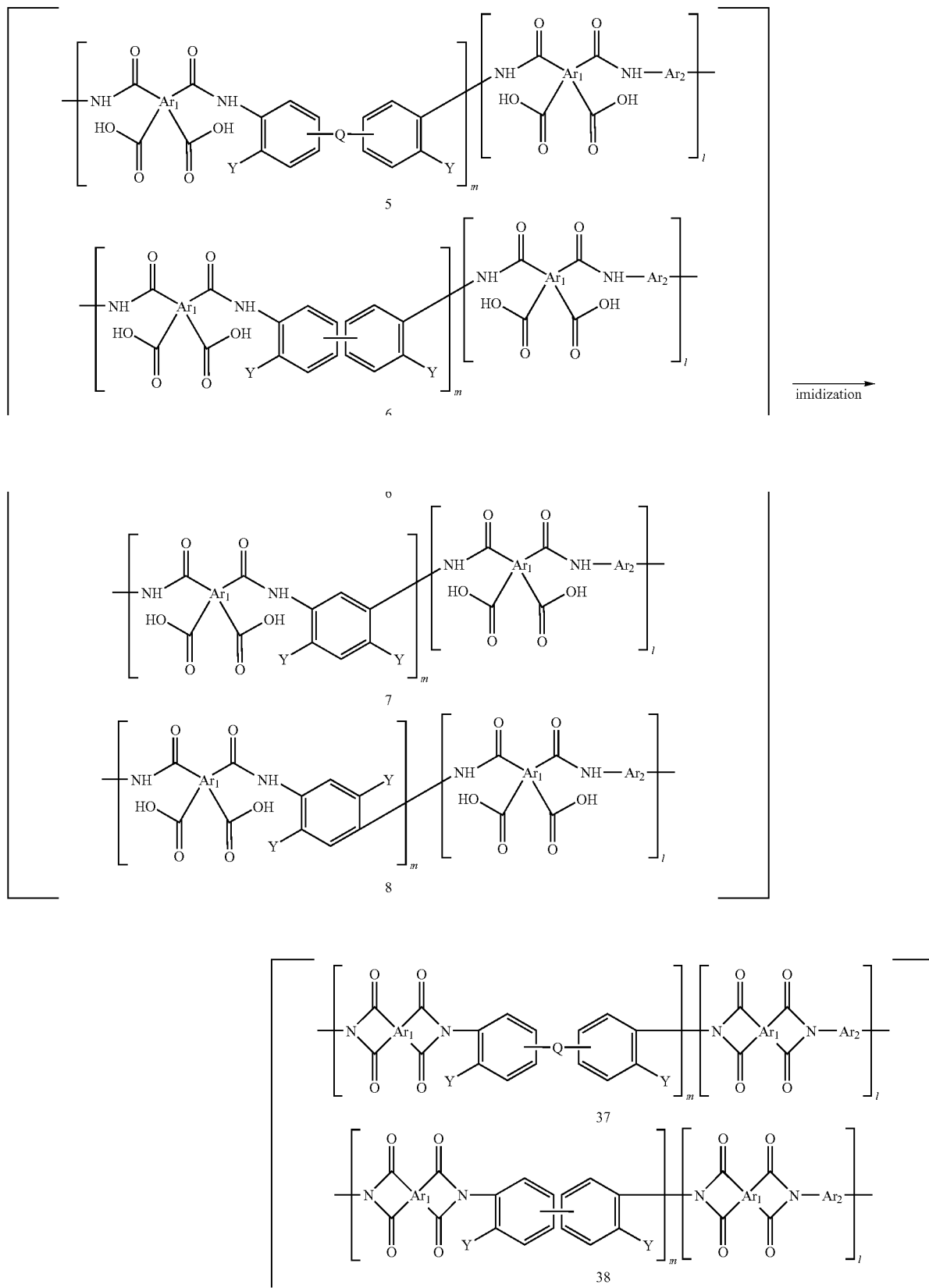

-continued
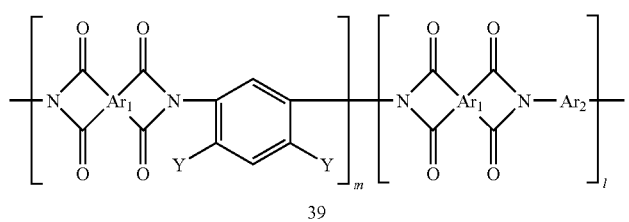
39
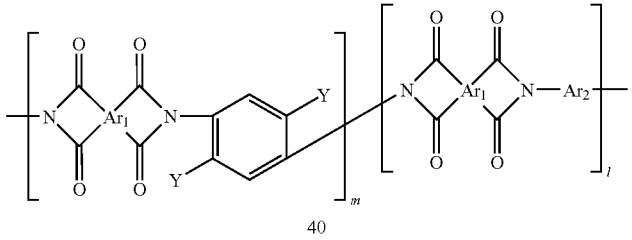
40
Y: —OH, —SH    Thermal Rearragement    Y: —NH₂
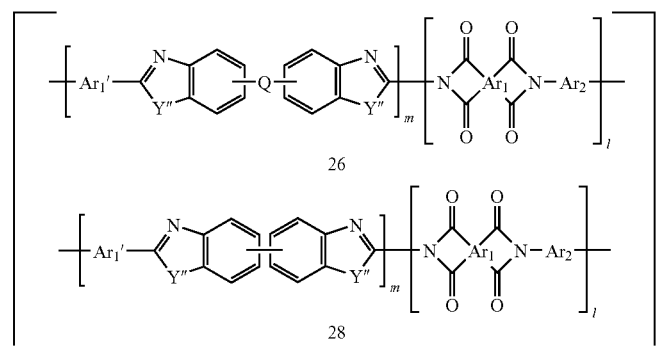
26
28
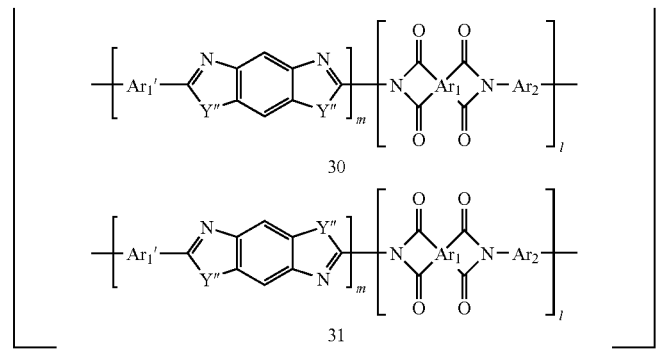
30
31

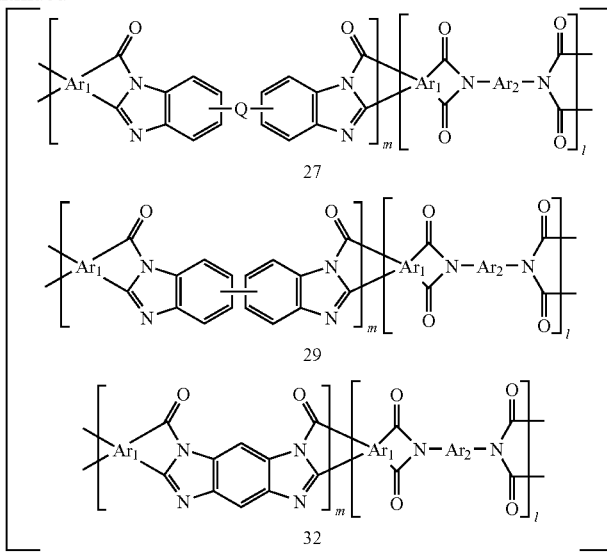

In the Reaction Schemes 1 and 2, $Ar_1$, $Ar_1'$, $Ar_2$, Q, Y, Y", n, m, and l are the same as defined in the above Chemical Formulae 1 to 50.

Referring to the Reaction Scheme 1, the polyamic acid hollow fibers including the polyamic acids represented by the above Chemical Formulae 1 to 4 are subjected to imidization as described above to form a polyimide hollow fiber including polyimides represented by the above Chemical Formulae 33, 34, 35, and 36.

Subsequently, the polyimide hollow fiber including the polyimide represented by the above Chemical Formulae 33 to 36, respectively is converted into hollow fibers including polybenzoxazole, polybenzothiazole, or polypyrrolone polymer represented by Chemical Formulae 19 to 25, respectively through heat treatment. The conversion of polyimide hollow fibers into the polymers is carried out through the removal reaction of $CO_2$ present in the polymers of Chemical Formulae 33 to 36.

The polyhydroxyamic acids of Chemical Formulae 1 to 4 in which Y is —OH or —SH are thermally rearranged into polybenzoxazole(Y"=O) or polybenzothiazole(Y"=S) of Chemical Formula 19, Chemical Formula 21. Chemical Formula 23 and Chemical Formula 24. In addition, polyaminoamic acids of Chemical Formulae 1 to 4 in which Y is —$NH_2$ are thermally rearranged into polypyrrolones of Chemical Formulae 20, 22, and 25.

As shown in Reaction Scheme 2, through the aforementioned heat treatment, polyamic acid hollow fibers made of polyamic acid copolymers of Chemical Formulae 5 to 8 are converted through imidization into polyimide hollow fibers made of polyimide polymers of Chemical Formulae 37 to 40.

Through the above described thermal heat treatment, the polyimide hollow fibers made of the above Chemical Formulae 37 to 40 are converted through the removal reaction of $CO_2$ present in the polyimides into polymers of Chemical Formulae 26 to 32.

Polyhydroxyamic acid or polythioamic acid of Chemical Formulae 5 to 8 in which Y is —OH or —SH are thermally rearranged into poly(benzoxazole(Y"=O)-imide) copolymer or poly(benzothiazole(Y"=S)-imide) copolymers of Chemical Formulae 26, 28, 30 and 31. In addition, polyaminoamic acid (Y=$NH_2$) represented by the above Chemical Formulae 5 to 8 are converted through imidization into poly (pyrrolone-imide) copolymers represented by Chemical Formula 27, 29, and 32, respectively.

The blocks constituting the polyamic acid hollow fibers made of polyamic acid copolymers represented by Chemical Formulae 9 to 18 are imidized to form polyimide hollow fibers. The resulting polyimide hollow fibers are thermally rearranged into polybenzoxazole, polybenzothiazole and polypyrrolone, depending upon the type of Y to form hollow fibers made of copolymers thereof, i.e., copolymers of polymers represented by Chemical Formulae 19 to 25.

By controlling the preparation process, the hollow fibers are prepared in the form of a macrovoid-formed finger or a sponge that has a macrovoid-free selective layer and thus exhibits stable membrane performance. Alternatively, the hollow fibers may be prepared in a symmetric or asymmetric form by controlling the preparation process. Furthermore, by controlling polymer design while taking into consideration the characteristics of $Ar_1$, $Ar_1'$, $Ar_2$, and Q present in the chemical structure, permeability and selectivity for various gas types can be controlled.

The hollow fiber includes the polymers represented by the above Chemical Formulae 19 to 32 or copolymers thereof.

The hollow fibers of the present invention can endure not only mild conditions, but also stringent condition such as long operation time, acidic conditions and high humidity, due to rigid backbones present in the polymers. The hollow fiber according to the embodiment has chemical stability and mechanical properties.

The polymers represented by Chemical Formulae 19 to 32 or copolymers thereof are designed to have a desired weight average molecular weight, and in one embodiment, a weight average molecular weight of 10,000 to 200,000. When the molecular weight is less than 10,000, the physical properties of the polymers are poor, and when the molecular weight exceeds 200,000, the viscosity of the dope solution composition, is greatly increased, thus making it difficult to spin the dope solution composition using a pump.

The hollow fiber according to one embodiment of the present invention includes a hollow positioned at the center of the hollow fiber, macropores positioned at adjacent to the hollow, and mesopores and picopores positioned at adjacent to macropores, and the picopores are three dimensionally connected to each other to form a three dimensional network structure. By this structure, the hollow fiber has high fractional free volume and thus realizes excellent gas selectivity and gas permeability. For example, the hollow fiber has good permeability and selectivity for at least one gases selected from the group consisting of He, $H_2$, $N_2$, $CH_4$, $O_2$, $N_2$, $CO_2$, and combinations thereof.

EXAMPLES

Hereinafter, preferred examples will be provided for a further understanding of the invention. These examples are for illustrative purposes only and are not intended to limit the scope of the present invention.

Example 1

A hollow fiber including polybenzoxazole represented by Chemical Formula 51 was prepared using the polyhydroxyamic acid-containing dope solution composition for forming a hollow fiber through the following Reaction Scheme 3.

[Reaction Scheme 3]

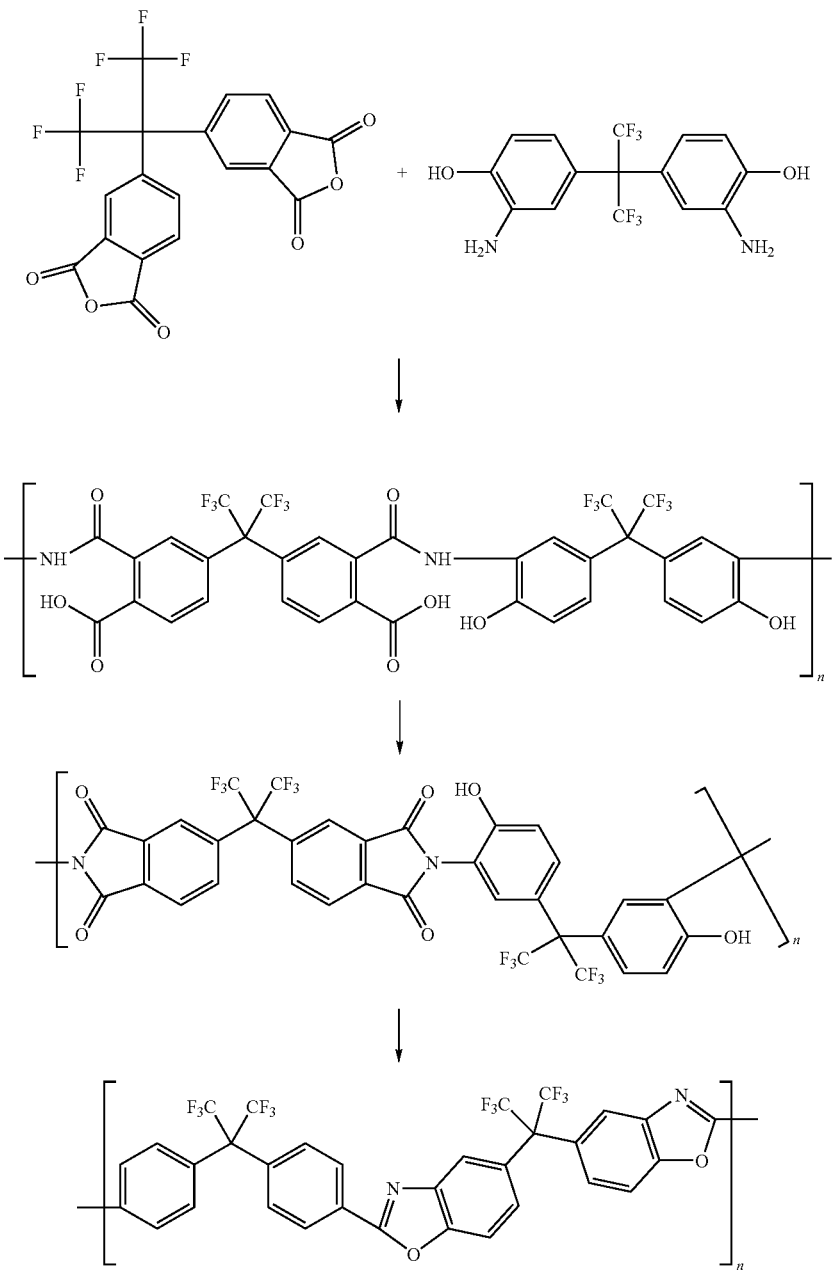

(1) Preparation of Polyhydroxyamic Acid 36.6 g (0.1 mol) of 2,2-bis(3-amino-4-hydroxyphenyl)hexafluoropropane and 44.4 g (0.1 mol) of 4,4'-(hexafluoroisoproylidene)diphthalic anhydride was added into 189 g (70 wt %) of N-methylpyrrolidone (NMP) and then reacted at 15° C. for 4 hours to obtain a pale yellow Viscous polyamic acid.

(2) Preparation of a Dope Solution Composition for Forming a Hollow Fiber

The resulting polyamic acid was added to 5 wt % of tetrahydrofuran as an additive without removal of the solvent to prepare a homogeneous dope solution composition for forming a hollow fiber.

(3) Preparation of Hollow Fiber

The dope solution composition for forming a hollow fiber was defoamed at ambient temperature under reduced pressure for 24 hours, and foreign materials were removed using a glass filter (pore diameter: 60 μm). Subsequently, the resulting solution was allowed to stand at 25° C. and was then spun through a double-ring nozzle. At this time, distilled water was used as an internal coagulating solution and an air gap was set at 50 cm. The spun hollow fiber was coagulated in a coagulation bath including water at 25° C. and was then wound at a rate of 20 m/min. The resulting hollow fiber was washed, air-dried at ambient temperature for 3 days. Then the dried hollow fiber was imidized at 300° C. for 1 hour, and then heat-treated under an inert atmosphere at 500° C. for 10 minutes at a heating rate of 15° C./min using heating furnace to prepare a hollow fiber thermally rearranged into polybenzoxazole represented by Chemical Formula 51.

The hollow fiber thus prepared had a weight average molecular weight of 22,000. As a result of FT-IR analysis, characteristic bands of polybenzoxazole at 1620 cm$^{-1}$ (C=N), and 1058 cm$^{-1}$ (C—N) which were not detected in polyimide. The hollow fiber has a fractional free volume of 0.31, and interplanar distance (d-spacing) of 700 pm. The interplanar distance (d-spacing) was measured by X-ray diffraction (XRD, CuKα ray, 10 to 40 degrees at 0.05 degree intervals, a film sample)

Example 2

A hollow fiber including polybenzothiazole represented by Chemical Formula 52 was prepared using the polythioamic acid-containing dope solution composition for forming a hollow fiber through the following reaction.

[Chemical Formula 52]

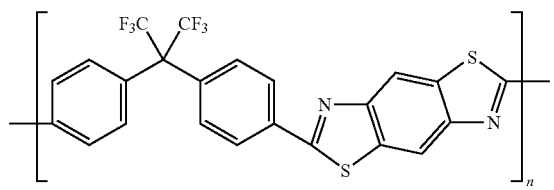

A hollow fiber including polybenzothiazole represented by the above Chemical Formula 52 was prepared in the same manner as in Example 1, except that for starting materials, 20.8 g (0.1 mol) of 2,5-diamino-1,4-benzenedithiol dihydrochloride and 44.4 g (0.1 mol) of 4,4'-(hexafluoroisoproylidene)diphthalic anhydride were reacted to prepare polyamic acid including a thiol group (—SH).

The hollow fiber thus prepared had a weight average molecular weight of 14,500. As a result of FT-IR analysis, characteristic bands of polybenzothiazole at 1484 cm$^{-1}$(C—S) and 1404 cm$^{-1}$(C—S) which were not detected in polyimide. The hollow fiber has a fractional free volume of 0.26, and interplanar distance (d-spacing) of 610 pm. The interplanar distance (d-spacing) was measured by X-ray diffraction (XRD, CuKα ray, 10 to 40 degrees at 0.05 degree intervals, a film sample)

Example 3

A hollow fiber including polypyrrolone represented by Chemical Formula 53 was prepared using the polyaminoamic acid-containing dope solution composition for forming a hollow fiber through the following reaction.

[Chemical Formula 53]

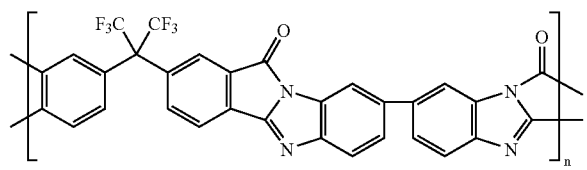

A hollow fiber including polypyrrolone represented by the above Chemical Formula 53 was prepared in the same manner as in Example 1, except that for starting materials, 21.4 g (0.1 mol) of 3,3'-diaminobenzidine and 44.4 g (0.1 mol) of 4,4'-(hexafluoroisoproylidene)diphthalic anhydride were reacted to prepare polyamic acid including an amine group (—NH$_2$).

The hollow fiber thus prepared had a weight average molecular weight of 18,000. As a result of FT-IR analysis, characteristic bands of polypyrrolone at 1758 cm$^{-1}$(C=O) and 1625 cm$^{-1}$(C=N) which were not detected in polyimide. The hollow fiber has a fractional free volume of 0.28, and interplanar distance (d-spacing) of 630 pm. The interplanar distance (d-spacing) was measured by X-ray diffraction (XRD, CuKα ray, 10 to 40 degrees at 0.05 degree intervals, a film sample)

Example 4

A hollow fiber including polybenzoxazole represented by Chemical Formula 54 was prepared using the polyhydroxyamic acid-containing dope solution composition for forming a hollow fiber through the following reaction.

[Chemical Formula 54]

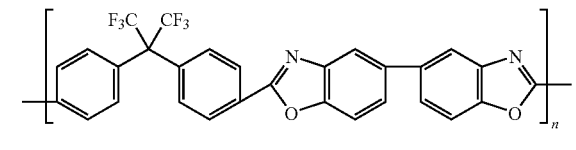

A hollow fiber including polybenzoxazole represented by the above Chemical Formula 54 was prepared in the same manner as in Example 1, except that for starting materials, 21.6 g (0.1 mol) of 3,3'-dihydroxybenzidine and 44.4 g (0.1 mol) of 4,4'-(hexafluoroisoproylidene)diphthalic anhydride was added into 189 g (70 wt %) of N-methylpyrrolidone (NMP) and then reacted at 15° C. for 4 hours to obtain a pale yellow viscous polyamic acid.

The hollow fiber thus prepared had a weight average molecular weight of 19,000. As a result of FT-IR analysis, characteristic bands of polybenzoxazole at 1595 cm$^{-1}$ (C=N), and 1052 cm$^{-1}$(C—O) which were not detected in polyimide. The hollow fiber has a fractional free volume of 0.18, and interplanar distance (d-spacing) of 580 pm. The interplanar distance (d-spacing) was measured by X-ray diffraction (XRD, CuKα ray, 10 to 40 degrees at 0.05 degree intervals, a film sample)

Example 5

A hollow fiber including polypyrrolone represented by Chemical Formula 55 was prepared using the polyaminoamic acid-containing dope solution composition for forming a hollow fiber through the following reaction.

[Chemical Formula 55]

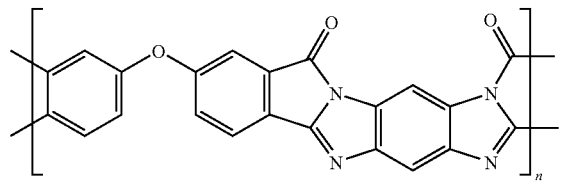

A hollow fiber including polypyrrolone represented by the above Chemical Formula 55 was prepared in the same manner as in Example 1, except that for starting materials, 28.4 g (0.1 mol) of benzene-1,2,4,5-tetraamine tetrahydrochloride and 31.0 g (0.1 mol) of oxydiphthalic anhydride was added into 139 g (70 wt %) of N-methylpyrrolidone (NMP) and then reacted for 4 hours to obtain a pale yellow viscous polyaminoamic acid.

The hollow fiber thus prepared had a weight average molecular weight of 12,460. As a result of FT-IR analysis, characteristic bands of polypyrrolone at 1758 cm$^{-1}$(C=O) and 1625 cm$^{-1}$(C=N) which were not detected in polyimide. The hollow fiber has a fractional free volume of 0.24 and interplanar distance (d-spacing) of 610 pm. The interplanar distance (d-spacing) was measured by X-ray diffraction (XRD, CuKα ray, 10 to 40 degrees at 0.05 degree intervals, a film sample)

Example 6

A hollow fiber including poly(benzoxazole-benzoxazole) copolymer represented by Chemical Formula 56 was prepared through the following reaction.

[Chemical Formula 56]

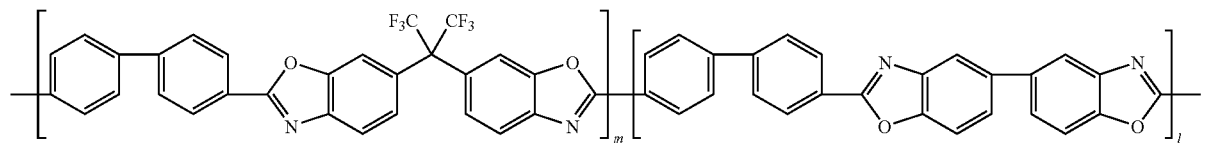

A hollow fiber including poly(benzoxazole-benzoxazole) copolymer (mole ratio, m:l is 5:5) represented by the above Chemical Formula 56 was prepared in the same manner as in Example 1, except that for starting materials, 36.6 g (0.1 mol) of 2,2-bis (3-amino-4-hydroxyphenyl)hexafluoropropane and 21.6 g (0.1 mol) of 3,3'-dihydroxybenzidine was thoroughly dissolved in 272 g (70 wt %) of N-methylpyrrolidone (NMP), and 58.8 g (0.2 mol) of biphthalic anhydride was added slowly thereto to prepare a poly(hydroxyamic acid-hydroxyamic acid) copolymer.

The hollow fiber thus prepared had a weight average molecular weight of 18.290. As a result of FT-IR analysis, characteristic bands of polybenzoxazole at 1620 cm$^{-1}$(C=N) and 1058 cm$^{-1}$(C—N) which were not detected in polyimide. The hollow fiber has a fractional free volume of 0.27 and interplanar distance (d-spacing) of 620 pm. The interplanar distance (d-spacing) was measured by X-ray diffraction (XRD, CuKα ray, 10 to 40 degrees at 0.05 degree intervals, a film sample)

Example 7

A hollow fiber including poly(benzoxazole-imide) copolymer represented by Chemical Formula 57 was prepared through the following reaction.

[Chemical Formula 57]

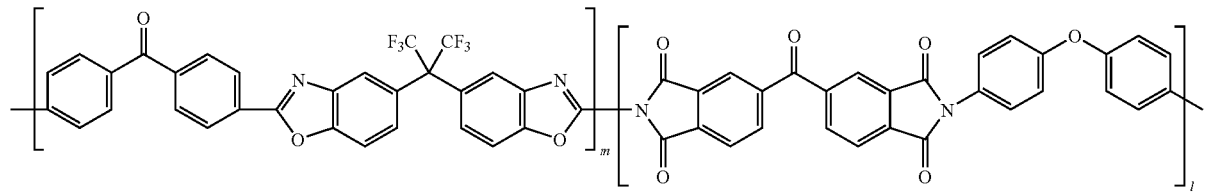

A hollow fiber including poly(benzoxazole-imide) copolymer (mole ratio, m:l is 8:2) represented by the above Chemical Formula 57 was prepared in the same manner as in Example 1, except that for starting materials, 58.60 g (0.16 mol) of 2,2-bis(3-amino-4-hydroxyphenyl)hexafluoropropane and 8.01 g (0.04 mol) of 4,4'-diaminodiphenylether was thoroughly dissolved in 393 g (70 wt %) of N-methylpyrrolidone (NMP), and 64.45 g (20 mol) of 3.3',4,4'-benzophenonetetracarboxylic dianhydride was added slowly thereto to prepare a polyhydroxyamic acid copolymer.

The hollow fiber thus prepared had a weight average molecular weight of 24.210. As a result of FT-IR analysis, characteristic bands of polybenzoxazole at 1620 cm$^{-1}$(C=N) and 1058 cm$^{-1}$(C—N) which were not detected in polyimide and characteristic bands of polyimide at 1720 cm$^{-1}$(C=O)

and 1580 cm$^{-1}$(C=O). The hollow fiber has a fractional free volume of 0.20 and interplanar distance (d-spacing) of 600 pm. The interplanar distance (d-spacing) was measured by X-ray diffraction (XRD, CuKα ray, 10 to 40 degrees at 0.05 degree intervals, a film sample)

Example 8

A hollow fiber including poly(pyrrolone-imide) copolymer represented by Chemical Formula 58 was prepared through the following reaction.

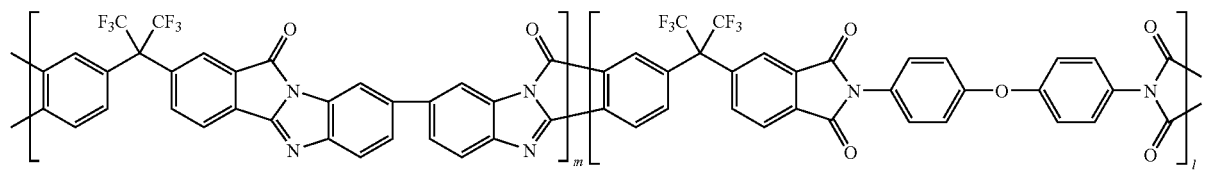

[Chemical Formula 58]

A hollow fiber including poly(pyrrolone-imide) copolymer (mole ratio, m:l is 8:2) represented by the above Chemical Formula 58 was prepared in the same manner as in Example 1, except that for starting materials, 17.1 g (0.08 mol) of 3,3'-diaminobenzidine and 4.0 g (0.02 mol) of 4,4'-diaminodiphenylether was thoroughly dissolved in 196.5 g (75 wt %) of N-methylpyrrolidone (NMP), and 44.4 g (0.1 mol) of 4,4'-(hexafluoroisoproylidene)diphthalic anhydride was added slowly thereto to prepare a polyaminoamic acid copolymer.

The hollow fiber thus prepared had a weight average molecular weight of 19.140. As a result of FT-IR analysis, characteristic bands of polypyrrolone at 1758 cm$^{-1}$(C=O) and 1625 cm$^{-1}$(C=N) which were not detected in polyimide and characteristic bands of polyimide at 1720 cm$^{-1}$(C=O) and 1580 cm$^{-1}$(C=O). The hollow fiber has a fractional free volume, of 0.22 and interplanar distance (d-spacing) of 640 pm. The interplanar distance (d-spacing) was measured by X-ray diffraction (XRD, CuKα ray, 10 to 40 degrees at 0.05 degree intervals, a film sample)

Example 9

A hollow fiber including poly(benzothiazole-imide) copolymer represented by Chemical Formula 59 was prepared through the following reaction.

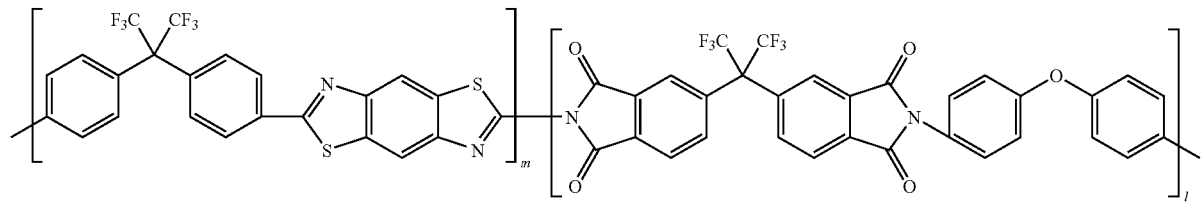

[Chemical Formula 59]

A hollow fiber including poly(benzothiazole-imide) copolymer (mole ratio, m:l is 8:2) represented by the above Chemical Formula 59 was prepared in the same manner as in Example 1, except that for starting materials, 33.30 g (0.16 mol) of 2,5-diamino-1,4-benzenedithiol dihydrochloride and 8.0 g (0.04 mol) of 4,4'-diaminodiphenylether were thoroughly dissolved in 390.3 g (75 wt %) of N-methylpyrrolidone (NMP) as a solvent, and 88.8 g (0.1 mol) of 4,4'-(hexafluoroisoproylidene)diphthalic anhydride was slowly added thereto to prepare a polythioamic acid copolymer.

The hollow fiber thus prepared had a weight average molecular weight of 22.360. As a result of FT-IR analysis, characteristic bands of polybenzothiazole at 1484 cm$^{-1}$(C—S), and 1404 cm$^{-1}$(C—S) which were not detected in polyimide, and characteristic bands of polyimide at 1720 cm$^{-1}$ (C=O) and 1580 cm$^{-1}$(C=O). The hollow fiber has a fractional free volume of 0.23 and interplanar distance (d-spacing) of 650 pm. The interplanar distance (d-spacing) was measured by X-ray diffraction (XRD, CuKα ray, 10 to 40 degrees at 0.05 degree intervals, a film sample)

Example 10

A hollow fiber including poly(benzoxazole-benzothiazole) copolymer represented by Chemical Formula 60 was prepared through the following reaction.

[Chemical Formula 60]

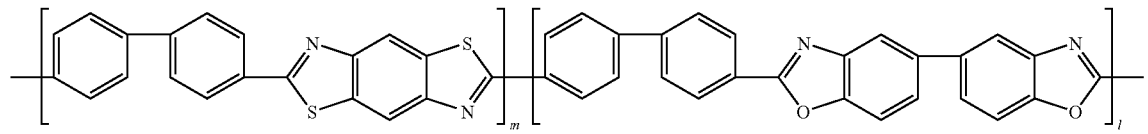

A hollow fiber including a poly(benzoxazole-benzothiazole) copolymer (mole ratio, m:l is 5:5) represented by the above Chemical Formula 60 was prepared in the same manner as in Example 1, except that for starting materials, 10.8 g (0.05 mol) of 3,3'-dihydroxybenzidine and 10.9 g (0.05 mol) of 2,5-diamino-1,4-benzenedithiol dihydrochloride were thoroughly dissolved in 198.3 g (75 wt %) of N-methylpyrrolidone (NMP) as a solvent, and 29.4 g (0.1 mol) of 4,4'-biphthalic anhydride was slowly added thereto to prepare a poly(hydroxyamic acid-thiolamic acid) copolymer.

The hollow fiber thus prepared had a weight average molecular weight of 26.850. As a result of FT-IR analysis, characteristic bands of polybenzoxazole at 1595 cm$^{-1}$ (C=N) and 1052 cm$^{-1}$ (C—N) and characteristic bands of polybenzothiazole at 1484 cm$^{-1}$ (C—S) and 1404 cm$^{-1}$ (C—S) which were not detected in polyimide. The hollow fiber has a fractional free volume of 0.22 and interplanar distance (d-spacing) of 590 pm. The interplanar distance (d-spacing) was measured by X-ray diffraction (XRD, CuKα ray, 10 to 40 degrees at 0.05 degree intervals, a film sample)

Example 11

A hollow fiber including poly(pyrrolone-pyrrolone) copolymer represented by Chemical Formula 61 was prepared through the following reaction.

[Chemical Formula 61]

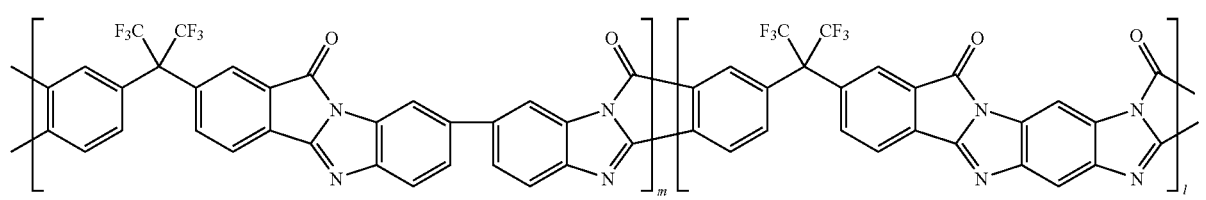

A hollow fiber including poly(pyrrolone-pyrrolone) copolymer (mole ratio, m:l is 8:2) represented by the above Chemical Formula 61 was prepared in the same manner as in Example 1, except that for starting materials. 34.2 g (0.16 mol) of 3,3'-diaminobenzidine and 11.4 g (0.04 mol) of benzene-1,2,4,5-tetraminetetrahydrochloride were thoroughly dissolved in 403.2 g (75 wt %) of N-methylpyrrolidone (NMP) as a solvent, and 88.8 g (20 mmol) of 4,4'-(hexafluoroisoproylidene)diphthalic anhydride was added thereto to prepare a poly(aminoamic acid-aminoamic acid) copolymer.

The hollow fiber thus prepared had a weight average molecular weight, of 13.270. As a result of FT-IR analysis, characteristic bands of polypyrrolone at 1758 cm$^{-1}$(C═O) and 1625 cm$^{-1}$(C═N) which were not detected in polyimide. The hollow fiber has a fractional free volume of 0.21 and interplanar distance (d-spacing) of 600 pm. The interplanar distance (d-spacing) was measured by X-ray diffraction (XRD, CuKα ray, 10 to 40 degrees at 0.05 degree intervals, a film sample)

Example 12

A hollow fiber including poly(benzoxazole-benzothiazole) copolymer represented by Chemical Formula 62 was prepared through the following reaction.

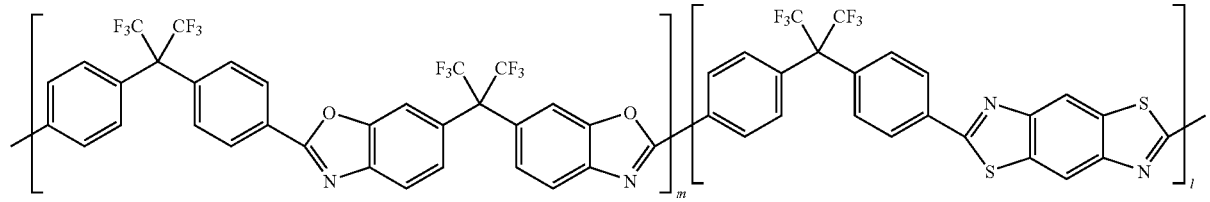

[Chemical Formula 62]

A hollow fiber including poly(benzoxazole-benzothiazole) copolymer (mole ratio, m:l is 8:2) represented by the above Chemical Formula 62 was prepared in the same manner as in Example 1, except that for starting materials, 21.8 g (0.1 mol) of 2,5-diamino-1,4-benzenedithiol dihydrochloride and 36.6 g (0.16 mol) of 2,2'-bis(3-amino-4-hydroxy-phenyl) hexafluoropropane as starting materials were thoroughly dissolved in 441.6 g (75 wt %) of N-methylpyrrolidone (NMP) as a solvent, and 88.8 g (20 mmol) of 4,4'-(hexafluoroisoproylidene)diphthalic anhydride was slowly added thereto to prepare a poly(hydroxyamic acid-thiolamic acid) copolymer.

The hollow fiber thus prepared had a weight average molecular weight of 16,190. As a result of FT-IR analysis, characteristic bands of polybenzoxazole at 1620 cm$^{-1}$(C═N) and 1058 cm$^{-1}$(C—N) and characteristic bands of polybenzothiazole at 1484 cm$^1$ (C—S) and 1404 cm$^{-1}$(C—S) which were not detected in polyimide. The hollow fiber has a fractional free volume of 0.29 and interplanar distance (d-spacing) of 710 pm. The interplanar distance (d-spacing) was measured by X-ray diffraction (XRD, CuKα ray. 10 to 40 degrees at 0.05 degree intervals, a film sample)

Example 13

A hollow fiber was prepared according to the same method as Example 1 except for preparing a homogenous solution by adding 5 wt % of tetrahydrofuran and 15 wt % of polyvinylpyrrolidone as additives.

The hollow fiber thus prepared had a weight average molecular weight of 22,000. As a result of FT-IR analysis, characteristic bands of polybenzoxazole at 1620 cm$^{-1}$(C═N) and 1058 cm$^{-1}$(C—N) which were not detected in polyimide. The hollow fiber has a fractional free volume of 0.31 and interplanar distance (d-spacing) of 720 pm. The interplanar distance (d-spacing) was measured by X-ray diffraction (XRD, CuKα ray, 10 to 40 degrees at 0.05 degree intervals, a film sample)

Example 14

A hollow fiber was prepared according to the same method as Example 1 except for preparing a homogenous solution by adding 5 wt % of tetrahydrofuran and 15 wt % of propyleneglycol as additives.

The hollow fiber thus prepared had a weight average molecular weight of 22,000. As a result of FT-IR analysis, characteristic bands of polybenzoxazole at 1620 cm$^{-1}$(C═N) and 1058 cm$^{-1}$(C—N) which were not detected in polyimide. The hollow fiber has a fractional free volume of 0.31 and interplanar distance (d-spacing) of 710 pm. The interplanar distance (d-spacing) was measured by X-ray diffraction (XRD, CuKα ray, 10 to 40 degrees at 0.05 degree intervals, a film sample)

Example 15

A hollow fiber was prepared according to the same method as Example 1 except for preparing a homogenous solution by adding and mixing 15 wt % of polyethyleneglycol additive (Aldrich, molecular weight 2000) as a pore-controlling agent.

The hollow fiber thus prepared had a weight average molecular weight of 22.000. As a result of FT-IR analysis, characteristic bands of polybenzoxazole at 1620 cm$^{-1}$(C═N) and 1058 cm$^{-1}$(C—N) which were not detected in polyimide. The hollow fiber has a fractional free volume of 0.31 and interplanar distance (d-spacing) of 710 pm. The interplanar distance (d-spacing) was measured by X-ray diffraction (XRD, CuKα ray, 10 to 40 degrees at 0.05 degree intervals, a film sample)

Example 16

A hollow fiber was prepared according to the same method as in Example 1 except for heat treatment at 450° C. for 30 minutes heat treatment after imidizing at 300° C. for 1 hour.

The hollow fiber thus prepared had a weight average molecular weight of 22,000. As a result of FT-IR analysis, characteristic bands of polybenzoxazole at 1620 cm$^{-1}$(C═N) and 1058 cm$^{-1}$(C—N) which were not detected in polyimide. The hollow fiber has a fractional free volume of 0.26 and interplanar distance (d-spacing) of 620 pm. The interplanar distance (d-spacing) was measured by X-ray diffraction (XRD, CuKα ray, 10 to 40 degrees at 0.05 degree intervals, a film sample)

Example 17

A hollow fiber was prepared according to the same method as in Example 1 except for heat treatment at 400° C. for 30 minutes heat treatment after imidizing at 300° C. for 1 hour.

The hollow fiber thus prepared had a weight average molecular weight of 22.000. As a result of FT-IR analysis, characteristic bands of polybenzoxazole at 1620 cm$^{-1}$ (C=N) and 1058 cm$^{-1}$ (C—N) which were not detected in polyimide. The hollow fiber has a fractional free volume of 0.22 and interplanar distance (d-spacing) of 570 pm. The interplanar distance (d-spacing) was measured by X-ray diffraction (XRD, CuKα ray, 10 to 40 degrees at 0.05 degree intervals, a film sample)

Comparative Example 1

As disclosed in Korean Patent laid open No. 2002-0015749, 35 wt % of polyethersulfone(Sumitomo, sumikaexcel) was dissolved in 45 wt % of NMP, and 5 wt % of tetrahydrofuran and 15 wt % of ethanol as additives were added thereto to prepare a homogenous solution. The solution was spun through a double nozzle with a 10 cm-wide air gap. It was washed with flowing water for 2 days and dried under vacuum for 3 hours or more, preparing a hollow fiber.

Comparative Example 2

A hollow fiber was prepared according to the same method as Example 1 except for not performing heat treatment process.

Comparative Example 3

According to PCT publication No. WO2005/007277, 4,4'-diaminodiphenylether (ODA) was reacted with benzophenone tetracarboxylic acid dianhydride (BTDA) to prepare polyamic acid (PAA). 19 wt % of the polyamic acid (PAA) was dissolved in N-methylpyrrolidone (NMP) to prepare a solution. Next, 50 wt % of polyvinylpyrrolidone (PVP) was dissolved in N-methylpyrrolidone (NMP) to prepare an additive solution and added to the polyamic acid (PAA) solution. Then, glycerol (GLY) and N-methylpyrrolidone (NMP) were added to the solution. The final solution included polyamic acid/polyvinylpyrrolidone/glycerol/N-methylpyrrolidone (PAA/PVP/GLY/NMP) respectively in an amount ratio of 13/1/17/69 wt %. The spinning solution was mixed for 12 hours before spinning.

Next, 20° C. water was used as an internal coagulant, and then, the spinning solution was discharged through spinnerette. The internal coagulant was injected at a flow rate of 12 ml/min. Then, a hollow fiber was spinned at a speed of 4 cm/s, so that it can just stay for 6 seconds in an air cap. Herein, a membrane was solidified in 30° C. 100% water. Next, it was washed with water for 2 to 4 hours until a remaining solvent and glycerol were completely extracted at a room temperature. Then, it was dried in air. It was imidized in a nitrogen purged oven. Next, it was heated up to 150° C. for 3 hours, heated at 150° C. for 1 hour, heated up to 250° C. for 2 hours, kept being heated at 250° C. for 2 hours, and slowly cooled down at a room temperature for 4 hours. The polyimide/PVP membrane had an exterior diameter of 2.2 mm and a thickness of 0.3 mm.

Experimental Example 1

Electron-Scanning Microscope Analysis

Figure 2:
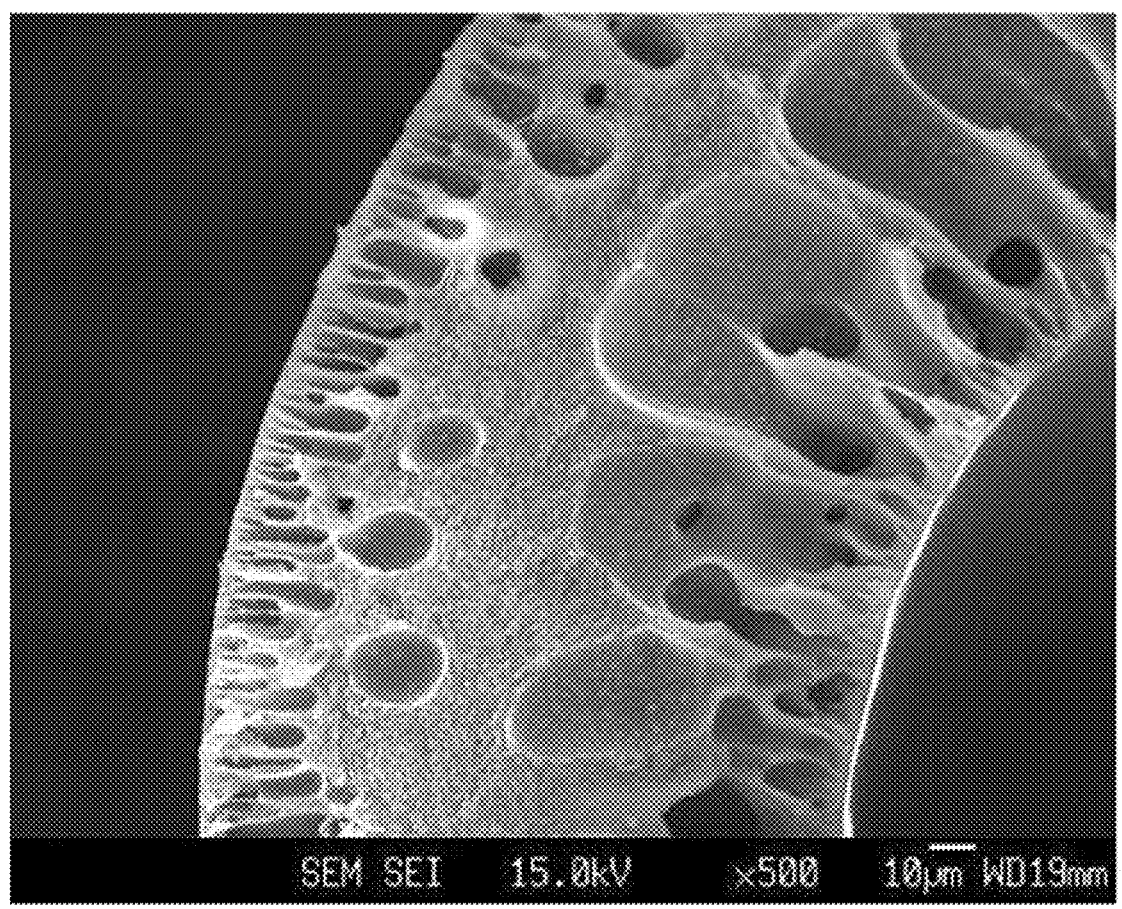
FIG. 2 is a cross-sectional scanning electron microscope (SEM) image of a hollow fiber prepared in Example 1 at 500× magnification.
Figure 3:
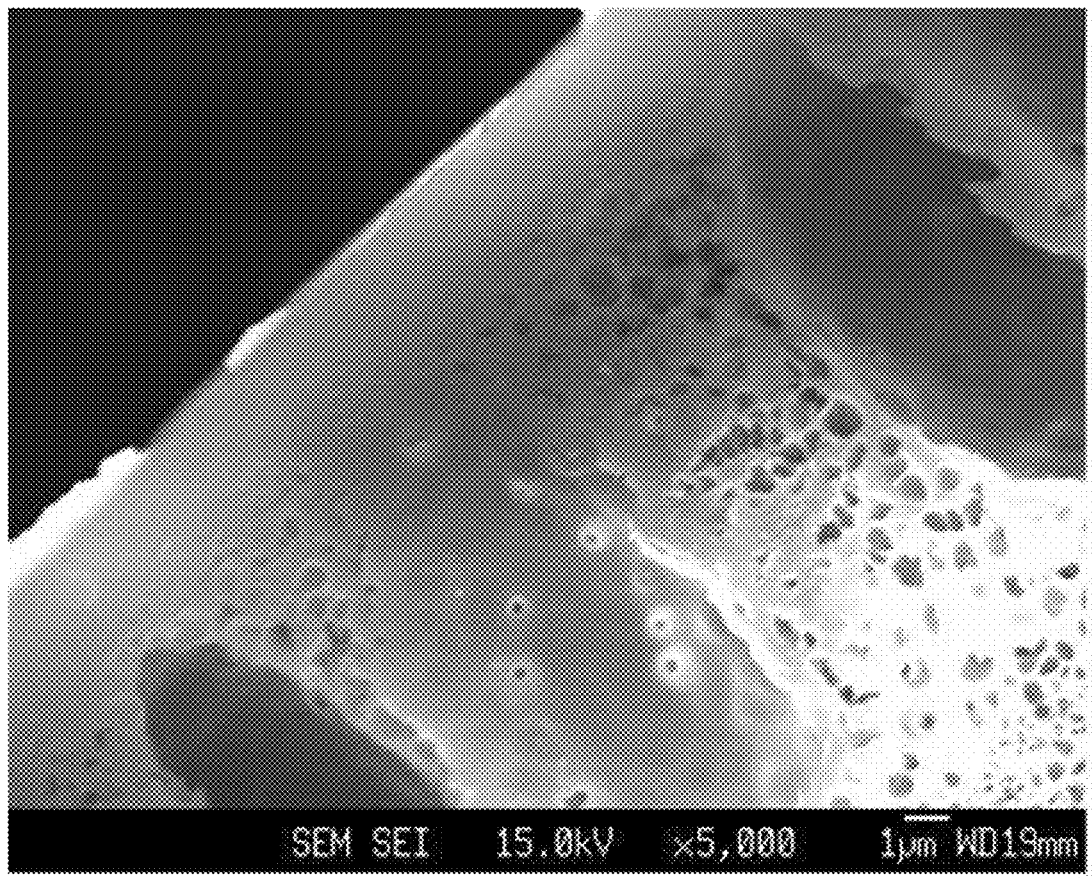
FIG. 3 is a cross-sectional scanning electron microscope (SEM) image of a hollow fiber prepared in Example 1 at 5,000× magnification.

FIGS. 1, 2, and 3 show 100×, 500×, and 5,000× magnification electron-scanning microscope photographs of the partial cross-section of the hollow fiber according to Example 1. From FIG. 1, the hollow fiber according to Example 1 has uniform thickness in concentric circle direction, and macrovoids and mesopores are uniformly distributed. FIG. 2 show that wall thicknesses of the hollow fiber according to Example 1 are uniform to be 120 micrometers, and also indicates that inside and outside surfaces of the hollow fiber has a dense layer. FIG. 3 is a cross-sectional view at the outside surface of the hollow fiber according to Example 1 that 2 micrometer dense layer is uniformly formed.

Figure 4:
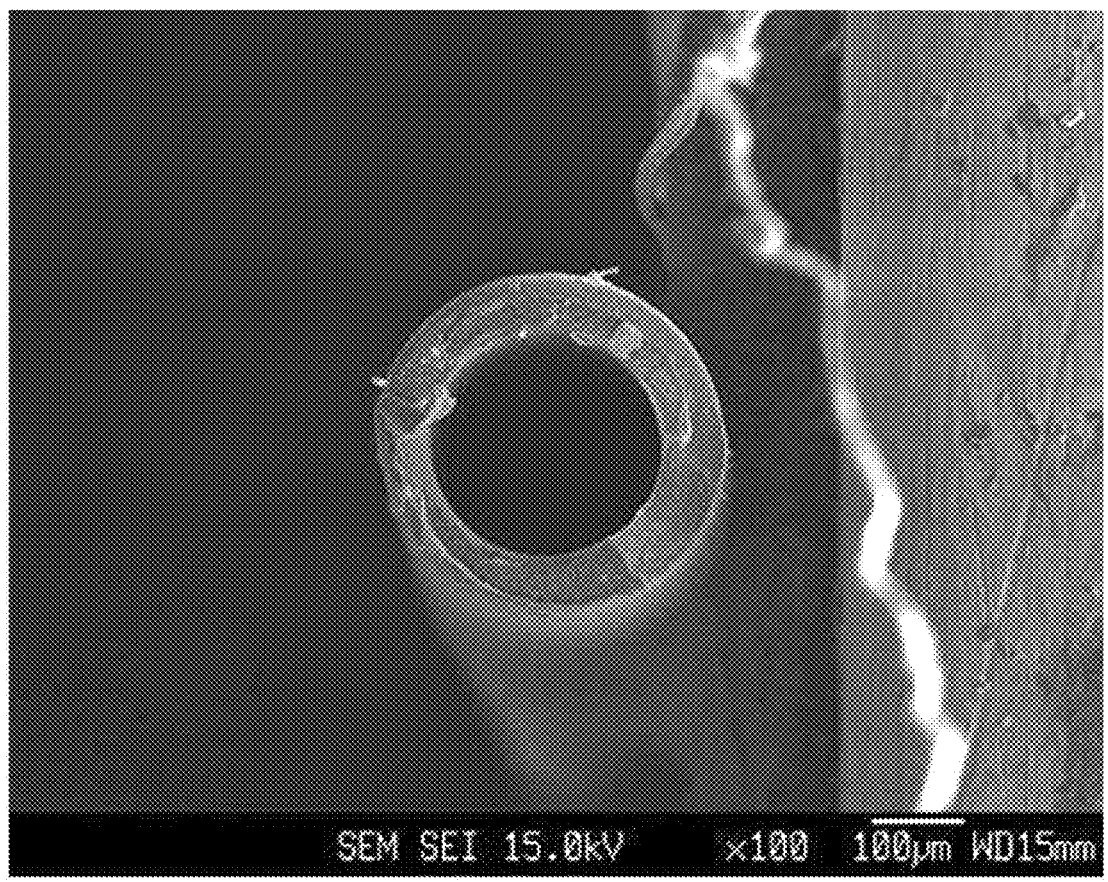
FIG. 4 is a cross-sectional scanning electron microscope (SEM) image of a hollow fiber prepared in Example 14 at 100× magnification.
Figure 5:
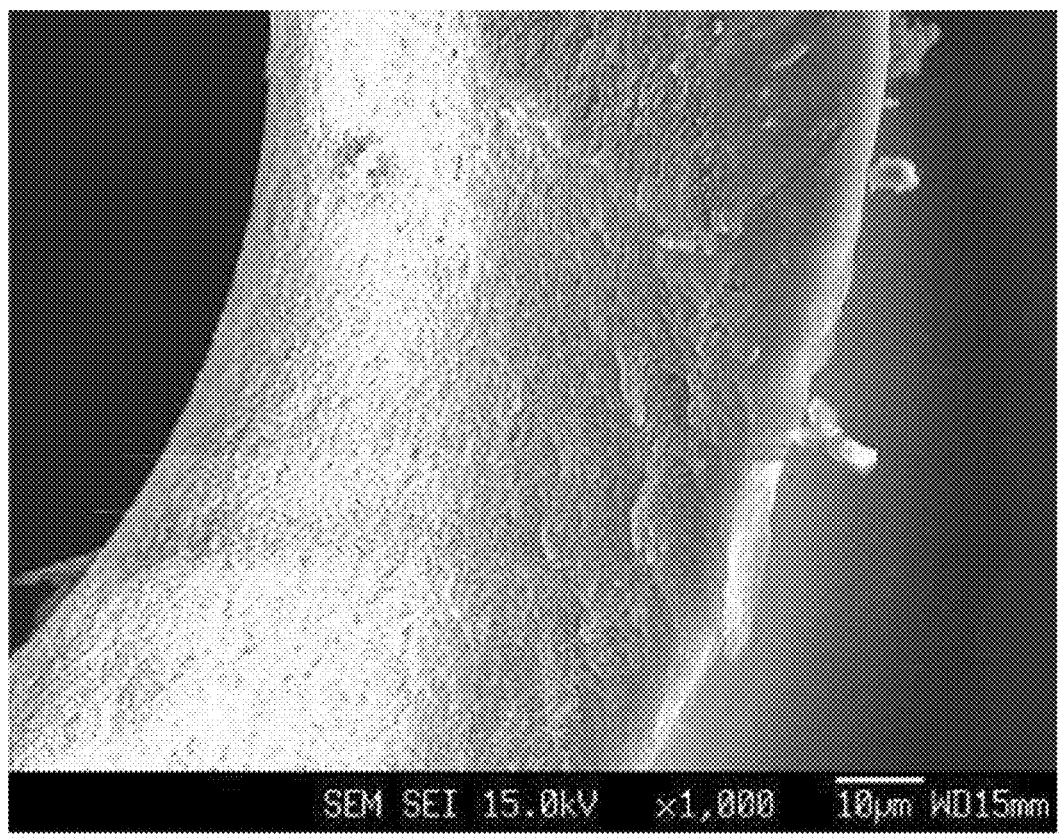
FIG. 5 is a cross-sectional scanning electron microscope (SEM) image of a hollow fiber prepared in Example 14 at 1,000× magnification.
Figure 6:
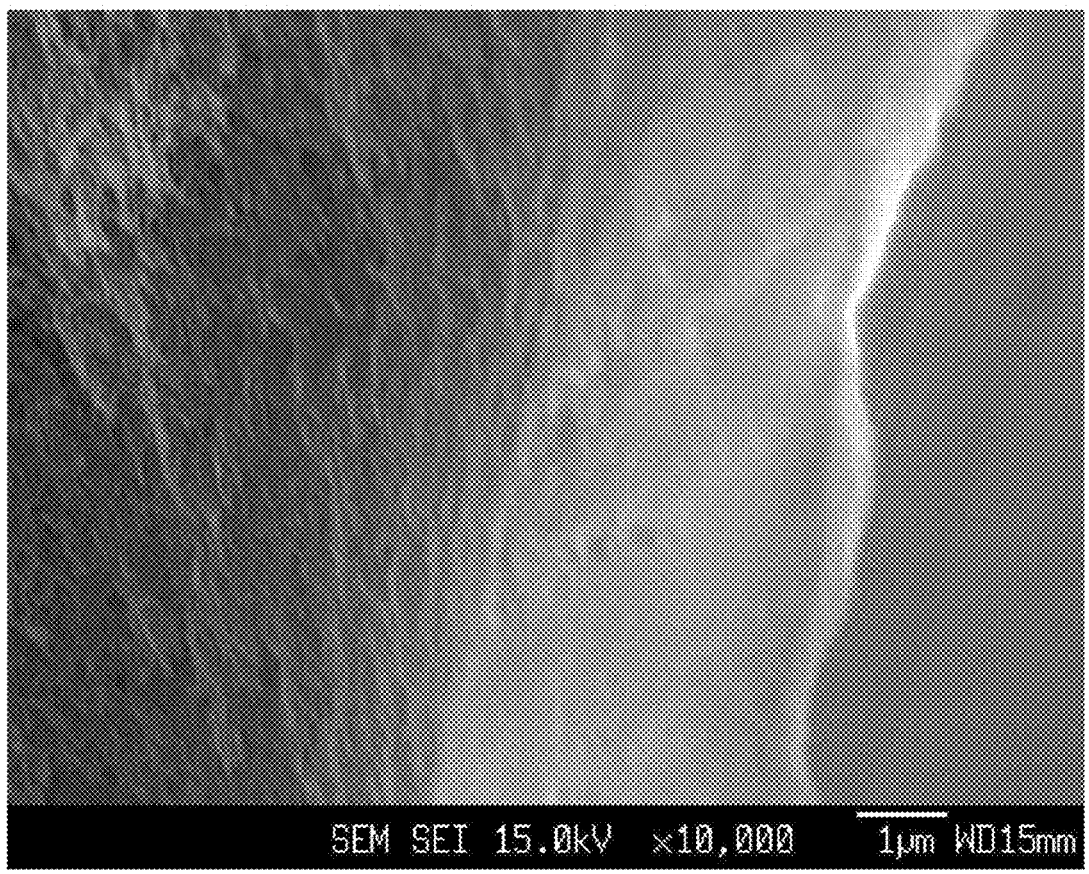
FIG. 6 is a cross-sectional scanning electron microscope (SEM) image of a hollow fiber prepared in Example 14 at 10,000× magnification.

FIGS. 4 to 6 are scanning electron microscope (SEM) photographs of a hollow fiber prepared in Example 14 at 100×, 1,000×, and 10,000× magnification, respectively From FIG. 4, the hollow fiber according to Example 14 has uniform thickness in concentric circle direction, and macrovoids and mesopores are uniformly distributed. From FIG. 5, the hollow fiber according to Example 14 has about 80 micrometer thickness and has a sponge structure without macrovoids. From FIG. 6, the hollow fiber according to Example 14 has a sponge structure that includes a dense layer of 3 micrometer thickness and a sub-layer including mesopores at outside surface.

From FIGS. 1 to 6, the hollow fibers according to one embodiment of the present invention had no defect on the surface of the dense layer.

Experimental Example 2

Measurement of Gas Permeability and Selectivity

The hollow fibers according to Examples 1 to 17 and Comparative Examples 1 to 3 were evaluated as follows regarding gas permeability and selectivity. The results are provided in Table 1, and FIGS. 7 and 8.

The gas permeance is a gas permeability speed against a membrane measured by fabricating a separation membrane module for gas permeance with a hollow fiber and measuring a gas permeance amount by the following Equation 1. As for a gas permeance unit, used is GPU (Gas Permeation Unit, $1 \times 10^{-6}$ cm$^3$/cm$^2$.sec.cmHg).

The selectivity was indicated as a permeance ratio obtained by measuring an individual gas against the same membrane.

$$P = \frac{dp}{dt}\left[\frac{VT_0}{P_0 TP_f A_{\text{eff}}}\right] \quad \text{[Equation 1]}$$

In the Equation 1.

P indicates gas permeance, dp/dt indicates a pressure increase rate, V indicates a lower volume, and $P_f$ indicates difference between upper and lower pressures.

T indicates a temperature during the measurement. $A_{\text{eff}}$ indicates an effective area, and $P_0$ and $T_0$ indicate standard pressure and temperature.

TABLE 1

| | $H_2$ permeance (GPU) | $O_2$ permeance (GPU) | $CO_2$ permeance (GPU) | $O_2/N_2$ selectivity | $CO_2/CH_4$ selectivity |
|---|---|---|---|---|---|
| Example 1 | 1,417 | 396 | 1,821 | 4.6 | 39.6 |
| Example 2 | 671 | 125 | 314 | 5.4 | 17.4 |
| Example 3 | 396 | 92 | 378 | 4.2 | 36.3 |
| Example 4 | 86 | 5.2 | 18.6 | 6.4 | 48.9 |
| Example 5 | 149 | 41 | 175 | 6.6 | 48.6 |
| Example 6 | 417 | 67 | 289 | 6.4 | 43.1 |
| Example 7 | 512 | 148 | 451 | 4.4 | 19.3 |
| Example 8 | 200 | 40 | 209 | 5.1 | 36.7 |
| Example 9 | 1,100 | 247 | 462 | 6.5 | 21.6 |
| Example 10 | 509 | 110 | 364 | 6.1 | 33.1 |
| Example 11 | 350 | 89 | 451 | 5.6 | 41.0 |
| Example 12 | 3,200 | 790 | 3,011 | 4.0 | 20.5 |
| Example 13 | 640 | 127 | 401 | 4.7 | 21.0 |
| Example 14 | 2,153 | 607 | 2,842 | 5.0 | 42.4 |
| Example 15 | 2,957 | 852 | 3,651 | 4.5 | 29.4 |
| Example 16 | 648 | 103 | 476 | 5.0 | 52.3 |
| Example 17 | 138 | 15 | 60 | 7.1 | 49.8 |
| Comparative Example 1 | 65 | 16 | 52 | 5.0 | 31.1 |
| Comparative Example 2 | 21.7 | 1.42 | 23.6 | 4.9 | 20.7 |
| Comparative Example 3 | 12.1 | 0.66 | 2.47 | 6.0 | 30.9 |

Referring to Table 1, a hollow fiber according to Examples 1 to 17 of the present invention had excellent gas permeance against gas such as $H_2$, $O_2$, $CO_2$, and the like compared with the one of Comparative Examples 1 to 3.

Figure 7:
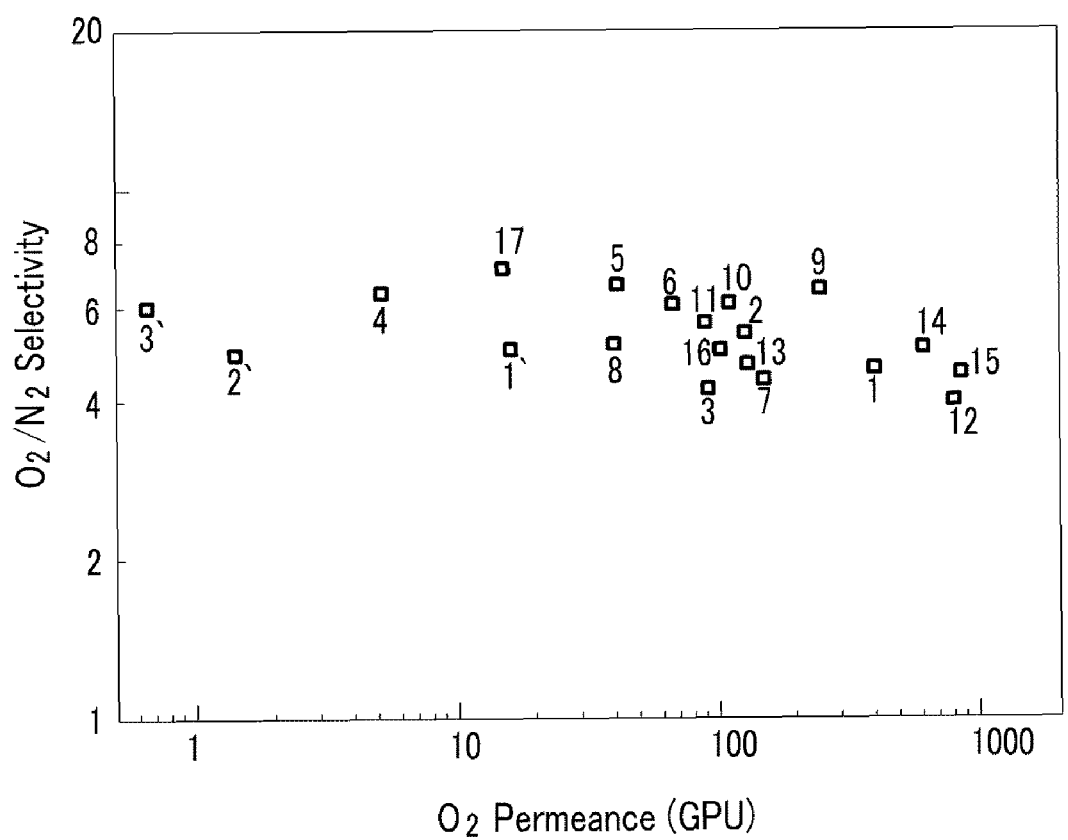
FIG. 7 is a graph comparing oxygen permeance (GPU) and oxygen/nitrogen selectivity for hollow fibers prepared in Examples 1 to 17 and Comparative Examples 1 to 3 (the numbers 1' to 3' indicate Comparative Examples 1 to 3, respectively; and the numbers 1 to 17 indicate Examples 1 to 17, respectively)

FIG. 7 is a graph showing oxygen permeance and oxygen/nitrogen selectivity comparison of GPU units of the hollow fibers according to Example 1 to 17 and Comparative Example 1 to 3.

Figure 8:
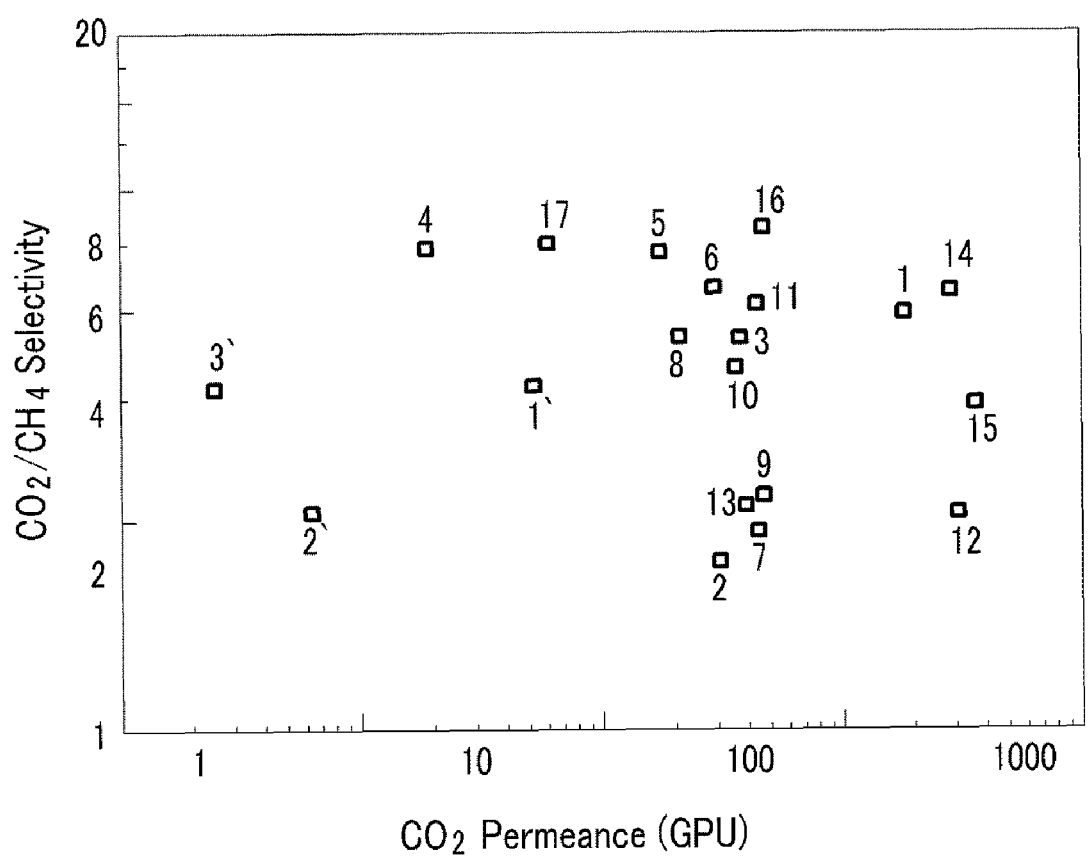
FIG. 8 is a graph comparing carbon dioxide permeance (GPU) and carbon dioxide/methane selectivity for hollow fibers prepared in Examples 1 to 17 and Comparative Examples 1 to 3 (the numbers 1' to 3' indicate Comparative Examples 1 to 3, respectively; and the numbers 1 to 17 indicate Examples 1 to 17, respectively).

FIG. 8 is a graph showing carbon dioxide permeance and carbon dioxide/methane selectivity comparison of GPU units of the hollow fibers according to Example 1 to 17 and Comparative Examples 1 to 3.

Referring to FIGS. 7 and 8, the hollow fiber according to Examples of the present invention had similar oxygen/nitrogen selectivity or carbon dioxide/methane selectivity to those of Comparative Examples but excellent permeance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hollow fiber comprising:
   a hollow positioned at the center of the hollow fiber,
   macropores positioned at adjacent to the hollow, and
   mesopores and picopores positioned at adjacent to macropores
   wherein the picopores are three dimensionally connected to each other to form a three dimensional network structure,
   the hollow fiber comprises a polymer derived from polyamic acid, and
   the polyamic acid comprises a repeating unit obtained from aromatic diamine including at least one ortho-positioned functional group with respect to an amine group and dianhydride,
   wherein the ortho-positioned functional group comprises OH or SH.

2. The hollow fiber of claim 1, wherein the hollow fiber comprises a dense layer including picopores at a surface portion.

3. The hollow fiber of claim 2, wherein the dense layer has a structure where the number of the picopores increases as near to the surface of the hollow fiber.

4. The hollow fiber of claim 1, wherein the three dimensional network structure where at least two picopores are three-dimensionally connected comprises an hourglass shaped structure forming a narrow valley at connection parts.

5. The hollow fiber of claim 1, wherein the polymer has a fractional free volume (FFV) of about 0.15 to about 0.40.

6. The hollow fiber of claim 1, wherein the polymer has interplanar distance (d-spacing) of about 580 pm to about 800 pm measured by X-ray diffraction (XRD).

7. The hollow fiber of claim 1, wherein the polymer comprsies picopores, and the picopores has a full width at half maximum (FWHM) of about 10 pm to about 40 pm meaaured by positron annihilation lifetime spectroscopy (PALS).

8. The hollow fiber of claim 1, wherein the polymer has a BET (Brunauer, Emmett, Teller) surface area of about 100 to about 1,000 $m^2/g$.

9. The hollow fiber of claim 1, wherein the polyamic acid is selected from the group consisting of the polyamic acid represented by the following Chemical Formulae 1 to 4, the polyamic acid copolymers represented by the following Chemical Formulae 5 to 8, copolymers thereof, and blends thereof:

[Chemical Formula 1]

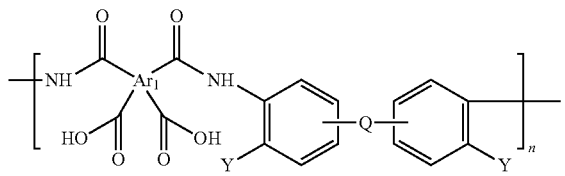

[Chemical Formula 2]

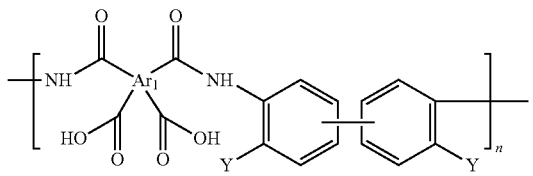

[Chemical Formula 3]

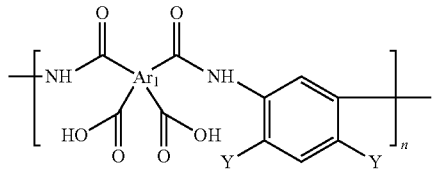

[Chemical Formula 4]

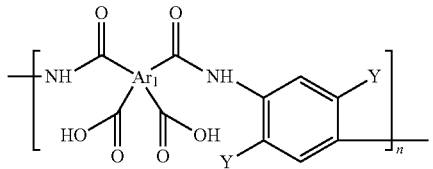

-continued

[Chemical Formula 5]

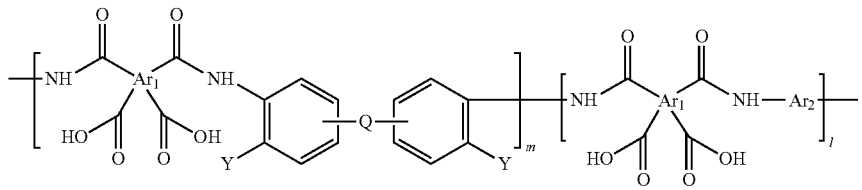

[Chemical Formula 6]

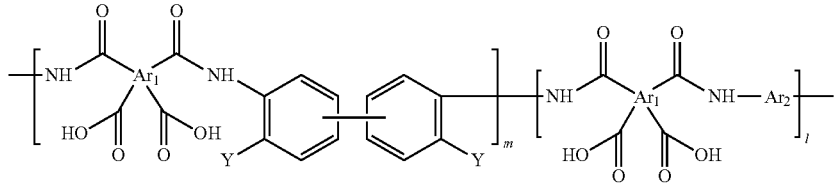

[Chemical Formula 7]

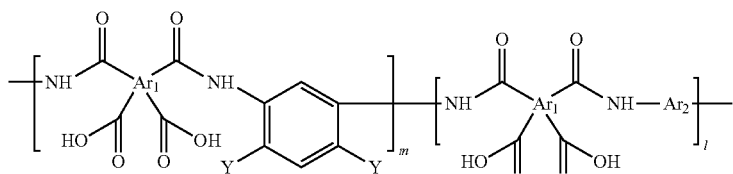

[Chemical Formula 8]

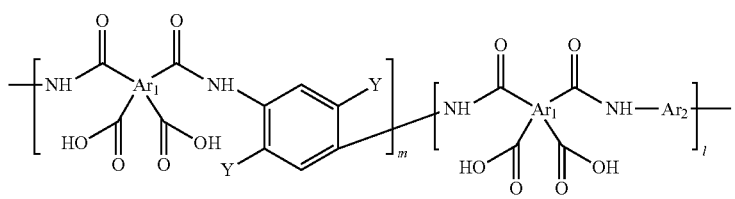

wherein in the above Chemical Formulae 1 to 8, $Ar_1$ is an aromatic group selected from a substituted or unsubstituted quadrivalent C6 to C24 arylene group and a substituted or unsubstituted quadrivalent C4 to C24 heterocyclic group, where the aromatic group is present singularly; at least two aromatic groups are fused to form a condensed cycle; or at least two aromatic groups are linked by single bond or a functional group selected from O, S, C(=O), S(=O)$_2$, Si(CH$_3$)$_2$, (CH$_2$)$_p$ (where $1 \leq p \leq 10$), (CF$_2$)$_q$ (where $1 \leq q \leq 10$), C(CH$_3$)$_2$, C(CF$_3$)$_2$, or C(=O)NH, $Ar_2$ is an aromatic group selected from a substituted or unsubstituted divalent C6 to C24 arylene group and a substituted or unsubstituted divalent C4 to C24 heterocyclic group, where the aromatic group is present singularly; at least two aromatic groups are fused to form a condensed cycle; or at least two aromatic groups are linked by single bond or a functional group selected from O, S, C(=O), S(=O)$_2$, Si(CH$_3$)$_2$, (CH$_2$)$_p$ (where $1 \leq p \leq 10$), (CF$_2$)$_q$ (where $1 \leq q \leq 10$), C(CH$_3$)$_2$, C(CF$_3$)$_2$, or C(=O)NH, Q is O, S, C(=O), CH(OH), S(=O)$_2$, Si(CH$_3$)$_2$, (CH$_2$)$_p$ (where $1 \leq p \leq 10$), (CF$_2$)$_q$ (where $1 \leq q \leq 10$), C(CH$_3$)$_2$, C(CF$_3$)$_2$, C(=O)NH, C(CH$_3$)(CF$_3$), or a substituted or unsubstituted phenylene group (where the substituted phenylene group is a phenylene group substituted with a C1 to C6 alkyl group or a C1 to C6 haloalkyl group), where the Q is linked with aromatic groups with m-m, m-p, p-m, or p-p positions, Y is the same or different from each other in each repeating unit and independently selected from OH, or SH, n is an integer ranging from 20 to 200, m is an integer ranging from 10 to 400, and l is an integer ranging from 10 to 400.

10. The hollow fiber of claim 9, wherein $Ar_1$ is selected from one of the following Chemical Formulae:

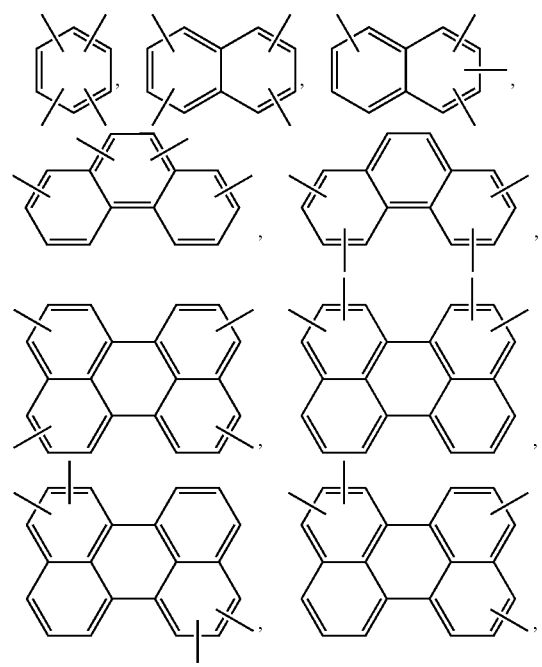

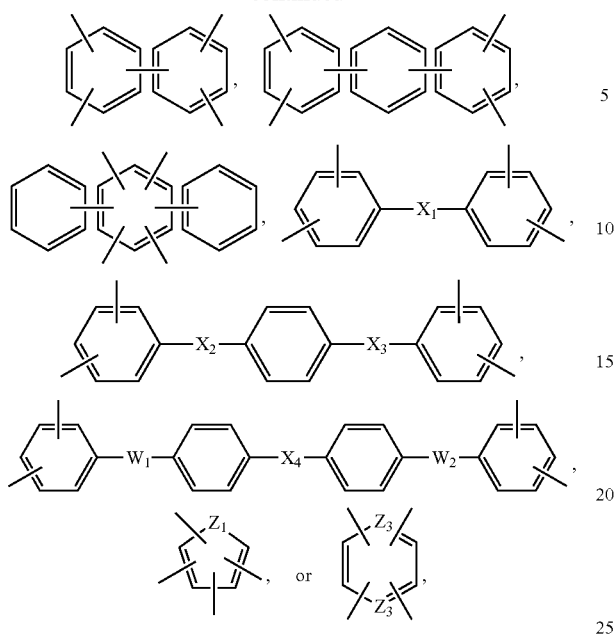

wherein, in the above Chemical Formulae, $X_1$, $X_2$, $X_3$, and $X_4$ are the same or different and independently O, S, C(=O), CH(OH), S(=O)$_2$, Si(CH$_3$)$_2$, (CH$_2$)$_p$ (where $1 \leq p \leq 10$), (CF$_2$)$_q$ (where $1 \leq q \leq 10$), C(CH$_3$)$_2$, C(CF$_3$)$_2$, or C(=O)NH, $W_1$ and $W_2$ are the same or different, and independently O, S, or C(=O), $Z_1$ is O, S, CR$_1$R$_2$ or NR$_3$, where R$_1$, R$_2$, and R$_3$ are the same or different from each other and independently hydrogen or a C1 to C5 alkyl group, and $Z_2$ and $Z_3$ are the same or different from each other and independently N or CR$_4$ (where, R$_4$ is hydrogen or a C1 to C5 alkyl group), provided that both $Z_2$ and $Z_3$ are not CR$_4$.

11. The hollow fiber of claim 10, wherein Ar$_1$ is selected from one of the following Chemical Formulae:

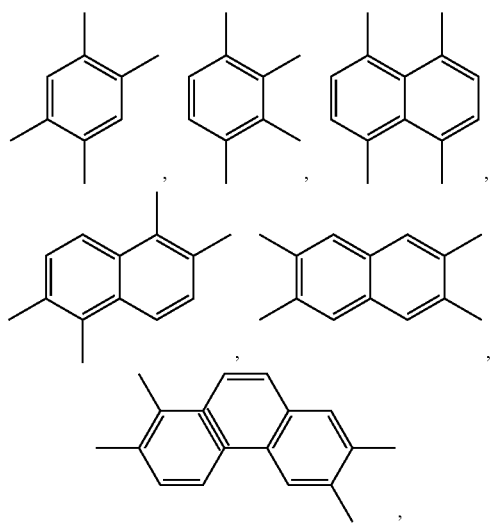

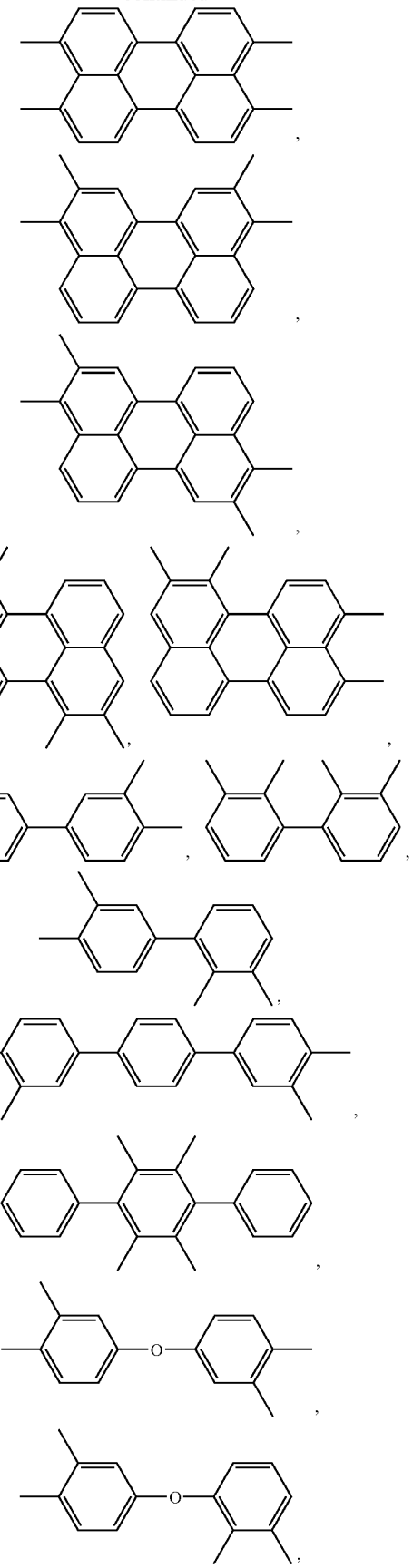

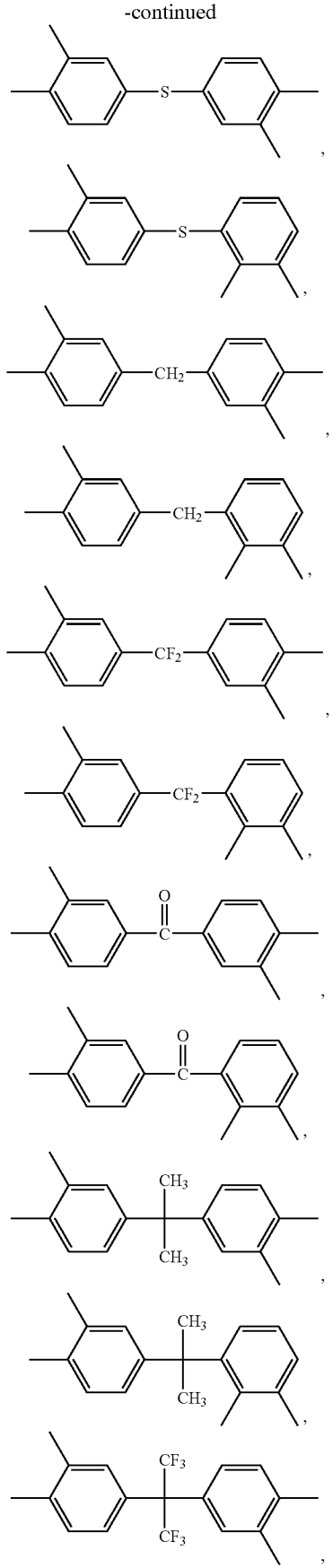
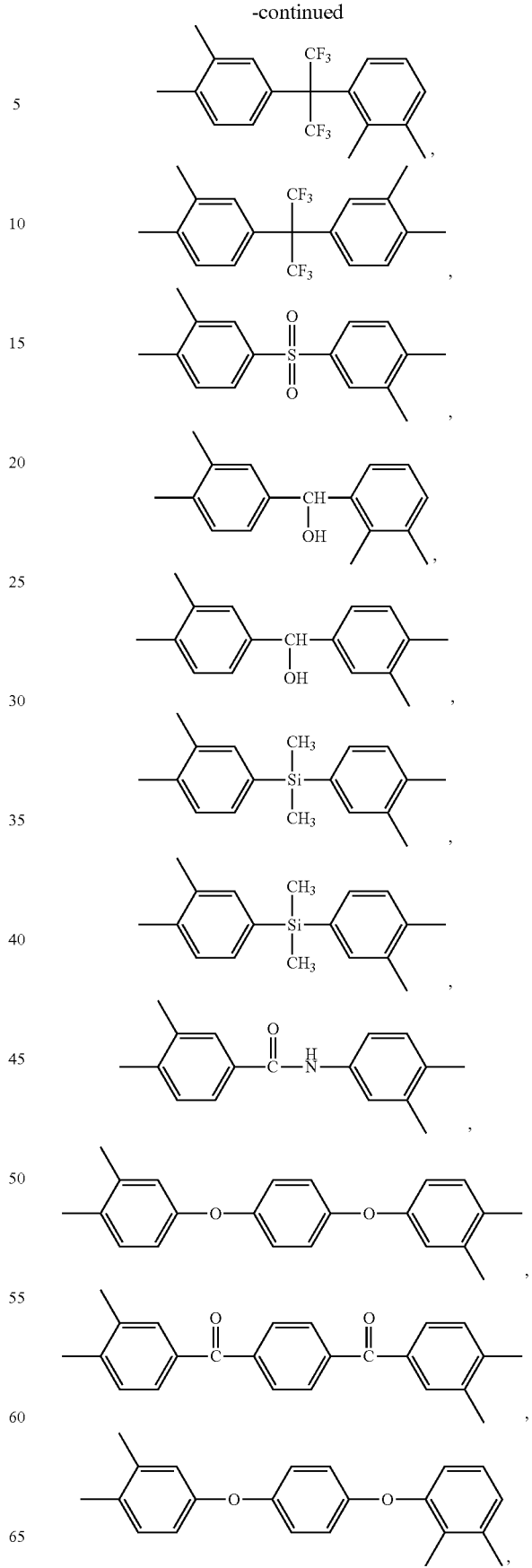

-continued

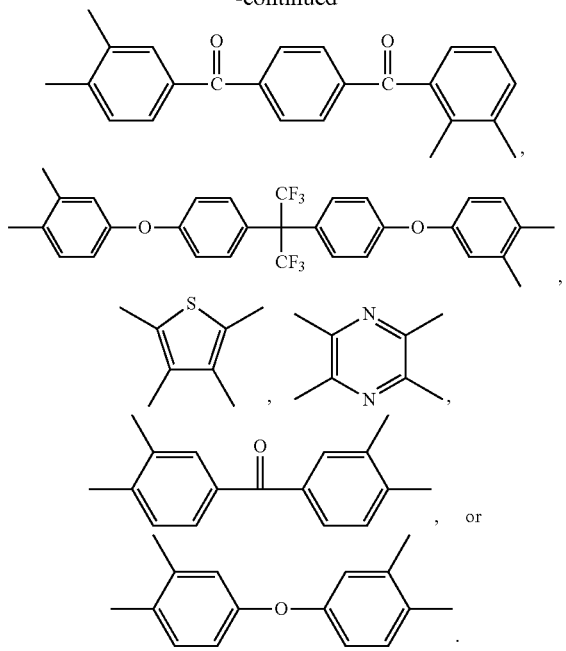

12. The hollow fiber of claim 9, wherein Ar$_2$ is selected from one of the following Chemical Formulae:

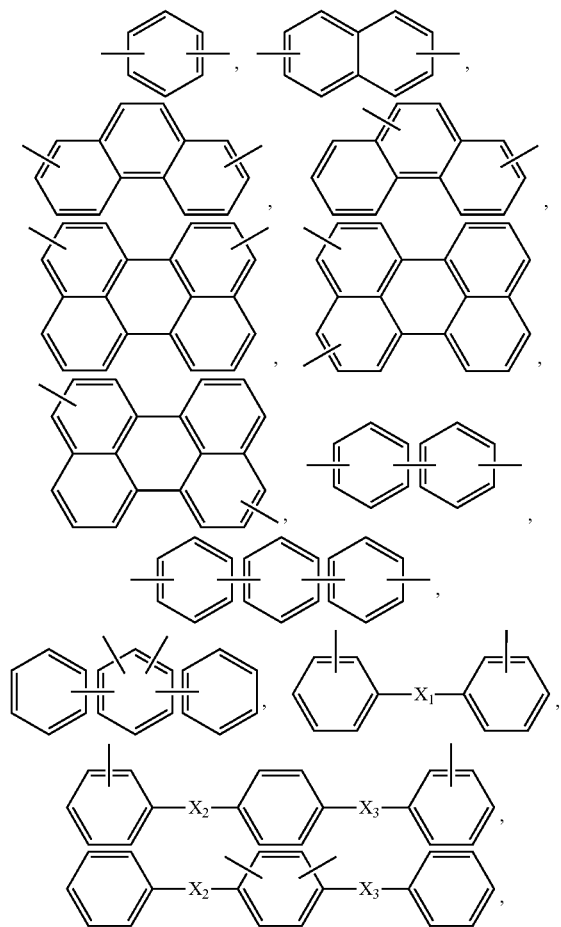

-continued

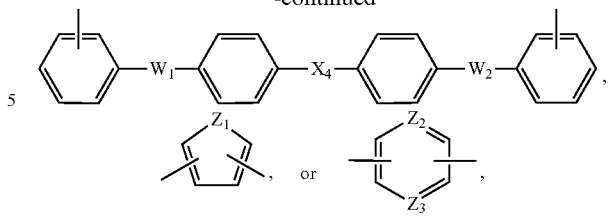

wherein, in the above Chemical Formulae,

X$_1$, X$_2$, X$_3$, and X$_4$ are the same or different, and independently O, S, C(=O), CH(OH), S(=O)$_2$, Si(CH$_3$)$_2$, (CH$_2$)$_p$ (where $1 \leq p \leq 10$), (CF$_2$)$_q$, (where $1 \leq q \leq 10$), C(CH$_3$)$_2$, C(CF$_3$)$_2$, or C(=O)NH, W$_1$ and W$_2$ are the same or different, and independently O, S, or C(=O), Z$_1$ is O, S, CR$_1$R$_2$ or NR$_3$, where R$_1$, R$_2$ and R$_3$ are the same or different from each other and independently hydrogen or a C1 to C5 alkyl group, and Z$_2$ and Z$_3$ are the same or different from each other and independently N or CR$_4$ (where, R$_4$ is hydrogen or a C1 to C5 alkyl group), provided that both Z$_2$ and Z$_3$ are not CR$_4$.

13. The hollow fiber of claim 12, wherein Ar$_2$ is selected from one of the following Chemical Formulae:

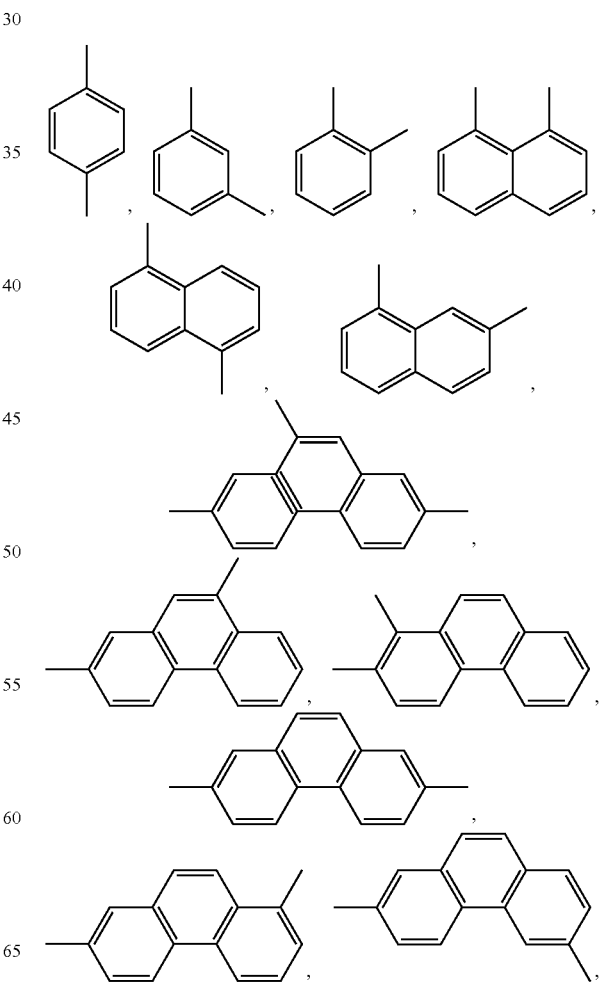

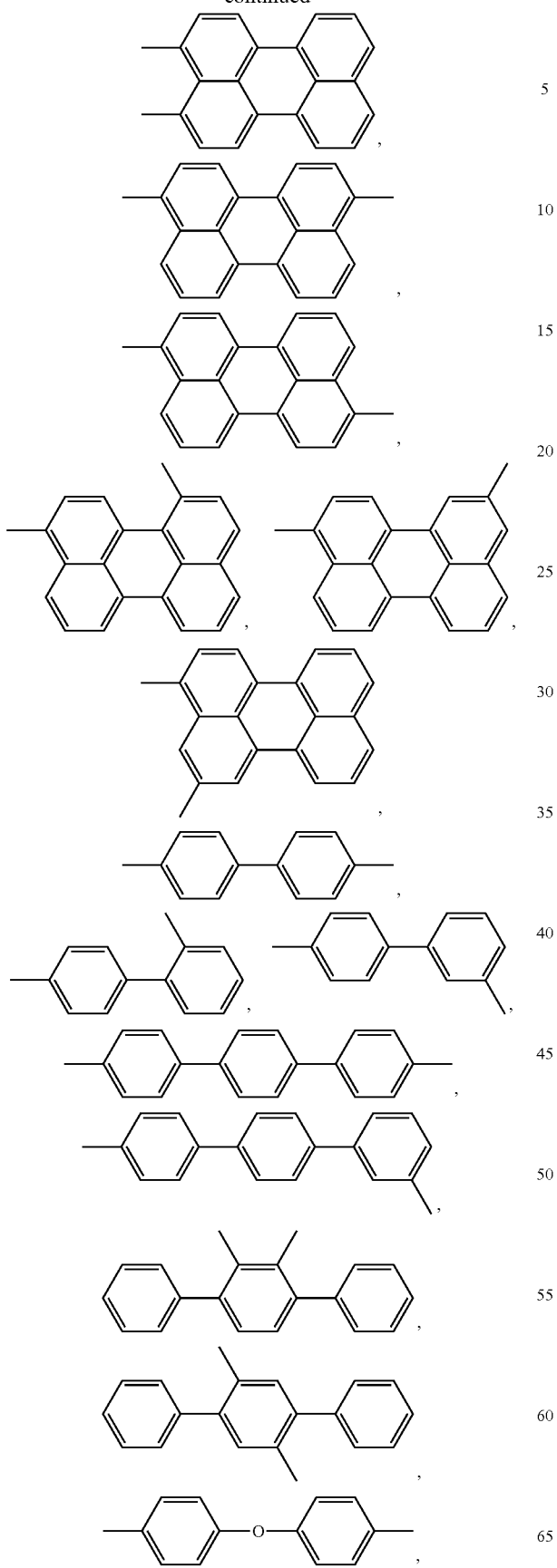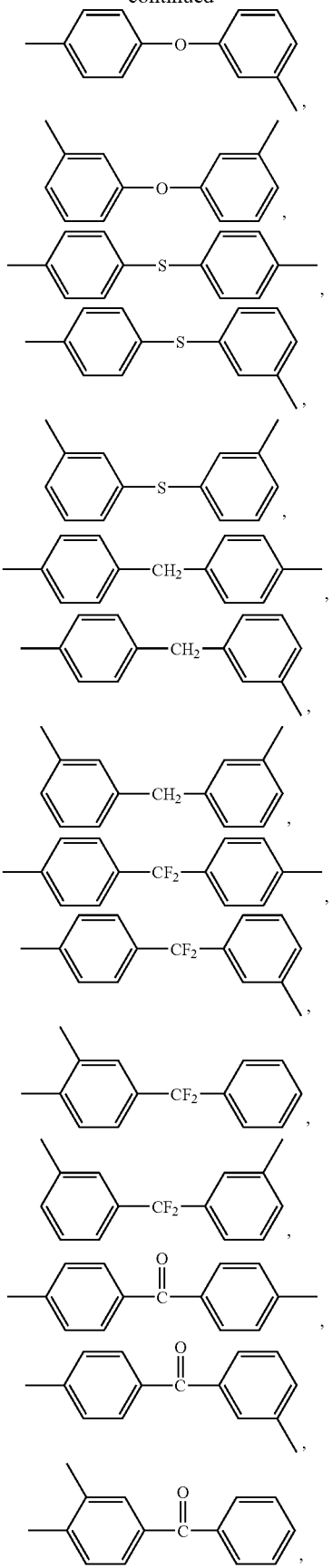

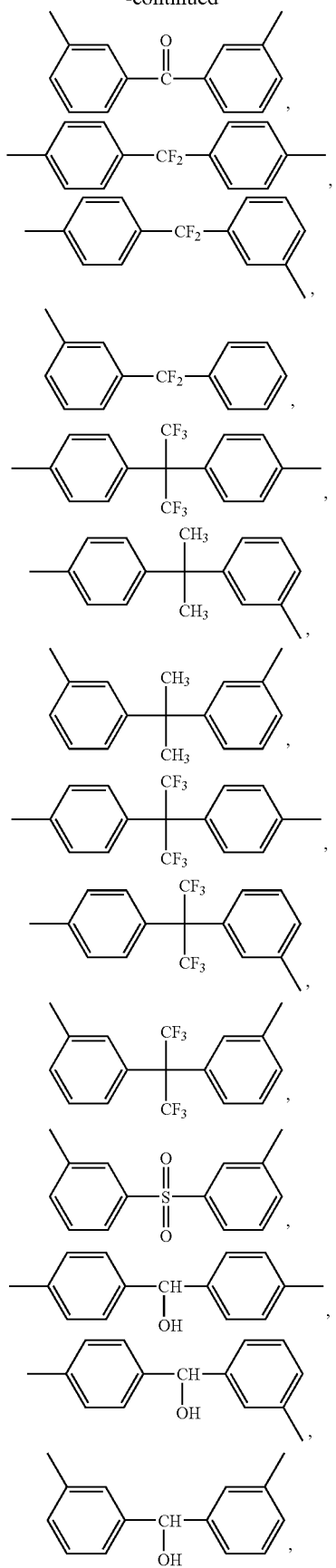
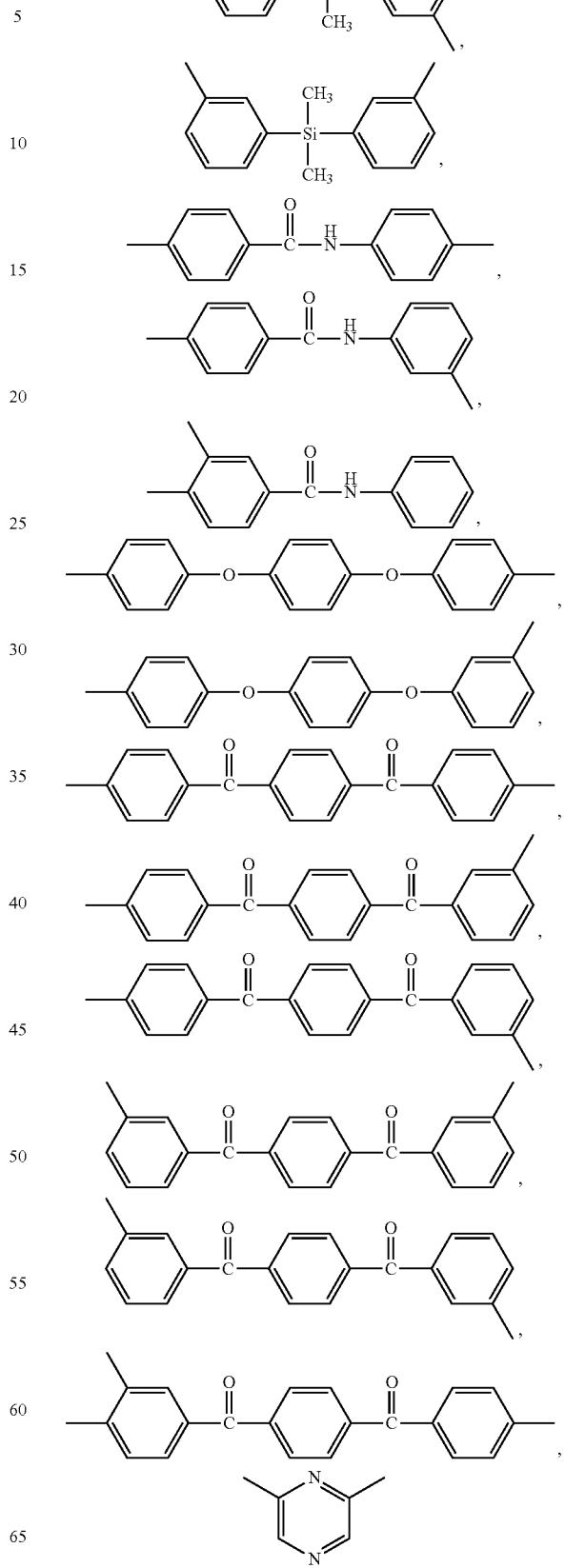

-continued

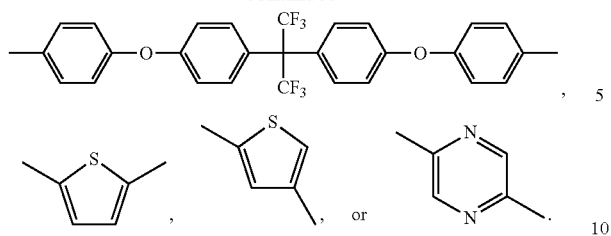,

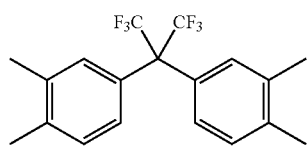, 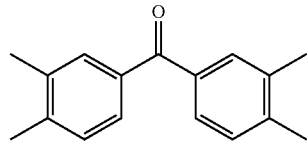, or 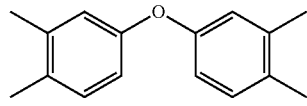.

14. The hollow fiber of claim 9, wherein Q is selected from $C(CH_3)_2$, $C(CF_3)_2$, O, S, $S(=O)_2$, or $C(=O)$.

15. The hollow fiber of claim 9, wherein $Ar_1$ is a functional group represented by the following Chemical Formula A, B, or C, $Ar_2$ is a functional group represented by the following Chemical Formula D or E, and Q is $C(CF_3)_2$:

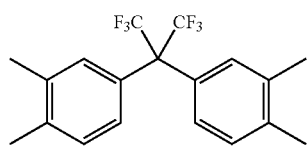 [Chemical Formula A]

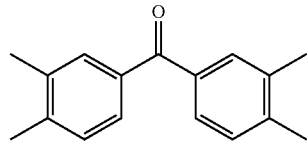 [Chemical Formula B]

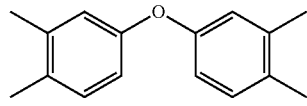 [Chemical Formula C]

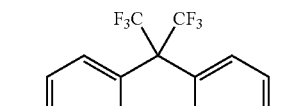 [Chemical Formula D]

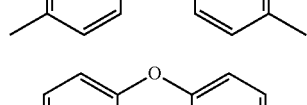 [Chemical Formula E]

16. The hollow fiber of claim 9, wherein a mole ratio of each repeating unit represented by the above Chemical Formulae 1 to 4 in the polyamic acid copolymers or an m:l mole ratio in the above Chemical Formula 5 to Chemical Formula 8 ranges from 0.1:9.9 to 9.9:0.1.

17. The hollow fiber of claim 1, wherein the polymer comprises a polymer represented by one of the following Chemical Formulae 19 to 32, or copolymers thereof:

[Chemical Formula 19]

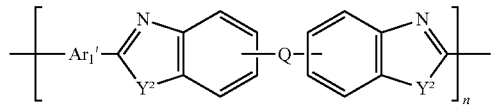

-continued

[Chemical Formula 21]

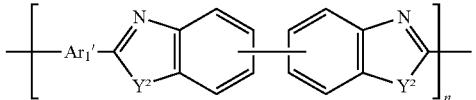

[Chemical Formula 23]

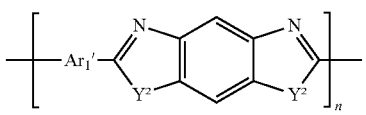

[Chemical Formula 24]

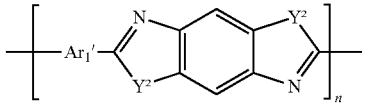

[Chemical Formula 26]

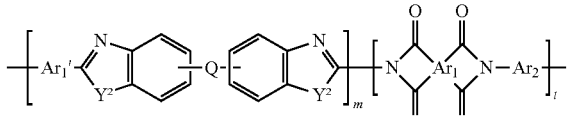

[Chemical Formula 28]

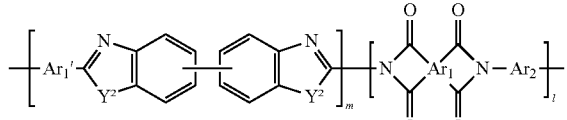

[Chemical Formula 30]

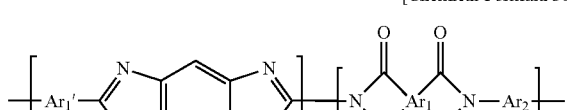

[Chemical Formula 31]

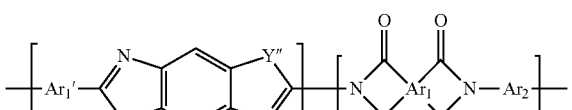

wherein in the above Chemical Formulae, $Ar_1$ is an aromatic group selected from a substituted or unsubstituted quadrivalent C6 to C24 arylene group and a substituted or unsubstituted quadrivalent C4 to C24 heterocyclic group, where the aromatic group is present singularly; at least two aromatic groups are fused to form a condensed cycle; or at least two aromatic groups are linked by single bond or a functional group selected from O, S, $C(=O)$, $S(=O)_2$, $Si(CH_3)_2$, $(CH_2)_p$ (where $1 \leq p \leq 10$), $(CF_2)_q$ (where $1 \leq q \leq 10$), $C(CH_3)_2$, $C(CF_3)_2$, or $C(=O)NH$, $Ar_1'$ and $Ar_2$ are the same or different, and independently an aromatic group selected from a substituted or unsubstituted divalent C6 to C24 arylene group and a substituted or unsubstituted divalent C4 to C24 heterocyclic group, where the aromatic group is present singularly; at least two aromatic groups are fused to form a condensed cycle; or at least two aromatic groups are linked by single bond or a functional group selected from O, S, C(=O), S(=O)$_2$, Si(CH$_3$)$_2$, (CH$_2$)$_p$ (where 1≦p≦10), (CF$_2$)$_q$ (where 1≦q≦10), C(CH$_3$)$_2$, C(CF$_3$)$_2$, or C(=O)NH, Q is O, S, C(=O), CH(OH), S(=O)$_2$, Si(CH$_3$)$_2$, (CH$_2$)$_p$ (where 1≦p≦10), (CF$_2$)$_q$ (where 1≦q≦10), C(CH$_3$)$_2$, C(CF$_3$)$_2$, C(=O)NH, C(CH$_3$)(CF$_3$), or a substituted or unsubstituted phenylene group (where the substituted phenylene group is a phenylene group substituted with a C1 to C6 alkyl group or a C1 to C6 haloalkyl group), where the Q is linked with aromatic groups with m-m, m-p, p-m, or p-p positions, Y" is O or S, n is an integer ranging from 20 to 200, m is an integer ranging from 10 to 400, and l is an integer ranging from 10 to 400.

18. The hollow fiber of claim 17, wherein Ar$_1$ is selected from the following Chemical Formulae:

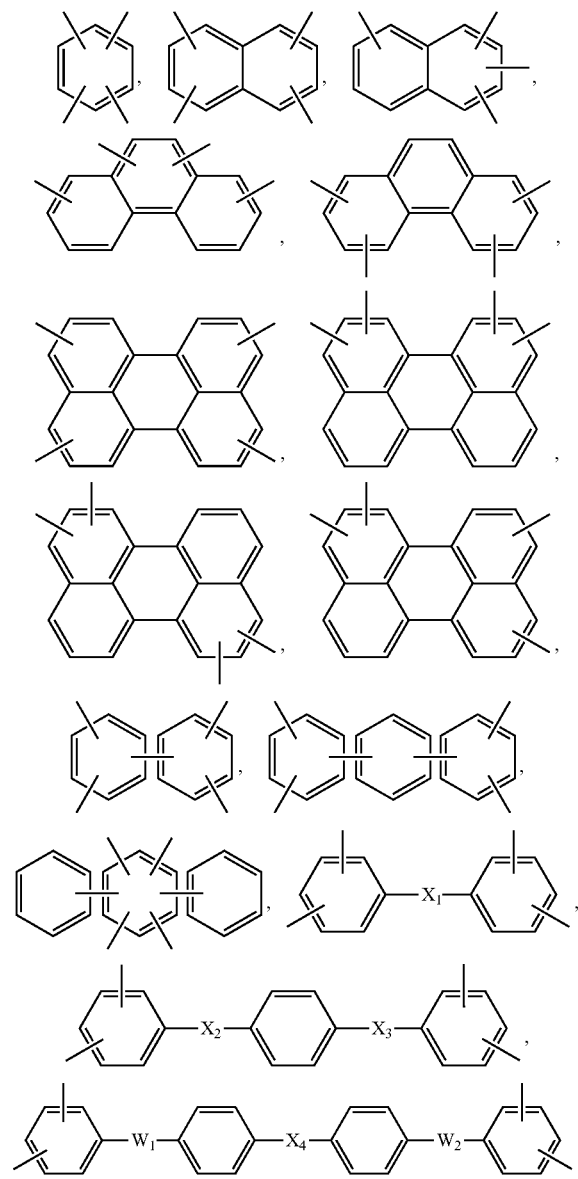

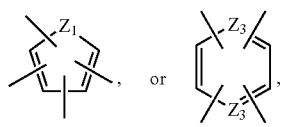

wherein, in the above Chemical Formulae,

X$_1$, X$_2$, X$_3$, and X$_4$ are the same or different and independently O, S, C(=O), CH(OH), S(=O)$_2$, Si(CH$_3$)$_2$, (CH$_2$)$_p$ (where 1≦p≦10), (CF$_2$)$_q$ (where 1≦q≦10), C(CH$_3$)$_2$, C(CF$_3$)$_2$, or C(=O)NH, W$_1$ and W$_2$ are the same or different, and independently O, S, or C(=O), Z$_1$ is O, S, CR$_1$R$_2$ or NR$_3$, where R$_1$, R$_2$, and R$_3$ are the same or different from each other and independently hydrogen or a C1 to C5 alkyl group, and Z$_2$ and Z$_3$ are the same or different from each other and independently N or CR$_4$ (where, R$_4$ is hydrogen or a C1 to C5 alkyl group), provided that both Z$_2$ and Z$_3$ are not CR$_4$.

19. The hollow fiber of claim 18, wherein Ar$_1$ is selected from one of the following Chemical Formulae:

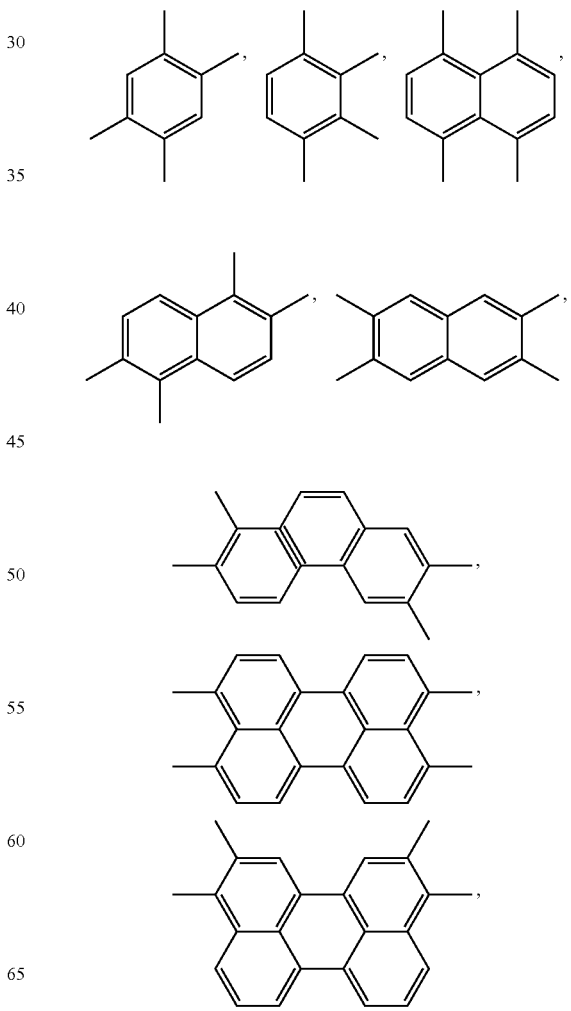

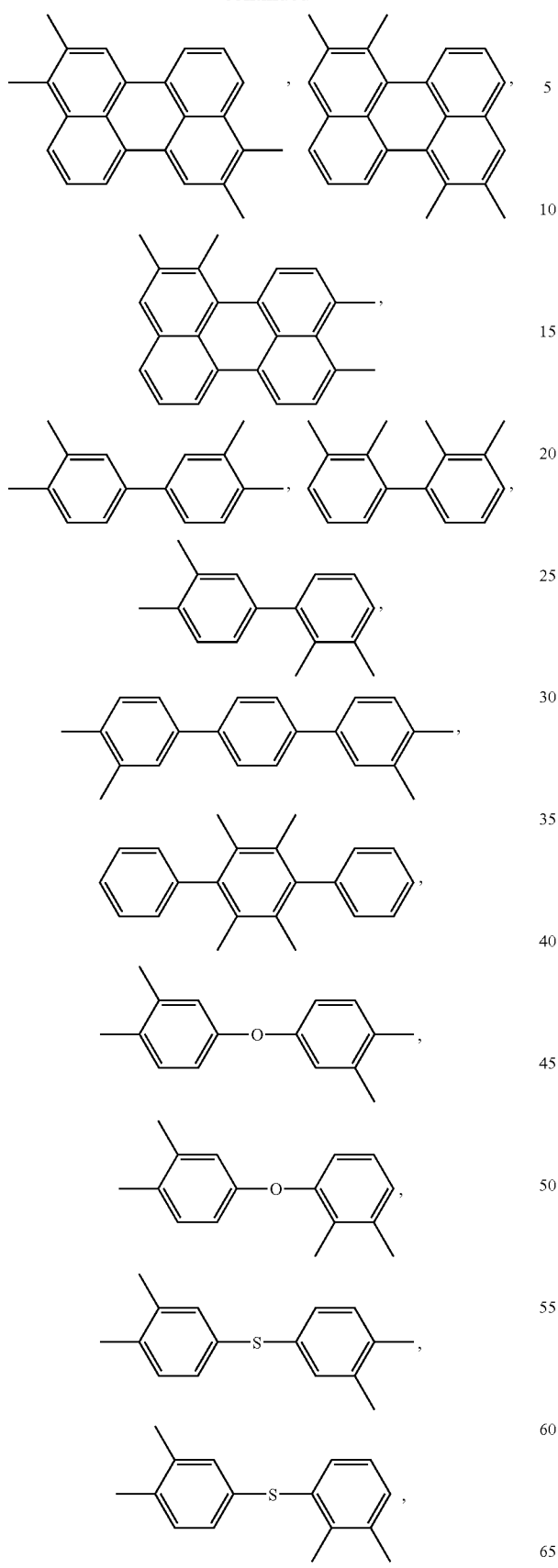
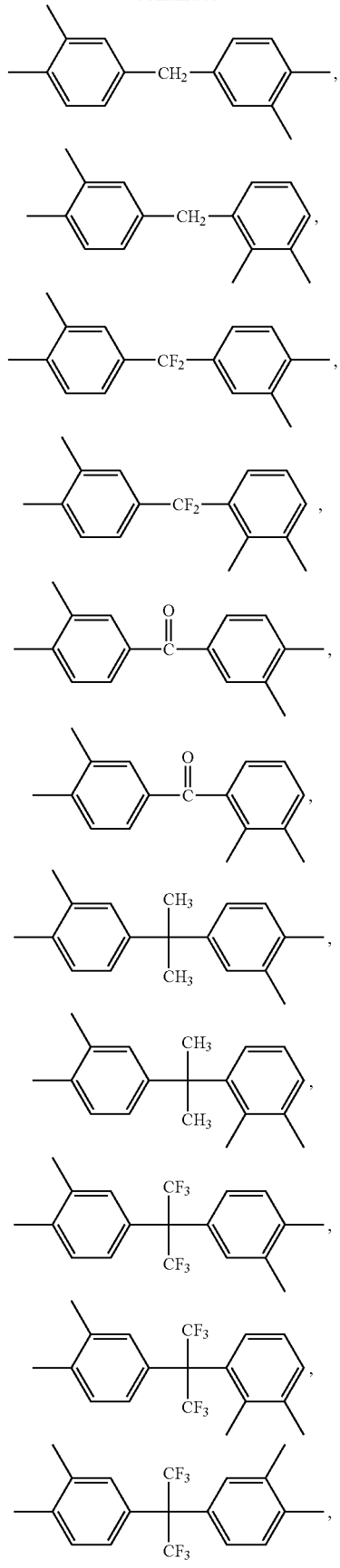

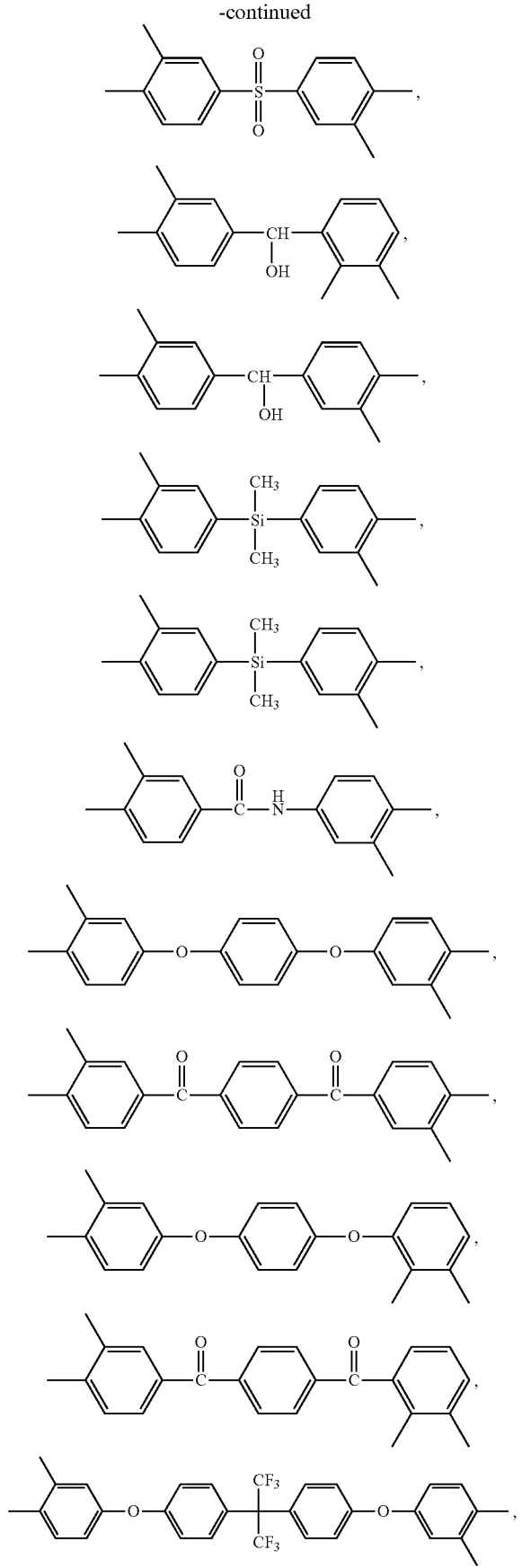
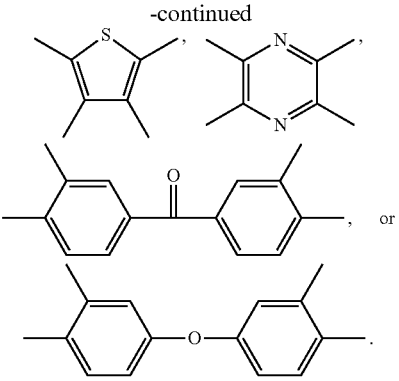
20. The hollow fiber of claim 17, wherein $Ar_1'$ and $Ar_2$ are selected from one of the following Chemical Formulae:
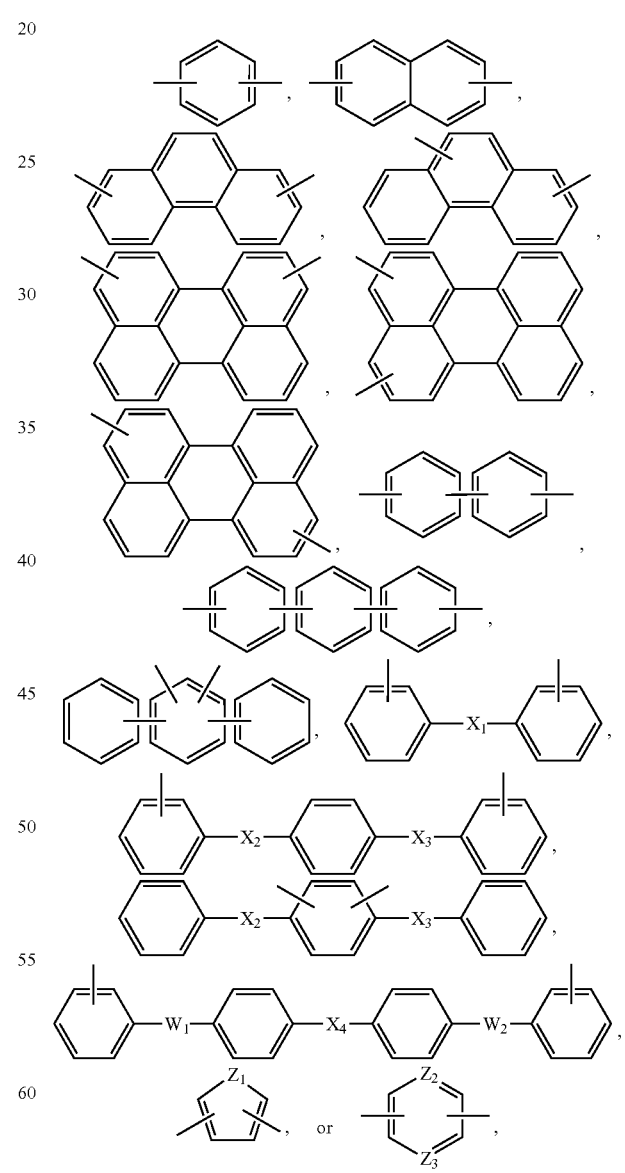
wherein, in the above Chemical Formulae,
$X_1$, $X_2$, $X_3$, and $X_4$ are the same or different, and independently O, S, C(=O), CH(OH), S(=O)$_2$, Si(CH$_3$)$_2$, (CH$_2$)$_p$ (where 1≦p≦10), (CF$_2$)$_q$ (where 1≦q≦10), C(CH$_3$)$_2$, C(CF$_3$)$_2$, or C(═O)NH, W$_1$ and W$_2$ are the same or different, and independently O, S, or C(═O), Z$_1$ is O, S, CR$_1$R$_2$ or NR$_3$, where R$_1$, R$_2$ and R$_3$ are the same or different from each other and independently hydrogen or a C1 to C5 alkyl group, and Z$_2$ and Z$_3$ are the same or different from each other and independently N or CR$_4$ (where, R$_4$ is hydrogen or a C1 to C5 alkyl group), provided that both Z$_2$ and Z$_3$ are not CR$_4$.

21. The hollow fiber of claim 20, wherein Ar$_1$' and Ar$_2$ are selected from one of the following Chemical Formulae:

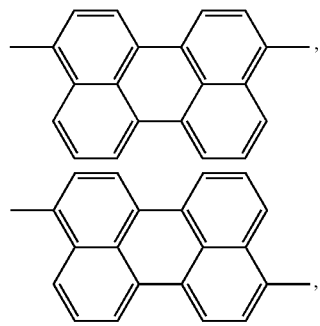

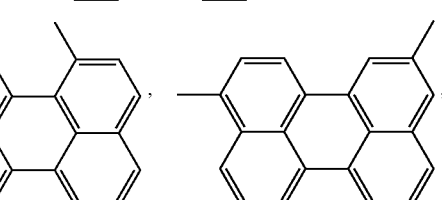

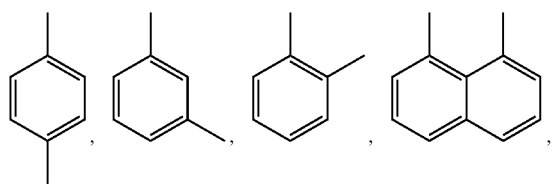

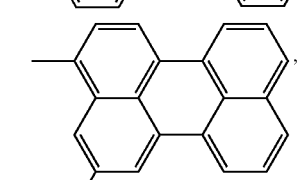

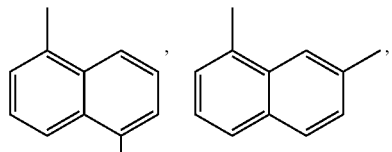

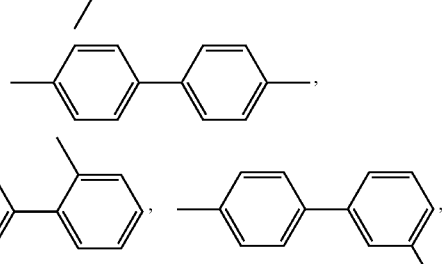

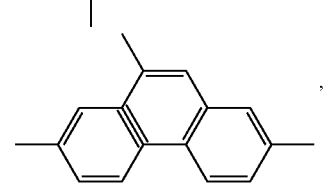

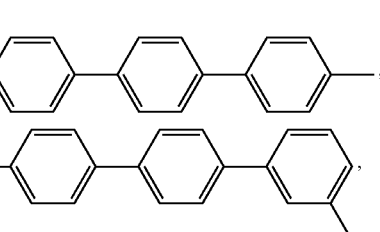

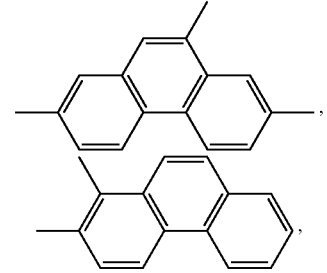

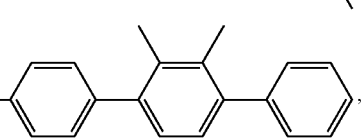

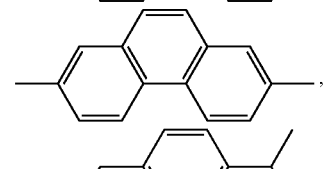

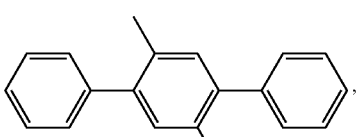

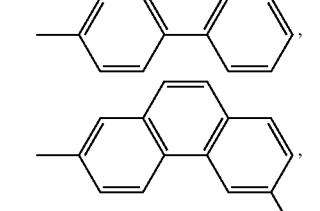

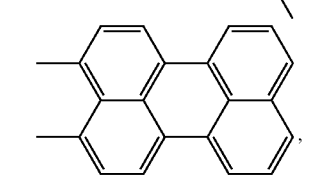

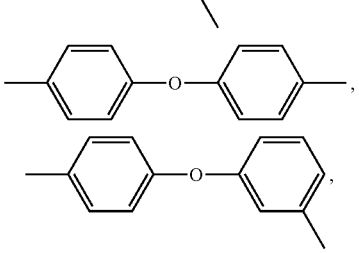

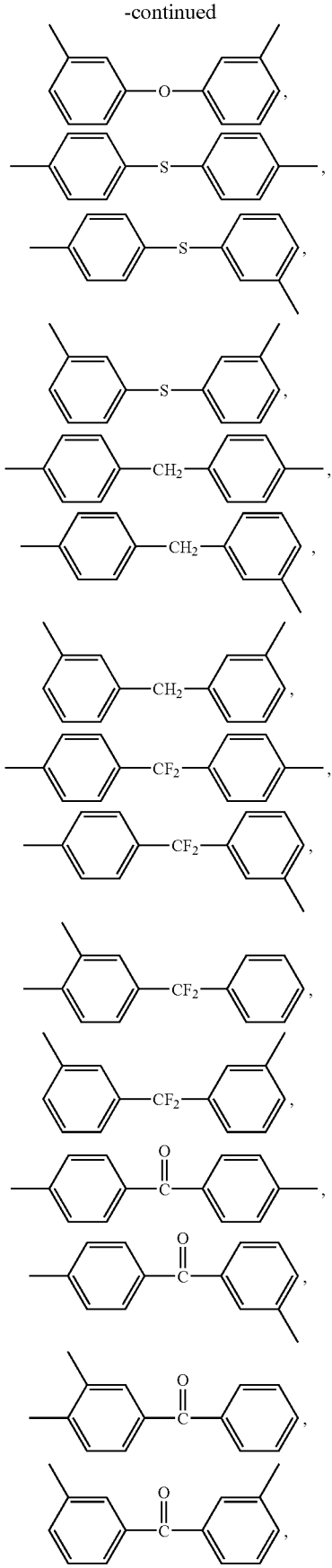
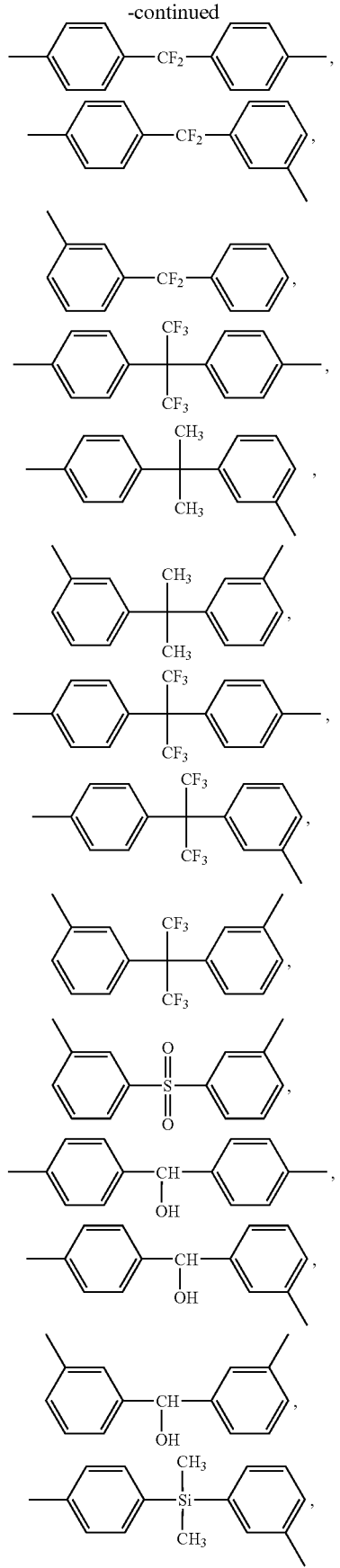

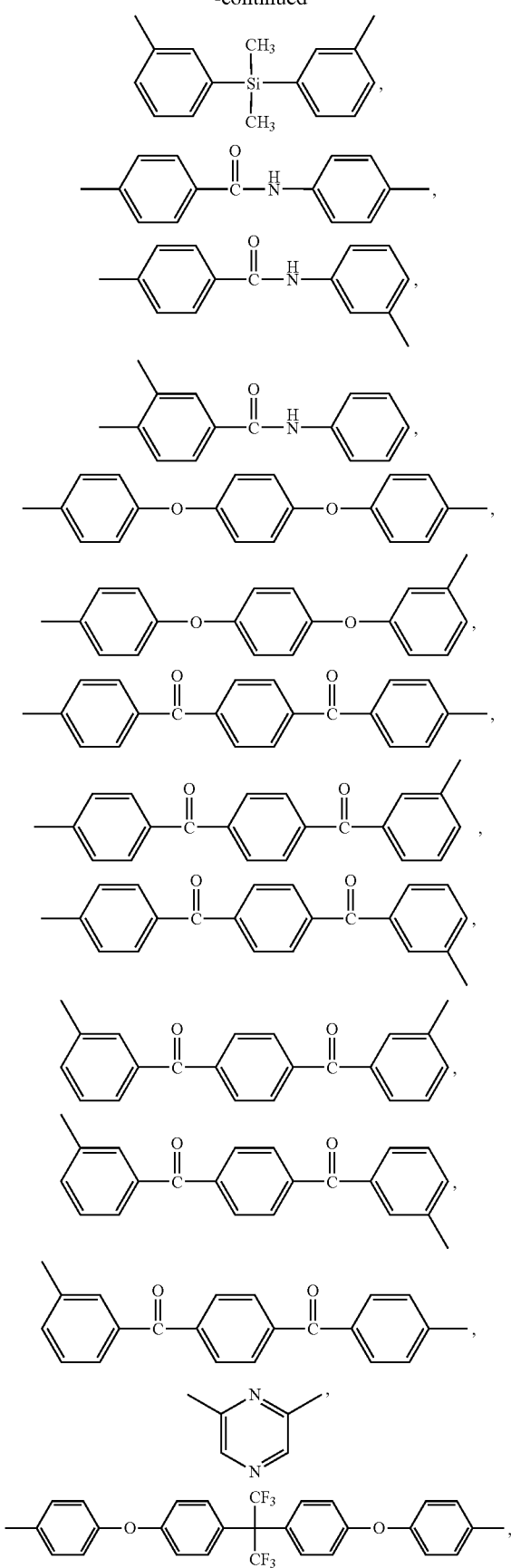

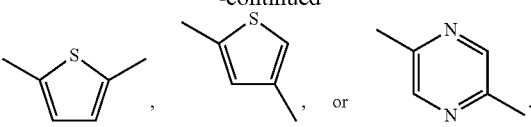

22. The hollow fiber of claim 17, wherein Q is selected from $C(CH_3)_2$, $C(CF_3)_2$, O, S, $S(=O)_2$, or $C(=O)$.

23. The hollow fiber of claim 17, wherein $Ar_1$ is a functional group represented by the following Chemical Formula A, B, or C, $Ar_1'$ is a functional group represented by the following Chemical Formula F, G, or H, $Ar_2$ is a functional group represented by the following Chemical Formula D or E, and Q is $C(CF_3)_2$:

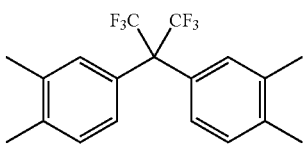

[Chemical Formula A]

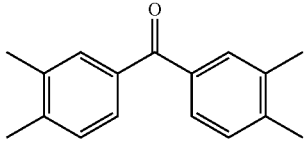

[Chemical Formula B]

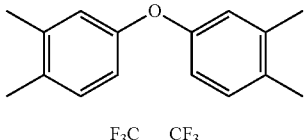

[Chemical Formula C]

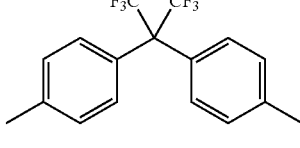

[Chemical Formula D]

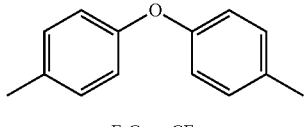

[Chemical Formula E]

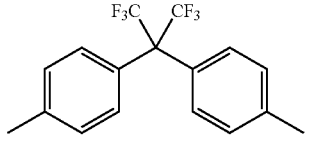

[Chemical Formula F]

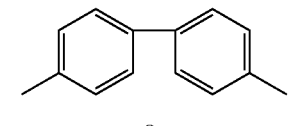

[Chemical Formula G]

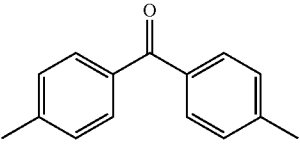

[Chemical Formula H]

24. The hollow fiber of claim 1, wherein the hollow fiber is applicable for separating at least one gas selected from the group consisting of He, $H_2$, $N_2$, $CH_4$, $O_2$, $N_2$, $CO_2$, and combinations thereof.

25. The hollow fiber of claim 24, wherein the hollow fiber has $O_2/N_2$ selectivity of 4 or more, $CO_2/CH_4$ selectivity of 30 or more, $H_2/N_2$ selectivity of 30 or more, $H_2/CH_4$ selectivity of 50 or more, $CO_2/N_2$ selectivity of 20 or more, and $He/N_2$ selectivity of 40 or more.

26. The hollow fiber of claim 25, wherein the hollow fiber has $O_2/N_2$ selectivity of 4 to 20, $CO_2/CH_4$ selectivity of 30 to 80, $H_2/N_2$ selectivity of 30 to 80, $H_2/CH_4$ selectivity of 50 to 90, $CO_2/N_2$ selectivity of 20 to 50, and $He/N_2$ selectivity of 40 to 120.

* * * * *